(12) United States Patent
Sasagawa et al.

(10) Patent No.: US 10,454,800 B2
(45) Date of Patent: Oct. 22, 2019

(54) INFORMATION NOTIFICATION METHOD, INFORMATION NOTIFICATION SYSTEM, AND SERVER DEVICE

(71) Applicant: Panasonic Intellectual Property Corporation of America, Torrance, CA (US)

(72) Inventors: Michiko Sasagawa, Osaka (JP); Motoji Ohmori, Osaka (JP); Yuji Unagami, Osaka (JP); Hideo Umetani, Osaka (JP); Kazunori Isogai, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 503 days.

(21) Appl. No.: 14/382,558

(22) PCT Filed: Sep. 25, 2013

(86) PCT No.: PCT/JP2013/005661
§ 371 (c)(1),
(2) Date: Sep. 3, 2014

(87) PCT Pub. No.: WO2014/050088
PCT Pub. Date: Apr. 3, 2014

(65) Prior Publication Data
US 2015/0046580 A1 Feb. 12, 2015

Related U.S. Application Data

(60) Provisional application No. 61/720,751, filed on Oct. 31, 2012, provisional application No. 61/707,279, filed on Sep. 28, 2012.

(51) Int. Cl.
*H04L 12/26* (2006.01)
*H04L 12/24* (2006.01)
*G06Q 30/02* (2012.01)

(52) U.S. Cl.
CPC ......... *H04L 43/10* (2013.01); *G06Q 30/0255* (2013.01); *H04L 41/0816* (2013.01)

(58) Field of Classification Search
CPC ... H04L 29/08072; H04L 29/06; H04L 43/00; H04L 12/2602; H04L 41/22; H04L 43/10;
(Continued)

(56) References Cited

U.S. PATENT DOCUMENTS

2003/0045278 A1* 3/2003 Kizu .................. G08G 1/20
455/419
2005/0177716 A1* 8/2005 Ginter .................. G06F 21/10
713/157
(Continued)

FOREIGN PATENT DOCUMENTS

JP 2004-240915 8/2004
JP 2006-331032 12/2006
(Continued)

OTHER PUBLICATIONS

International Search Report dated Nov. 26, 2013 in International (PCT) Application No. PCT/JP2013/005661.

*Primary Examiner* — Anthony Mejia
*Assistant Examiner* — Mehulkumar J Shah
(74) *Attorney, Agent, or Firm* — Wenderoth, Lind & Ponack, L.L.P.

(57) ABSTRACT

An information notification method for providing information from a server device to a plurality of devices connected to a network, including: reading notification information stored in association with information indicating a particular action of a user; acquiring operation histories of the plurality of devices; estimating, based on operation histories of one or more devices owned by the user among the plurality of devices, a no-operation period during which the user is unlikely to operate the one or more devices; determining, based on current operation state of the one or more devices,
(Continued)

whether the particular action has been performed outside the no-operation period; and transmitting, when outcome of the determining is affirmative, the notification information associated with the particular action to a destination device among the one or more devices owned by the user. The destination device provides the user with the notification information.

20 Claims, 37 Drawing Sheets

(58) Field of Classification Search
CPC ..... H04L 41/0816; H04L 12/26; H04L 12/24; G06Q 30/0255
USPC ........... 709/224; 340/3.1; 370/252; 714/47.1
See application file for complete search history.

(56) References Cited

U.S. PATENT DOCUMENTS

| | | | | |
|---|---|---|---|---|
| 2005/0256796 | A1* | 11/2005 | Haga | G06Q 30/08 705/313 |
| 2006/0053219 | A1* | 3/2006 | Kutsumi | G06Q 30/02 709/224 |
| 2007/0035389 | A1* | 2/2007 | Komiya | G08B 25/008 340/516 |
| 2007/0217290 | A1* | 9/2007 | Rock | H05B 37/0281 368/12 |
| 2010/0328314 | A1* | 12/2010 | Ellingham | G06Q 30/02 345/440 |
| 2011/0183733 | A1* | 7/2011 | Yoshida | H04L 12/10 463/1 |
| 2011/0270452 | A1* | 11/2011 | Lu | G05B 19/042 700/291 |
| 2012/0019674 | A1* | 1/2012 | Ohnishi | G08C 17/00 348/207.1 |
| 2012/0065802 | A1* | 3/2012 | Seeber | G06F 1/3203 700/295 |

FOREIGN PATENT DOCUMENTS

| | | |
|---|---|---|
| JP | 2009-105882 | 5/2009 |
| JP | 2009-116552 | 5/2009 |
| JP | 2009-258975 | 11/2009 |
| JP | 2010-015418 | 1/2010 |

* cited by examiner

| Service ID /1010 | Service name /1020 | Reference DB /1030 |
|---|---|---|
| S0001 | Advertisement distribution service | Advertisement distribution service DB |
| S0002 | Weather forecast notification service | Weather forecast notification service DB |
| S0003 | Broadcast notification service | Broadcast notification service DB |
| . . . | . . . | . . . |

FIG. 4

| Name | Notification target | | | | Notification conditions | | Notification contents |
|---|---|---|---|---|---|---|---|
| | Area | Appliance type | Usage period | Usage rate | Notification timing | | |
| AAA cooking class | ABC city | Automatic bread baker | No longer than 1 year | < 10% | Awakening/Cooking/ Keyword = *Poketan* | | http://example.com |
| ... | ... | ... | ... | ... | ... | | ... |

910 — Name
920 — Notification target
921 — Area
922 — Appliance type
923 — Usage period
924 — Usage rate
930 — Notification conditions
931 — Notification timing
932 — Notification contents
900

FIG. 6

| Name ~1110 | Area ~1120 | Appliance type ~1130 | Usage period ~1140 | Usage rate ~1150 | Notification timing ~1160 | Notification contents ~1170 |
|---|---|---|---|---|---|---|
| AAA cooking class | ABC city | Automatic bread baker | No longer than 1 year | < 10% | Awakening/Cooking/ Keyword = *Poketan* | http://example.com |
| BBB supermarket | N36.62567, E135.63238, 1000 | 0 | 0 | 0 | [Specified timing] / [Appliance] = Laundry machine | http://example.net Light |
| ... | ... | ... | ... | ... | ... | ... |

| Notification timing 1510 | Event type 1520 | Notification condition | Target appliance 1540 |
|---|---|---|---|
| Awakening | Execution of Function | Appliance having an alarm function executes the function | Appliance in operation |
| Awakening | Operation histories | Bedroom light is turned off before no-operation period & User operates an appliance | Appliance operated by user |
| Going out of home | Execution of Function | Electronic lock is closed from the outside | Portable terminal device |
| Going out of home | Operation histories | All the appliances are turned OFF before no-operation period, except for appliances that need to be in the turned-on state all the day | Portable terminal device |
| Going out of home | Operation histories | No-operation period is detected between 5:00 and 22:00 | Portable terminal device |
| Coming home | Execution of Function | Electronic lock is opened from the outside | Appliance operated after detection |
| Coming home | Operation histories | User operates an appliance within home after no-operation period is detected | Appliance operated by user |
| Cooking | Operation histories | Operation period of an appliance categorized in "Cooking" | Category = Cooking |
| Keyword | Context search | Specified keyword is found in information of the program being watched | Category = AV |
| Keyword | Context search | Specified keyword is found in program schedule to be recorded by a recorder | Category = AV |
| Keyword | Context search | Specified keyword is found in electronic program guide | Category = AV |
| Specified timing | | Instruction from the information provider | Appliance in operation |
| Specified timing | | Time specified by the information provider | Operated in operation period in the past including the specified time |
| ... | ... | ... | |

| Appliance ID 1310 | Appliance type 1320 | Category 1330 | Notification method 1340 | | | | Context 1350 |
|---|---|---|---|---|---|---|---|
| | | | Browser 1340 | Text 1341 | Light 1342 | Sound 1343 | 1344 |
| TV0001 | TV | AV | Ver.1 | OK | OK | OK | OK |
| TV0002 | TV | AV | NG | OK | OK | OK | OK |
| REF0001 | Refrigerator | Cooking | Ver.2 | NG | NG | OK | NG |
| REF0002 | Refrigerator | Cooking | NG | OK | OK | OK | NG |
| HB0001 | Automatic bread baker | Cooking | NG | NG | OK | OK | NG |
| LIT0001 | Light | Light | ... | OK | OK | NG | NG |
| ... | ... | ... | ... | ... | ... | ... | ... |
| SP0001 | Smartphone | Portable terminal device | Ver.2 | OK | OK | OK | OK |
| ... | ... | ... | ... | ... | ... | ... | ... |

| User ID | User name | Postal code | Address | Appliance ID | Registration date | History ID |
|---|---|---|---|---|---|---|
| CID0001 | Taro Yamada | 572-0085 | Kadoma 1006, ABC city | HB0001 | 2012/9/15 | HID0001 |
| | | | | TV0001 | 2009/7/5 | |
| | | | | REF0001 | 2005/6/23 | |
| | | | | SP0001 | 2011/5/3 | |
| CID0002 | Taichi Suzuki | 572-0086 | Matsuyamachi 33, ABC city | TV0001 | 2008/7/24 | HID0002 |
| | | | | SP0001 | 2011/5/16 | |
| ... | ... | ... | ... | ... | ... | ... |

FIG. 10

| Appliance ID | Date | Time | Type | Operation detail |
|---|---|---|---|---|
| HB0001 | 2012/9/11 | 23:12 | User operation | Setting of timer cooking |
| TV0001 | 2012/9/12 | 06:30 | Notification | Alarm |
| TV0001 | 2012/9/12 | 06:40 | User operation | Selection of Channel [8] from remote control |
| TV0001 | 2012/9/12 | 07:10 | User operation | Power-off operation from remote control |
| HB0001 | 2012/9/12 | 07:15 | Notification | Notification of completion of baking |
| HB0001 | 2012/9/12 | 07:16 | User operation | Opening of door |
| TV0001 | 2012/9/12 | 07:19 | User operation | Power-on operation from remote control |
| ... | ... | ... | ... | ... |

FIG. 26

| | 1110 | 1120 | 1130 | 1140 | 1150 | 1160 | 1170 | 1180 | 1185 |
|---|---|---|---|---|---|---|---|---|---|
| | Name | Area | Appliance type | Usage period | Usage rate | Notification timing | Notification contents | Effective date | Effective time |
| | AAA cooking class | ABC city | Automatic bread baker | No longer than 1 year | < 10% | Awakening/Cooking/ Keyword = *Poketan* | http://example.com | Monday to Friday | 10:00 to 19:00 |
| | BBB supermarket | N36. 62567, E135. 63238, 1000 | ○ | ○ | ○ | [Specified timing] / [Appliance] = Laundry machine | http://example.net Light | 25th day of each month | 17:00 to 22:00 |
| | ⋮ | ⋮ | ⋮ | ⋮ | ⋮ | ⋮ | ⋮ | | |

| Name ~1110 | Area ~1120 | Appliance type ~1130 | Usage period ~1140 | Usage rate ~1150 | Notification timing ~1160 | Notification contents ~1170 | Consumable goods ~1190 |
|---|---|---|---|---|---|---|---|
| ZZZ supermarket | 0 | Laundry machine | Within 3 years | 0 | At short supply of consumable goods | http://example2.com Light | Detergent |
| ... | ... | ... | ... | ... | ... | ... | ... |

1102

INFORMATION NOTIFICATION METHOD, INFORMATION NOTIFICATION SYSTEM, AND SERVER DEVICE

This application claims benefit to the provisional U.S. application No. 61/707,279 filed on Sep. 28, 2012 and No. 61/720,751 filed on Oct. 31, 2012.

TECHNICAL FIELD

The present invention relates to technology of providing devices connected to a network with information from an external server, and in particular to technology of determining the timing of providing the information and determining the destination devices to which the information is to be provided.

BACKGROUND ART

In recent years, networked home appliances (hereinafter simply referred to as "appliances") have become common, which have the function of communicating with an external server via a communication network such as the Internet or a mobile telephone network. This function is used by, for example, an advertisement distribution system that transmits information such as an advertisement from an external server to such appliances (e.g. Patent Literature 1). An advertisement distribution server in the advertisement distribution system distributes an advertisement to a plurality of appliances simultaneously, according to conditions determined by an advertiser in advance, such as the starting time and the period of distribution, and the destinations of the advertisement.

In this advertisement distribution system, however, it is not considered whether the users of the appliances at the destinations of the advertisement are in the vicinity of their respective appliances at the time of actual distribution of the advertisement. If the users are not in the vicinity of the appliances at the time of distribution of the advertisement and cannot recognize the advertisement, it can hardly be said that the advertisement distribution is effective. In view of this problem, Patent Literature 2 discloses technology of delivering an advertisement to an appliance at the time the user operates the appliance, aiming to achieve more effective distribution of advertisements.

CITATION LIST

Patent Literature

[Patent Literature 1] Japanese Patent Application Publication No. 2004-240915
[Patent Literature 2] Japanese Patent Application Publication No. 2009-258975

SUMMARY OF INVENTION

Technical Problem

Here, the timing of operating an appliance depends on the user, and it is therefore not always possible for the advertiser to distribute an advertisement to the user within a particular period as desired by the advertiser. For this reason, when distributing, for example, an advertisement of special offers available for a limited time, the advertiser needs to predict the behaviors of the users to determine the timing of distributing the advertisement. However, due to diversity in lifestyle of users in recent years, it is difficult to take the lifestyle of every individual user into consideration to determine the conditions for advertisement distribution such as the timing of distribution. Furthermore, appliances that can be provided with an advertisement are limited to those having been actually operated, and if any appliances that have been operated are not equipped to present an advertisement provided by the advertiser to the users, the advertiser cannot effectively communicate the information to the users.

The present invention is made in view of such problems, and aims to provide an information notification method that allows for effective notification of information such as advertisements to users by determining the timing of distribution in a preferable manner.

Solution to Problem

To solve the above-described problem, one aspect of the present invention provides an information notification method for providing information from a server device to a plurality of devices connected to a network, comprising: a reading step of reading notification information that is stored in association with information indicating a particular action of a user; an acquiring step of acquiring operation histories of the plurality of devices; an estimating step of estimating, based on operation histories of one or more devices owned by the user among the plurality of devices, a no-operation period during which the user is unlikely to operate the one or more devices; a determining step of determining, based on current operation state of the one or more devices, whether the particular action has been performed outside the no-operation period; and a transmitting step of, when outcome of the determining step is affirmative, transmitting the notification information associated with the particular action to a destination device among the one or more devices owned by the user, wherein the destination device, receiving the notification information, provides the user with the notification information.

Effects of Invention

With the information notification method pertaining to the present invention, information to be transmitted is set with respect to each of several particular actions, and the information is transmitted timely by determining whether any of the particular actions have been performed by the user, based on the operation histories of the devices. Therefore, the information notification method can effectively provide the user with information such as advertisements.

BRIEF DESCRIPTION OF DRAWINGS

FIG. 3 illustrates a data structure and example contents of a service information table 1000.

FIG. 4 illustrates a data structure and example contents of setting information 900 set by an information provider.

FIG. 6 illustrates a data structure and example contents of a notification information table 1100.

FIG. 7 illustrates a data structure and example contents of a notification condition information table 1500.

FIG. 9 illustrates a data structure and example contents of a user information table 1200.

FIG. 10 illustrates a data structure and example contents of an operation history information table 1400.

FIG. 26 illustrates a data structure and example contents of a notification information table 1101.

FIG. 34 illustrates a data structure and example contents of a notification information table 1102.

DESCRIPTION OF EMBODIMENTS

1. Embodiment 1

<1.1 Overview>

The following explains an information notification system 1 as an embodiment utilizing an information notification method pertaining to the present invention, with reference to the drawings.

Figure 1:
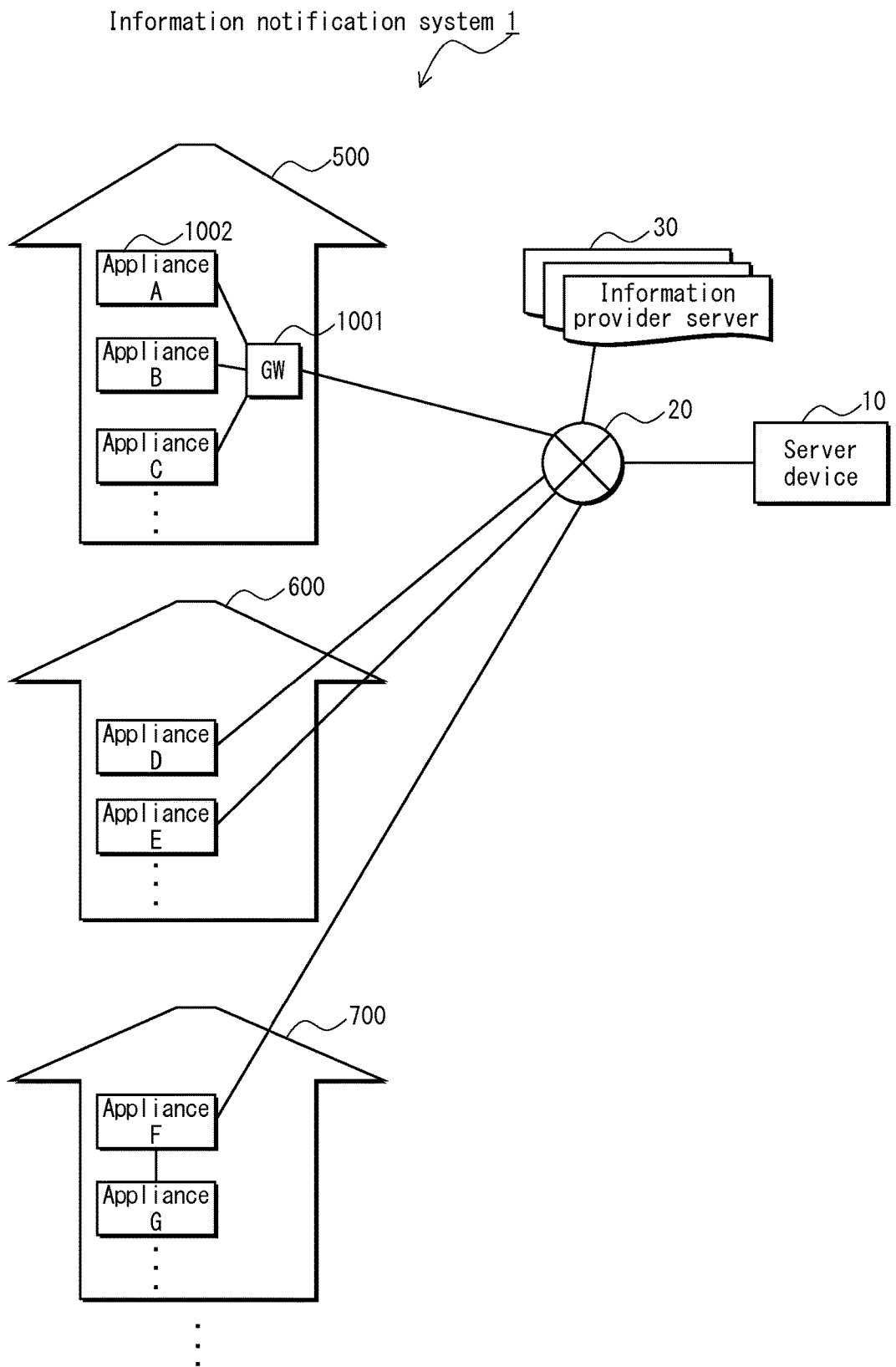
FIG. 1 is a schematic diagram illustrating a configuration of an information notification system 1 pertaining to Embodiment 1.

FIG. 1 is a schematic diagram showing an example structure of the information notification system 1 pertaining to the present embodiment.

The information notification system 1 includes a server device 10, an information provider server 30, appliances A through F and GW 1001, which are connected to a network 20.

Each appliance is directly or indirectly connected to the network 20. In the example shown in FIG. 1, the appliances A through C are installed within a house 500, and are connected to the network 20 via the GW 1001. The appliances D and E are installed within a house 600, and are each connected to the network 20 directly. The appliances F and G are installed within a house 700. The appliance G is connected to the appliance F, and thus the appliance G is connected to the network 20 via the appliance F. In this way, the appliances may be connected to the network in any manners.

An information provider, such as an advertiser, enters setting information according to a particular format into the server device 10 by using the information provider server 30. The details of the format are described below. In the setting information, items to be distributed are associated with particular actions of a user, which are represented in an abstract manner, such as "Awakening", "Going out of home", "Cooking", and "Going to bed".

Each of the appliances A through G sequentially transmits information showing operations of the appliance to the server device 10, and the server device 10 records operation histories of the appliance for each user based on the received information showing operations of the appliance.

The server device 10, when determining that a particular action is performed by a user, transmits information to the appliance owned by the user. The determination as to whether the particular action is performed is made based on the operation histories that have been sequentially recorded. Specifically, the server device 10 refers to the operation histories, and estimates the period during which the user is likely to perform the particular action according to the operation histories in the past. When the user operation is performed within the estimated period with respect to the appliance pertaining to the particular action, the server device 10 transmits corresponding information to, among the appliances owned by the user, the appliance that satisfies conditions.

As described above, the information notification system 1 pertaining to the present embodiment is capable of timely selecting, from among the appliances owned by a user, an appliance that is suitable for being provided with notification information at the time point, and of transmitting the notification information to the selected appliance, without being provided by the information provider with the timing of the notification or detailed conditions about the appliance to which the notification information is to be transmitted.

<1.2 Configuration>

<1.2.1 Server Device 10>

Figure 2:
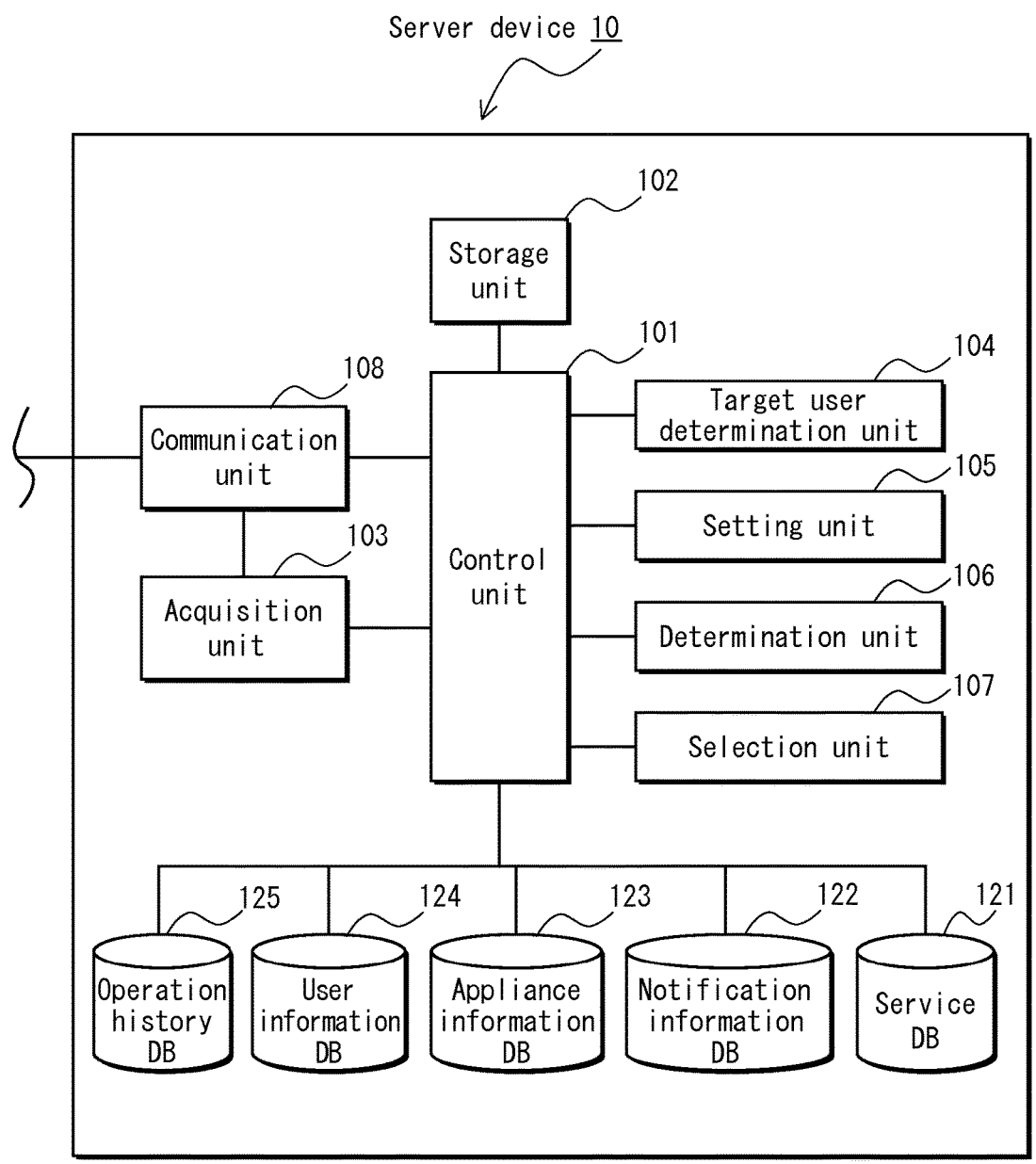
FIG. 2 is a functional block diagram illustrating primary components of a server device 10.

FIG. 2 is a functional block diagram illustrating primary components of the server device 10.

The server device 10 includes a control unit 101, a storage unit 102, an acquisition unit 103, a target user determination unit 104, a setting unit 105, a determination unit 106, a selection unit 107, a communication unit 108, a service database (DB) 121, a notification information DB 122, an appliance information DB 123, a user information DB 124, and operation history DB 125. In the following, the service DB 121, the notification information DB 122, the appliance information DB 123, the user information DB 124 and the operation history DB 125 may be collectively referred to as "DB" for simplification of explanation.

The following explains the components of the server device 10 one by one.

(Control Unit 101, Storage Unit 102)

The control unit 101 includes a central processing unit (CPU) for example, and the CPU executes programs stored in the storage unit 102, thereby causing the server device 10 to perform the following five functions.

Appliance operation history acquiring function: The function of controlling the acquisition unit 103 to acquire operation information that shows operations of the appliances A through G, and writing the operation histories in the form of an operation history information table 1400 into the operation history DB 125.

User determination function: The function of controlling the target user determination unit 104 to determine the user who owns the appliance to be provided with the information shown in Notification contents 1170 set by the information provider using the information provider server 30.

Transmission condition setting function: The function of controlling the setting unit 105 to set the timing of providing the information shown in Notification contents 1170 and the conditions of the target appliances by using the operation history information table 1400 stored in the operation history DB 125 and the notification information table 1100 stored in the notification information DB 122.

Transmission determination function: The function of controlling the determination unit 106 to determine whether to transmit information shown in Notification contents 1170 to the appliance owned by the user determined by the target user determination unit 104, based on the operation history information table 1400 stored in the operation history DB 125.

Appliance selection function: The function of controlling the selection unit 107, when the determination unit 106 determines to transmit the information specified in Notification contents 1170, to select, from among the appliances owned by the user determined by the target user determination unit 104, the appliance to which the information specified in Notification contents 1170 is to be transmitted, based on the conditions set by the setting unit 105.

The storage unit 102 includes, for example, a random access memory (RAM), a read only memory (ROM) and a flash memory, and stores therein programs that determine the operations of the control unit 101 and data that has been retrieved from the DB and is to be used by the control unit 101.

(Acquisition Unit 103)

The acquisition unit 103 is under the control of the control unit 101, and has the function of receiving setting information 900 from the information provider server 30 via the communication unit 108, and writing the received setting information in the form of the notification information table 1100 into the notification information DB 122. The details of the setting information 900 will be described later.

The acquisition unit 103 also has the function of receiving information showing operations of the appliances A through G via the communication unit 108, and sequentially writing the information thus received in the form of the operation history information table 1400 into the operation history DB. The details of the operation history information table 1400 will be described later.

(Target User Determination Unit 104)

The target user determination unit 104 is under the control of the control unit 101, and has the function of determining the target user to which the information specified in Notification contents 1170 is to be transmitted, based on the notification information table 1100 in the notification information DB 122 and a user information table 1200 in the user information DB 124. The details of the user information table 1200 will be described later.

Based on the history information of the appliances owned by the user determined by the target user determination unit 104, the determination unit 106, which will be described later, determines the timing of transmitting the information specified in Notification contents 1170, and the selection unit 107, which will be described later, selects the appliance to be provided with the notification.

(Setting Unit 105)

The setting unit 105 is under the control of the control unit 101, and has the function of setting the conditions used for determining whether the particular action of the user has been performed or not, by using the operation history information table 1400, which will be described later, and the notification information table 1100. Note that the particular action of the user is the action indicated by Notification timing 2001 contained in an event condition information table 2000, which will be described alter.

(Determination Unit 106)

The determination unit 106 is under the control of the control unit 101, and has the function of monitoring the operation information of the appliance sequentially acquired by the acquisition unit 103, to determine whether the operation satisfying the conditions determined by the setting unit 105 is performed or not, and transmitting the information specified in Notification contents 1170 to the appliance selected by the selection unit 107 when determining affirmatively.

(Selection Unit 107)

The selection unit 107 is under the control of the control unit 101, and has the function of, when the determination unit 106 determines affirmatively, selecting the appliance to which the notification information specified in Notification contents 1170 is to be transmitted, by using the operation history information table 1400 stored in the operation history DB 125, according to the conditions set by the setting unit 105.

Note that the respective functions of the acquisition unit 103, the target user determination unit 104, the setting unit 105, the determination unit 106 and the selection 107 described above are realized by the CPU executing programs stored in the storage unit 102.

(Communication Unit 108)

The communication unit 108 is, for example, a communication interface for connecting to the network 20. The communication unit 108 is under the control of the control unit 101, and has the function of receiving setting information from the information provider server 30 and information related to operations of the appliances A through G from the respective appliances. The communication unit 108 also has the function of transmitting information stored in the notification information DB to the appliances A through G.

(Service DB 121)

The service DB 121 is a database storing a service information table 1000.

FIG. 3 illustrates a data structure and example contents of the service information table 1000.

As shown in the figure, the service information table 1000 contains Service ID 1010, Service name 1020 and Reference DB 1030 associated with each other.

Service ID 1010 shows an ID for identifying a service to be provided.

Service name 1020 shows the type of the service to be provided.

Reference DB 1030 specifies the DB in which the information used for the corresponding service is stored.

For example, the service identified by Service ID 1010 indicating "S0001" is an advertisement distribution service, and the DBs to be referred to in this case are the DBs for the advertisement distribution service. Note that the DBs for the advertisement distribution service include the operation history DB 125, the user information DB 124, the appliance information DB 123 and the notification information DB 122 for the advertisement distribution service.

(Notification Information DB 122)

The notification information DB 122 contains the notification information table 1100 for realizing centralized management of the setting information 900 received from the information provider server 30 of each information provider, and a notification condition information table 1500 showing a condition for notification at each timing of notification.

FIG. 4 illustrates a data structure and example contents of the setting information 900 set by the information provider using the information provider server 30.

As shown in the figure, the setting information 900 contains Name 910, Notification target 920 and Notification conditions 930 associated with each other.

Name 910 is an item specifying the name identifying the information provider. In the example shown in FIG. 4, Name 910 shows "AAA cooking class" as the name identifying the information provider.

Notification target 920 is an item setting the conditions for selecting the notification-target user or the appliance owned by the user. Notification target 920 contains Area 921, Appliance type 922, Usage period 923 and Usage rate 924 as items.

Area 921 is an item specifying the location or the range where the users and the notification-target appliances exist. In the example shown in FIG. 4, the users living in ABC city and the appliances existing in ABC city are the notification-target appliances.

Appliance type 922 is an item specifying the type of the notification-target appliances. In the example shown in FIG. 4, an automatic bread baker is specified as the type of the notification-target appliances.

Usage period 923 is an item specifying conditions related to the usage period of the appliance specified in Appliance type 922. In the example shown in FIG. 4, appliances that have been used for no longer than one year are specified as the notification-target appliances.

Usage rate 924 is an item specifying the conditions related to the usage rate within a fixed period of the appliance specified by Appliance type 922. In the example shown in FIG. 4, appliances with a usage rate smaller than 10% are specified as the notification-target appliances. The usage rate indicates the rate (percentage) of the number of times the appliance has been actually used, relative to a predetermined number of times. For example, if the usage rate when an appliance has been used twenty times during 10 days is 100%, the usage rate when the appliance has been used once during 10 days is 5%. The usage rate of each appliance is obtained by referring to the operation history information table 1400.

The notification conditions 930 is an item specifying conditions related to the timing of notification to the appliance and the contents of the notification. The item Notification conditions 930 contains, for example, Notification timing 931 and Notification contents 932.

Figure 5:
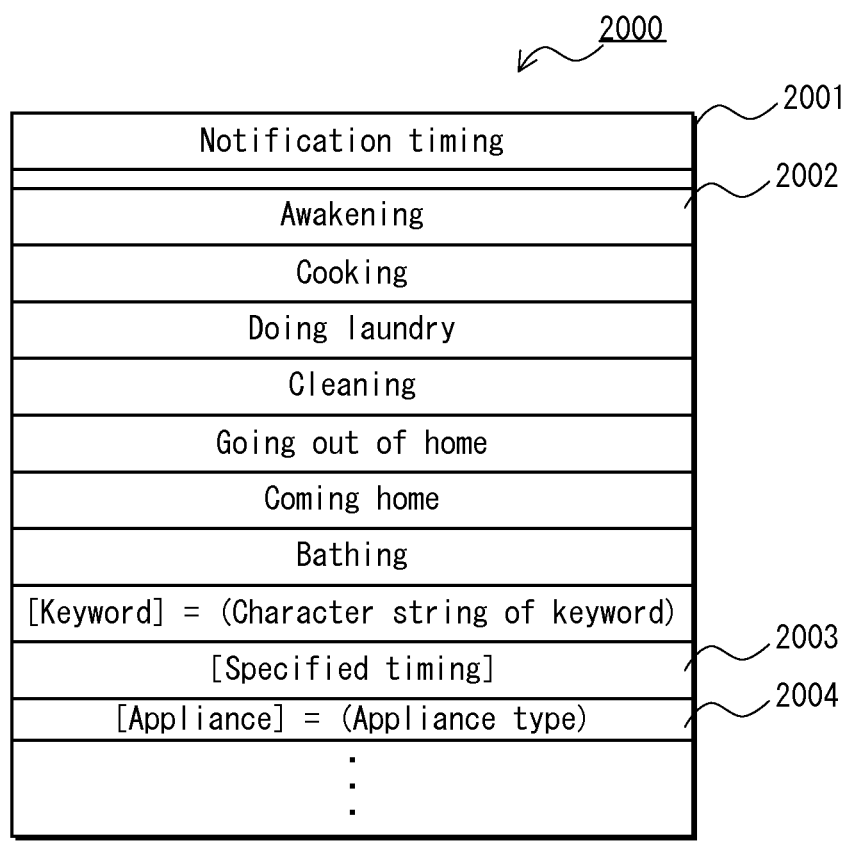
FIG. 5 illustrates a data structure and example contents of an event condition information table 2000.

Notification timing 931 is an item specifying the notification timing indicated by the event condition information table 2000 shown in FIG. 5. The notification information specified in Notification contents 932 is transmitted to the appliance selected by the selection unit 107 when the operation of the appliance based on the operation history information table 1400 satisfies the notification timing specified in this item. In the example shown in FIG. 4, the notification information specified in Notification contents 932 is transmitted when the notification timing satisfies the conditions "Awakening", "Cooking" and "[keyword]= (Poketan)".

Notification contents 932 is an item specifying the notification information to be transmitted to the appliances. In the example shown in FIG. 4, it is specified in Notification contents 932 that the information to be notified is the page located at http://example.com.

FIG. 5 illustrates a data structure and example contents of the event condition information table 2000.

The event condition information table 2000 contains Notification timing 2001. Notification timing 2001 is an item specifying the event name identifying the trigger of the notification. In the example shown in FIG. 5, the event names identifying the trigger of the notification include, for example, "Awakening" 2002, "Cooking", "Doing laundry", "Going out of home", "Coming home", "Bathing", "[Keyword]=(Character string of keyword)", [Specified timing] 2003, and "[Appliance]=(Appliance type) 2004. Among these, "Awakening", "Cooking", "Doing laundry", "Going out of home", "Coming home" and "Bathing" are examples of the event names specifying a particular action of the user. The value indicated by each item is specified in Notification timing 931 of the setting information 900. For example, when the information provider wishes to set the setting information 900 so as to notify the user when the user wakes up, the information provider specifies "Awakening" in Notification timing 931.

[Specified timing] 2003 is specified when the information provider wishes to input a transmission instruction directly to the server device 10 instead of setting the timing of the notification in advance. When Notification timing 931 is filled with "[Specified timing]", the notification information specified in Notification contents 1170 is transmitted to the appliance according to a transmission instruction input by the information provider into the server device 10. "[Appliance]=(Appliance type) 2004" is specified when the notification is to be made at the time the appliance specified by the appliance type is operated.

FIG. 6 illustrates a data structure and example contents of the notification information table 1100 stored in the notification information DB 122.

The notification information table 1100 is used for realizing centralized management of the setting information 900 set by each information provider. The notification information table 1100 contains Name 1110, Area 1120, Appliance type 1130, Usage period 1140, Usage rate 1150, Notification timing 1160, and Notification contents 1170, which respectively correspond to Name 910, Area 921, Appliance type 922, Usage period 923, Usage rate 924, Notification timing 931 and Notification contents 932 in the setting information 900.

In the example shown in FIG. 6, the setting information set by AAA cooking class and setting information set by BBB supermarket are managed in a centralized manner. Area 1120 of BBB supermarket shows that the notification area is a radius of about 1000 m around the point at latitude of 36.62567 degrees north and longitude of 135.63238 degrees east. The value "0" shown in Appliance type 1130, Usage period 1140 and Usage rate 1150 shows that no condition is set in these items. "Light" shown in Notification contents 1170 indicates that the notification is performed by using, for example, blinking of an indicator such as an LED of the appliance. In addition, when "Sound" is specified, the notification is performed by using a sound such as a voice.

FIG. 7 illustrates a data structure and example contents of the notification condition information table 1500 which shows, for example, conditions for notification for each timing of notification.

The notification condition information table 1500 contains Notification timing 1510, Event type 1520, Notification condition 1530 and Target appliance 1540 associated with each other.

Notification timing 1510 is an item specifying one of the particular actions specified in Notification timing 2001.

Event type 1520 is an item specifying the event type that triggers the detection of the particular action specified in Notification timing 1510. Examples of the event type include "Execution of function", "Operation histories", "Context search" and "Specified timing". The details of these event types will be described later.

Notification condition 1530 is an item specifying the condition related to operations of the appliance. Referring to the operation history information table 1400, the determination unit 106 determines whether the operation of the appliance satisfying the notification condition specified in this item has been performed or not. In the example shown in FIG. 7, when Notification timing 1510 is "Awakening" and Event type 1520 is "Execution of function", Notification condition 1530 is "Appliance having an alarm function executes the function". In this case, every time the acquisition unit 103 acquires the operation information from the appliance and adds the information to the operation history information table 1400, the determination unit 106 determines whether or not the operation information thus added indicates that an appliance having an alarm function has executed the function by referring to the operation history information table 1400.

Target appliance 1540 is an item specifying a condition for selecting the target appliance to which the notification information specified in Notification contents 1170 is to be transmitted. For example, when Target appliance 1540 specifies "Appliance in operation", the appliances that are operating at the time the determination unit 106 determines that the notification condition is satisfied are the target appliances to which the notification information is to be transmitted.

As described above, when specifying the condition about the timing of notification, the information provider only needs to specify information indicating the particular actions, and does not need to specify the details of the appliances, the details of the operations, or when the operations are performed by the appliances.

The server device 10 refers to the notification condition information table 1500, and determines the conditions related to the appliances, used for determining whether the action specified in Notification timing 2001 has been performed. Whether the operation satisfying the condition has been performed or not is determined by referring to the operation history information table 1400.

(Appliance Information DB 123)

The appliance information DB 123 is a DB storing an appliance information table 1300 for managing information of various types of appliances having the function of connecting to the network.

Figure 8:
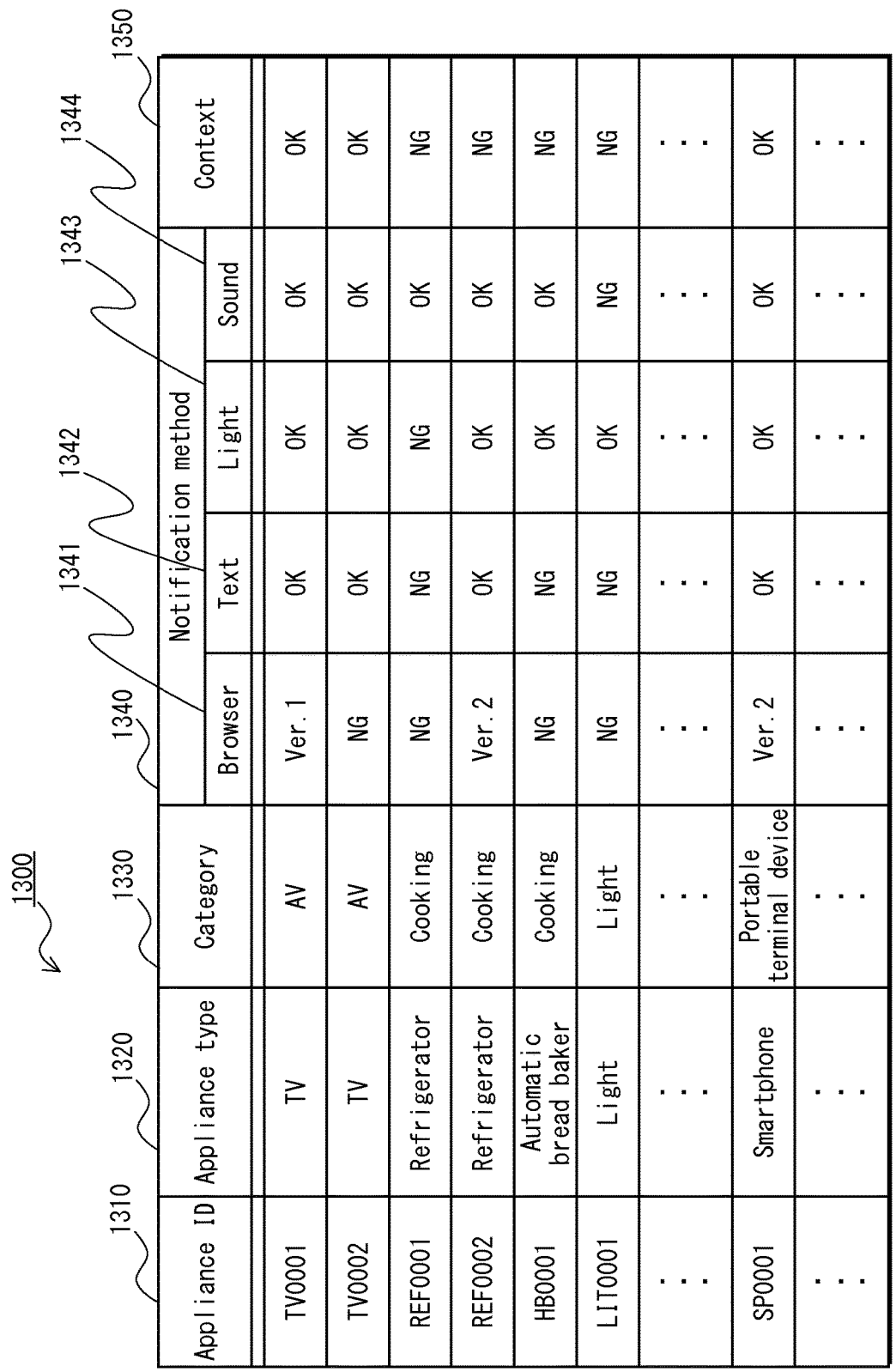
FIG. 8 illustrates a data structure and example contents of an appliance information table 1300.

FIG. 8 illustrates a data structure and example contents of the appliance information table 1300.

The appliance information table 1300 contains Appliance ID 1310, Appliance type 1320, Category 1330, Notification method 1340 and Context 1350 associated with each other.

Appliance ID 1310 is an item specifying a unique ID given to the appliance.

Appliance type 1320 is an item specifying the type of the appliance. In the example shown in FIG. 8, examples of the type of appliance include "TV", "Refrigerator", "Automatic bread baker", "Lighting device" and "Smartphone". Appliance type 1320 is used for determination as to whether it matches the value specified in "(Appliance type)" in "[Appliance]=(Appliance type)" 2004 shown in FIG. 5.

Category 1330 is an item specifying the category of the appliance indicated by Appliance ID 1310. The category is used for grouping the appliances according to their purposes. For example, appliances for cooking are categorized in "Cooking", appliances related to AV are categorized in "AV" and appliances related to lighting are categorized in "Lighting". Category 1330 is used for determining whether the condition specified in Target appliance 1540 in the notification condition information table 1500 is satisfied or not, for example.

Notification method 1340 is an item specifying the method that is supported by the appliance identified by Appliance ID 1310 and can be used by the appliance when providing the user with the notification. Notification method 1340 contains items Browser 1341, Text 1342, Light 1343 and Sound 1344.

When "Ver. 1", "Ver. 2" or the like is specified in Browser 1341, it means that the appliance has a browser function, which is the function of displaying the notification information written in hypertext markup language (html). The difference between "Ver. 1" and "Ver. 2" corresponds to the difference in display format. For example, "Ver. 1" represents a browser that can display texts and images but cannot display movies, and "Ver. 2" represents a browser that can display movies.

When "OK" is specified in Text 1342, it means that the appliance can display the notification information represented as a text, and when "NG" is specified in Text 1342, it means that the appliance cannot display the notification information represented as a text.

When "OK" is specified in Light 1343, it means that the appliance supports notification by using light, and when "NG" is specified in Light 1343, it means that the appliance does not support notification by using light. Notification by using light is, for example, turning on or blinking an indicator such as an LED of the appliance and thereby drawing attention of the user.

When "OK" is specified in Sound 1343, it means that the appliance supports notification by using sound such as reproduction of a sound file, and when "NG" is specified in Sound 1343, it means that the appliance does not support notification by using sound.

Context 1350 is an item specifying whether the appliance supports "Context search" shown in Event type 1520 of the notification condition information table 1500. When "OK" is specified in Context 1350, it means that the appliance supports the context search, and when "NG" is specified in Context 1350, it means that the appliance does not support the context search.

(User Information DB 124)

The user information DB 124 stores the user information table 1200 in which users and appliances owned by the users are associated with each other.

FIG. 9 illustrates a data structure and example contents of the user information table 1200.

The user information table 1200 contains User ID 1210, User name 1220, Postal code 1230, Address 1240, Appliance ID 1250, Registration date 1260 and History ID 1270 associated with each other.

User ID 1210 is an item storing a user ID of each user.

User name 1220, Postal code 1230 and Address 1240 are respectively items specifying the name, the postal code and the address of the user.

Postal code 1230 and Address 1240 are used for determination as to whether the user' location is within the area specified in Area 1120 of the notification information table 1100.

Appliance ID 1250 is an item specifying the IDs of the appliances owned by each user indicated by User ID 1210.

Registration date 1260 is an item specifying the year, month and day of the registration of the appliance indicated by Appliance ID 1250. Registration date 1260 is used for determination as to whether the condition specified in Usage period 1140 of the notification information table 1100 is satisfied or not, for example.

History ID 1270 is an item storing the ID of the operation history information table 1400, which is recorded for each user. That is, when referring to the operation history information of the user identified by User ID 1210, the operation history information that has the ID indicated by History ID 1270 is to be referred to from among a plurality of sets of operation history information stored in the operation history DB respectively corresponding to the users.

(Operation History DB 125)

The operation history DB stores the operation history information table 1400 recorded for each user. The operation history information table 1400 shows the operation information of the appliances sequentially acquired by the acquisition unit 103.

FIG. 10 illustrates a data structure and example contents of the operation history information table 1400.

The operation history information table 1400 contains Appliance ID 1410, Date 1420, Time 1430, Type 1440, and Operation detail 1450.

Appliance ID 1410 is an item storing the ID of the appliance that was operated.

Date 1420 and Time 1430 are items storing the date represented in year-month-day format and time when the appliance indicated by Appliance ID 1410 was operated.

Type 1440 is an item specifying the type of operation performed by the appliance. Examples of the type are "Operation" and "Notification". "Operation" indicates that the operation is performed in response to an instruction from the user, and "Notification" indicates that the operation is performed for notifying the user with certain information without an instruction from the user.

Operation detail 1450 is an item specifying the details of the operation of the appliance.

The acquisition unit 103 acquires operation information from an appliance when the appliance is operated or the appliance performs a function, and the operation information thus acquired is sequentially added to the operation history information table 1400 for each user.

<1.2.2 Appliance 1002>

The following explains appliances connected to the network.

Each of the appliances A through G shown in FIG. 1 is a home electrical appliance or a piece of equipment having the function of connecting to a network such as the Internet. Specifically, examples of these appliances include air conditioners, refrigerators, microwave ovens, automatic bread bakers, toasters, remote controls for water heaters, laundry machines, clothes dryers, dish washing/drying machines, vacuum cleaners, gas stoves, IH appliances, rice cookers, electric toilet seats with hot water spray feature for washing, electronic locks, intercoms, lighting devices, air purifiers, humidifiers, security sensors (motion detectors, crime prevention sensors), home servers, washstands, electrical toothbrush, hair dryers, beauty appliances, health appliances such as robotic massage chairs, physical activity monitors and body composition analyzers, personal computers, tablet terminals, information devices such as smartphones, mobile phones, facsimile machines, game machines, TVs, recorders, audio devices, and remote controls thereof.

The following explains an appliance 1002 as a representative of the appliances A through G, instead of explaining each of the appliances separately.

The appliance 1002 is connected to a gateway (GW) 1001 which will be described later, and communicates with the external server device 10 via the GW 1001. Note that the appliance 1002 may connect directly to the network 20 and communicate with the external server device 10 without connecting the GW 1001.

Figure 11:
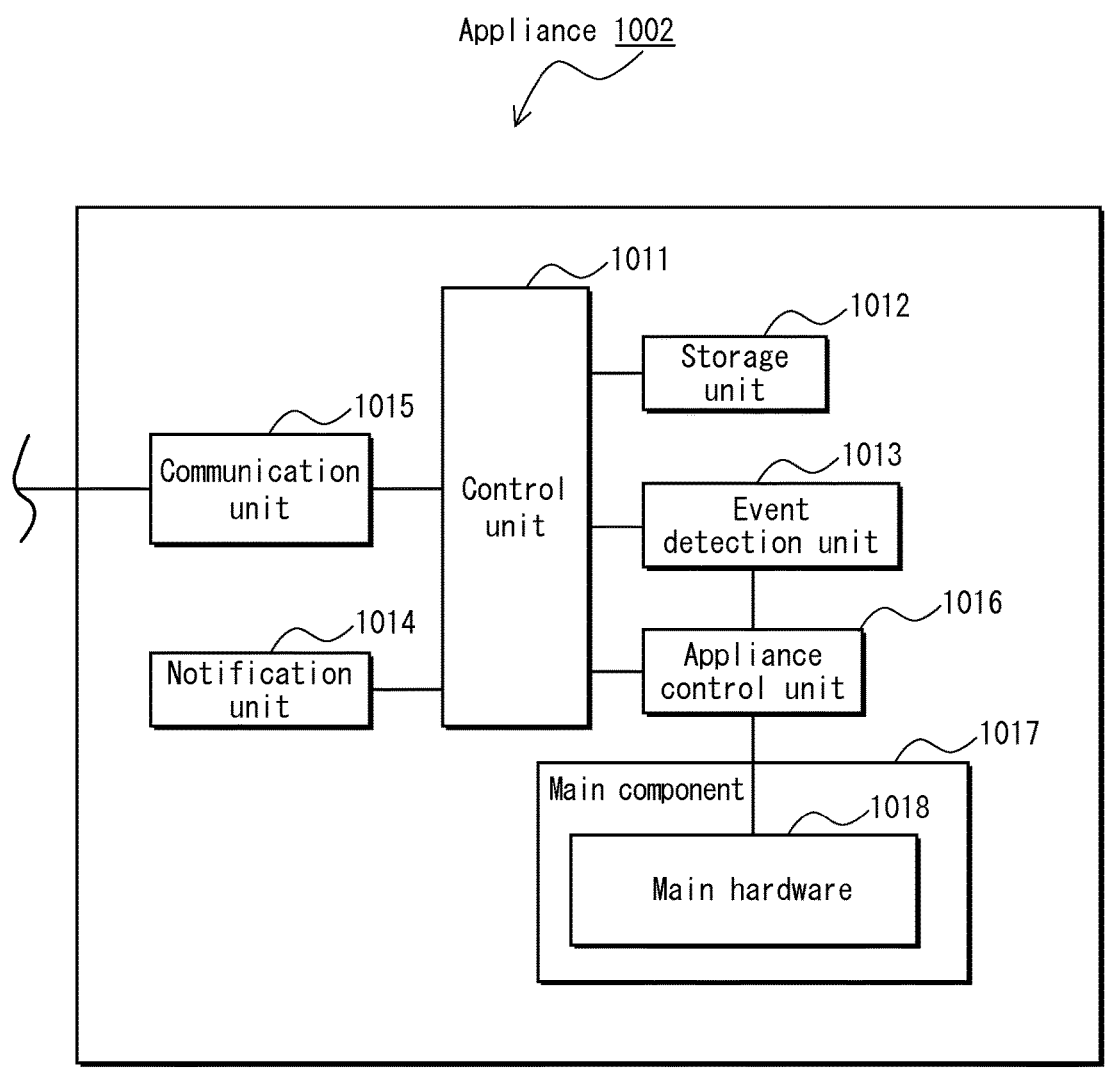
FIG. 11 is a functional block diagram illustrating primary components of an appliance 1002.

FIG. 11 is a functional block diagram illustrating primary components of the appliance 1002.

The appliance 1002 includes a control unit 1011, a storage unit 1012, an event detection unit 1013, a notification unit 1014, a communication unit 1015, an appliance control unit 1016 and a main component 1017.

(Control Unit 1011, Storage Unit 1012)

The control unit 1011 includes a CPU for example, and the CPU executes programs stored in the storage unit 1012, thereby causing the appliance 1002 to perform the following three functions.

Event detection function: The function of controlling the event detection unit 1013 to detect the instruction input by the user to the appliance, or detect the function performed by the appliance.

Communication control function: The function of controlling the communication unit 1015 to transmit the operation information input by the event detection unit 1013 to the server device 10 or receive the notification information from the server device 10.

Notification function: The function of controlling the notification unit 1014 to deliver the notification information received from the server device 10.

The storage unit 1012 includes, for example, a RAM, a ROM and a flash memory, and stores therein programs that determine the operations of the control unit 1011.

(Event Detection Unit 1013)

The event detection unit 1013 is under the control of the control unit 1011, and has the function of detecting operational instructions input by the user to the main component 1017 of the appliance, and detecting execution of the functions of the main component 1017. The event detection unit 1013 also has the function of outputting operation information relating to detected instructions or operations to the control unit 1011.

The functions of the event detection unit 1013 are realized by the CPU of the server device 10 executing the programs stored in the storage unit 1012.

(Notification Unit 1014)

The notification unit 1014 includes an output device for providing the user with notification information. The notification unit 1014 has the function of notifying the user of the notification information by outputting the notification information received from the server device 10 to the output device. Examples of the output device include, display devices such as monitor displays, speakers, indicators using light-emitting devices such as LEDs. The notification unit 1014 of the appliance has one or more of these output devices, depending on the type of the appliance. For example, when the appliance is a TV, the appliance has a display, a speaker and an indicator. When the appliance is an automatic bread baker, the appliance has a speaker and an indicator, but does not have a display. The method to be specified in Notification method 1340 of the appliance information table 1300 depends on the type of the output device included in the notification unit.

The functions of the notification unit 1014 are realized by the CPU of the server device 10 executing the programs stored in the storage unit 1012.

(Communication Unit 1015)

The communication unit 1015 includes a large scale integration (LSI) for communications, and is under the control of the control unit 1011. The LSI for communications has the function of exchanging data with an external server by using the Internet according to, for example, the TCP/IP protocols or the http protocols. The communication unit 1015 has the function of transmitting the operation information of the appliance, acquired from the appliance control unit 1016 by the event detection unit 1013, to the server device 10. The communication unit 1015 also has the function of receiving the notification information from the server device 10 and outputting the notification information thus received to the control unit 1011.

The functions of the communication unit 1015 are realized by the CPU of the server device 10 executing the programs stored in the storage unit 1012.

(Appliance Control Unit 1016, Main Component 1017)

The appliance control unit 1016 has the function of controlling the main component 1017 to achieve the functions thereof. The appliance control unit 1016 also has the function of outputting, to the event detection unit 1013, the operation information at the time of the control for achieving the functions of the appliance as well as the operation information received from the appliance.

The functions of the appliance control unit 1016 are realized by the CPU of the server device 10 executing the programs stored in the storage unit 1012.

The primary element of the main component 1017 is the main hardware 1018.

The main hardware 1018 is connected to and controlled by the appliance control unit 1016. Under the control of the appliance control unit 1016, the main hardware 1018 enables the appliance 1002 as an electronic device to achieve the functions of the electronic device. For example, when the appliance 1002 is an air conditioner, the main hardware 1018 is composed of a compressor, a heat exchanger, a fan, and so on, which achieves the functions of the air conditioner.

(GW1001)

The GW 1001 is, for example, a router device, and has the function of transmitting, to the server device 10, information of operations of the appliance located within the house and connected to the GW 1001 via the network 20. The GW 1001 also has the function of receiving the notification information from the server device 10 and outputting the notification information to the appliance located within the house.

<1.3 Operations>

First, the following explains a procedure by which the information provider using the information provider server 30 registers the setting information 900, which is related to the information to be provided, into the notification information table 1100 in the notification information DB 122 in the server device 10.

Figure 12:
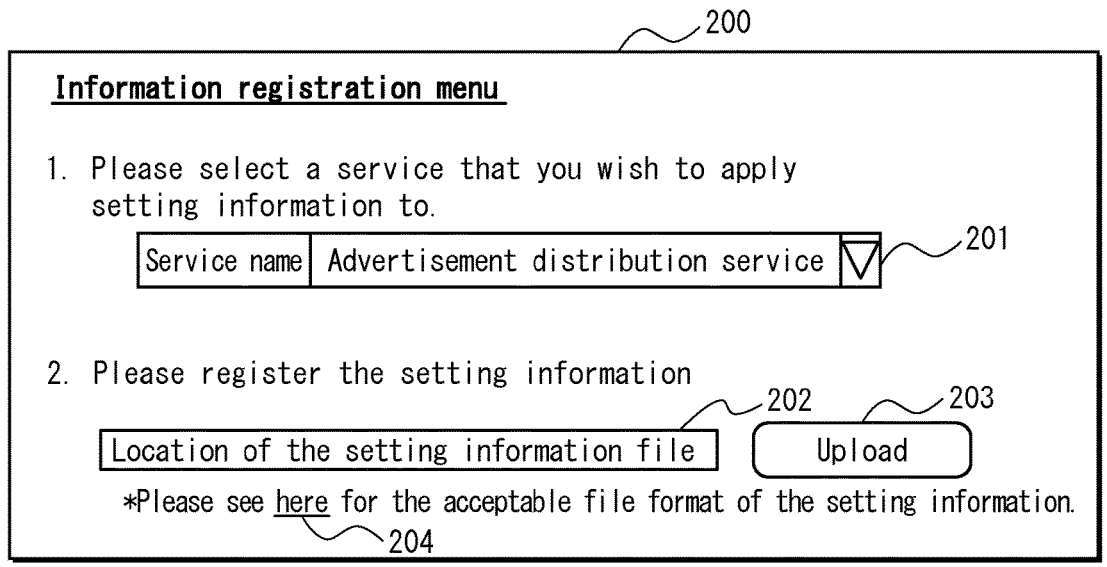
FIG. 12 illustrates an example user interface (UI) used by an information provider when setting conditions for providing information.

FIG. 12 illustrates an example user interface (UI) used by the information provider when setting the setting information 900 to the server device 10 by using the information provider server 30.

The information provider registers the setting information 900 by operation from an information registration menu 200 shown in the drawing. The setting information 900 is registered into the notification information DB 122 provided for each of the services shown in the service information table 1000.

The service name selection field 201 shows the names of the services specified in the service information table 1000. The information provider selects one from among the services. The drawing shows an example case the advertisement distribution service is selected. Subsequently, the information provider selects a setting information file defining the settings to be applied to the selected service. Specifically, the information provider inputs the file name of the data file containing the setting information 900 into the field 202 for specifying the setting information file and presses the upload button 203. In response to this operation, the setting information 900 specified by the file name is transmitted to the server device 10, and is written into the notification information table 1100 in the notification information DB 122. When the information provider clicks on the "here" link 204, the format of the setting information 900 shown in FIG. 4 appears.

The following explains the operations of the information notification system 1 on the assumption that the notification information table 1100 in the server device 10 stores the setting information 900 transmitted by each of a plurality of information provider according to the above-described procedure.

Figure 13:
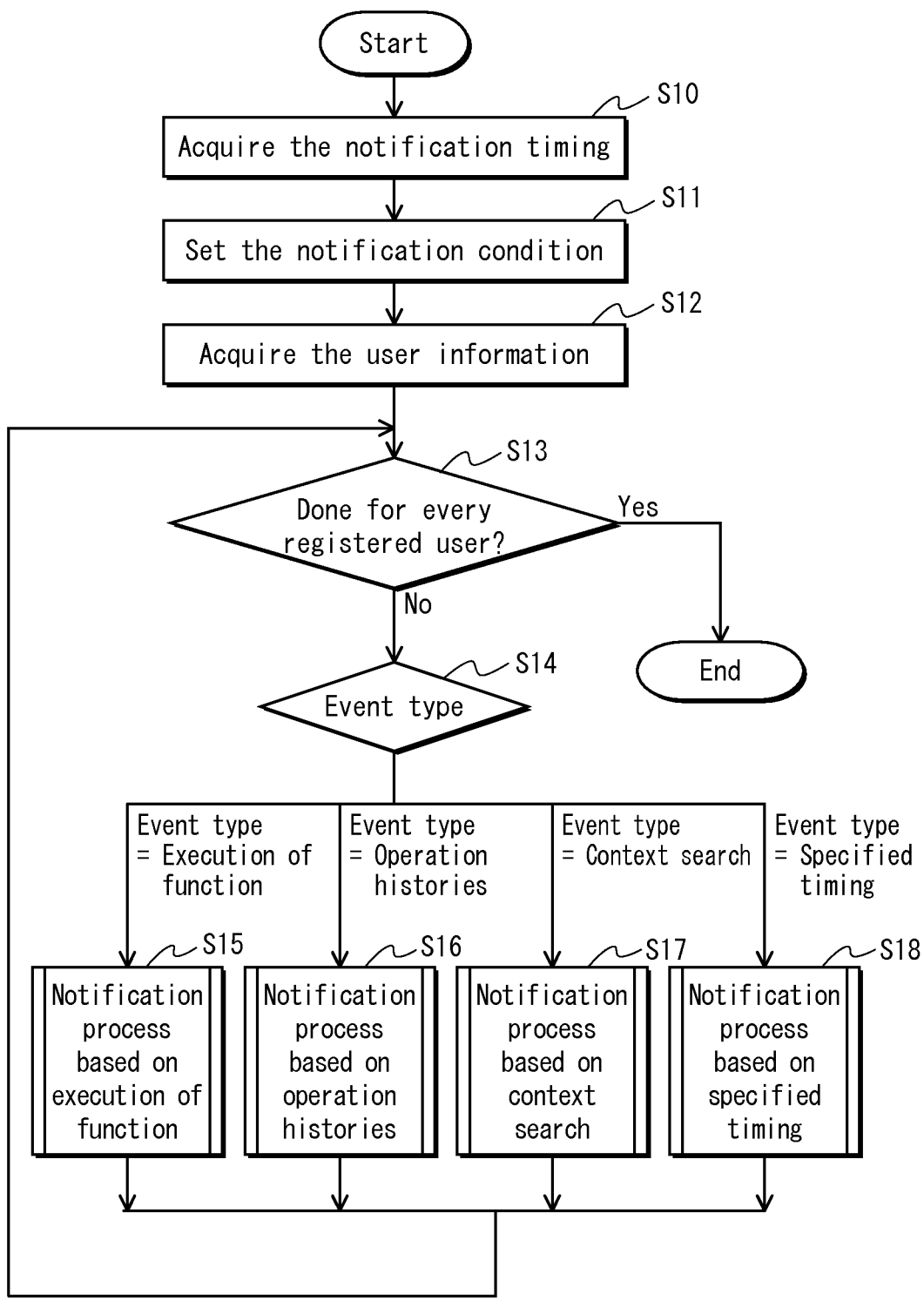
FIG. 13 is a flowchart for a notification process performed by a server device 10.

FIG. 13 is a flowchart for a notification process performed by the server device 10.

First, the setting unit 105 of the server device 10 refers to the notification information table 1100 stored in the notification information DB 122, and retrieves information from Notification timing 1160 with respect to each of the information provider identified by Name 1110 (Step S10).

Next, the setting unit 105 refers to the notification condition information table 1500, and retrieves information specified in Notification Condition 1530 with respect to each of the notification timings specified in Notification timing 1160, and determines the information as the notification condition (Step S11).

Subsequently, the target user determination unit 104 reads out the information specified in Area 1120 through Usage rate 1150, and specifies a user satisfying the conditions specified in Area 1120 through Usage rate 1150 (Step S12). Specifically, the target user determination unit 104 refers to the user information table 1200 of the user information DB 124, and when any condition is specified in Area 1120 for example, determines whether the user is located within the area satisfying the condition specified in Area 1120 according to the Postal code 1230 and Address 1240 in the user information table 1200. When any condition is specified in Appliance type 1130, the target user determination unit 104 refers to the Appliance ID 1250, and determines whether any appliance satisfying the condition is registered. When any condition is specified in Usage period 1140, the target user determination unit 104 refers to Registration date 1260, and determines whether the condition specified in Usage period 1140 is satisfied by comparing the registration date with the current date. When any condition is specified in Usage rate 1150, the target user determination unit 104 refers to the operation history information table 1400 in the operation history DB 125, obtains the usage rate of the corresponding appliance, and determines whether the usage rate thus obtained satisfies the condition specified in Usage rate 1150. The target user determination unit 104 determines the user satisfying all the conditions to be the user to be provided with the notification.

Subsequently, the determination unit 106 determines whether the above-described steps have been performed as to every registered user (Step S13). When the above-described steps have been completed as to every registered user (Step S13: YES), the notification process is terminated.

When the above-described steps have not been completed as to every registered user (Step S13: NO), the notification process continues.

The determination unit 106 refers to Event type 1520 of the notification condition information table 1500 according to the notification condition that has been set by the setting unit 105, and specifies the event type (Step S14). The determination unit 106 performs different kinds of notification depending on the event type.

When the event type is "Execution of function" (Step S14: Event type=Execution of function), the determination unit 106 performs a notification process based on the execution of a function (Step S15).

When the event type is "Operation histories" (Step S14: Event type=Operation histories), the determination unit 106 performs a notification process based on operation histories (Step S16).

When the event type is "Context search" (Step S14: Event type=Context search), the determination unit 106 performs a notification process based on a context search (Step S17).

When the event type is "Specified timing" (Step S14: Event type=Specified timing), the determination unit 106 performs a notification process based on a specified timing (Step S18).

The following explains the notification process based on execution of a function, the notification process based on operation histories, the notification process based on a context search and the notification process based on a specified timing, one by one.

(Notification Process Based on Execution of Function)

Figure 14:
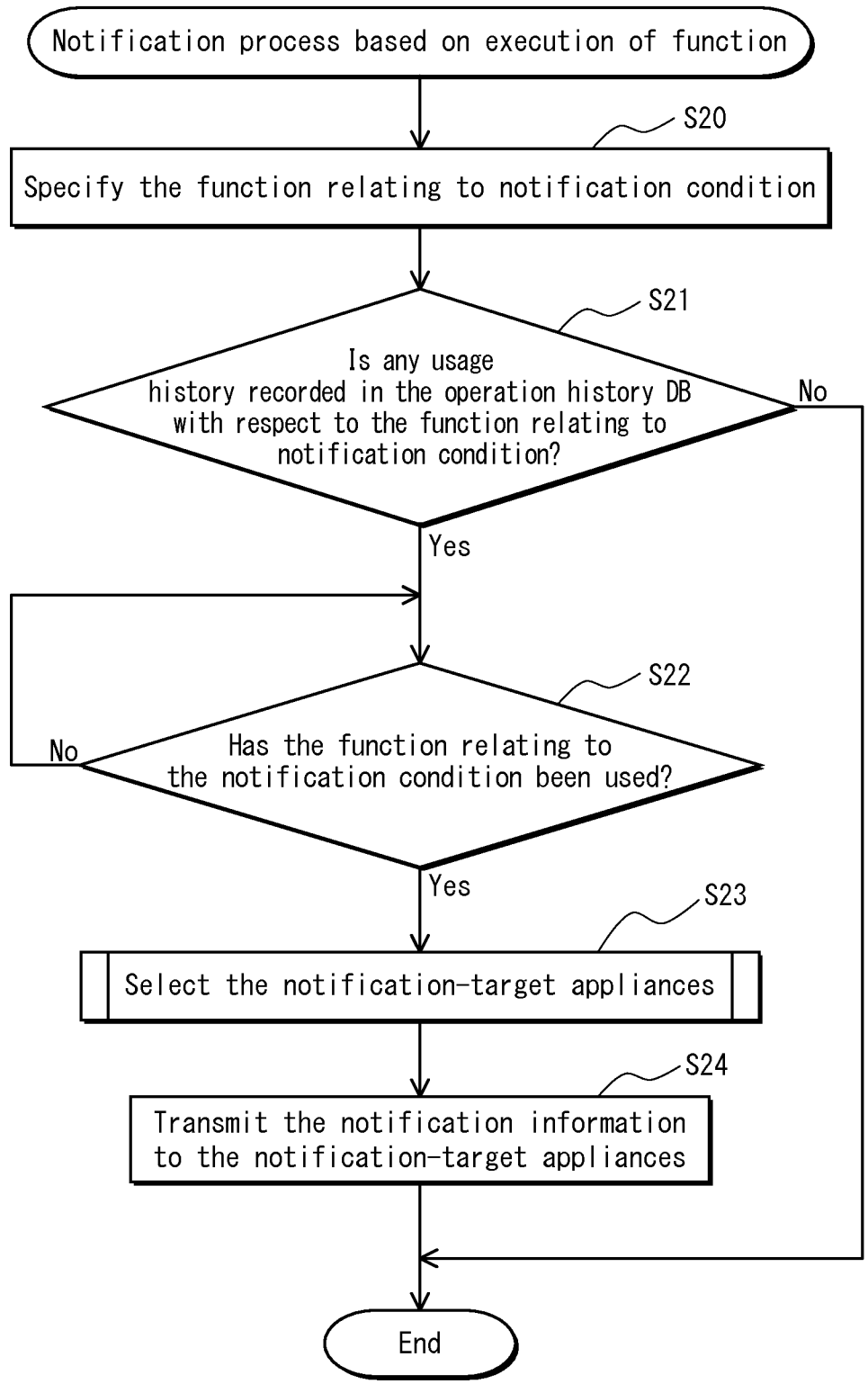
FIG. 14 is a flowchart for a notification process based on execution of a function.

FIG. 14 is a flowchart for a notification process based on execution of a function.

The notification process based on the execution of a function is performed when the event type specified in Event type 1520 of the notification condition information table 1500 is "Execution of function".

The determination unit 106 specifies a function relating to the notification condition specified in Notification condition 1530 of the notification condition information table 1500 (Step S20). Note that notification conditions targeted at this stage are only those associated with the event type "Execution of function". Subsequently, the determination unit 106 refers to the operation history information table 1400 in the operation history DB 125, and determines whether any usage history is recorded with respect to the function relating to the notification condition (Step S21).

When determining that the operation history information table 1400 contains any usage history with respect to the function relating to the notification condition (Step S21: YES), the determination unit 106 monitors operation information of the appliance acquired by the acquisition unit 103, and every time new information is added to the operation history information, determines whether the function relating to the notification condition has been used (Step S22).

When the function relating to the notification condition is used (Step S22: YES), the selection unit 107 performs selection of the notification-target appliances to be provided with the notification information specified in Notification contents 1170 (Step S23). The process of selecting the notification-target appliance will be described later.

In the case of NO in Step S22, Step S22 will be repeated until the function relating to the notification condition is used.

On completion of Step S23, the control unit 101 transmits the notification information specified in Notification contents 1170 to the appliances selected in Step S23 via the communication unit 108 (Step S24). Each appliance having received the notification information from the server device 10 provides the users with the notification information via the notification unit 1014.

Meanwhile, in the case of NO in Step S21, the notification process is terminated, and the steps from Step S13 in FIG. 13 are performed again.

(Notification Process Based on Operation Histories)

Figure 15:
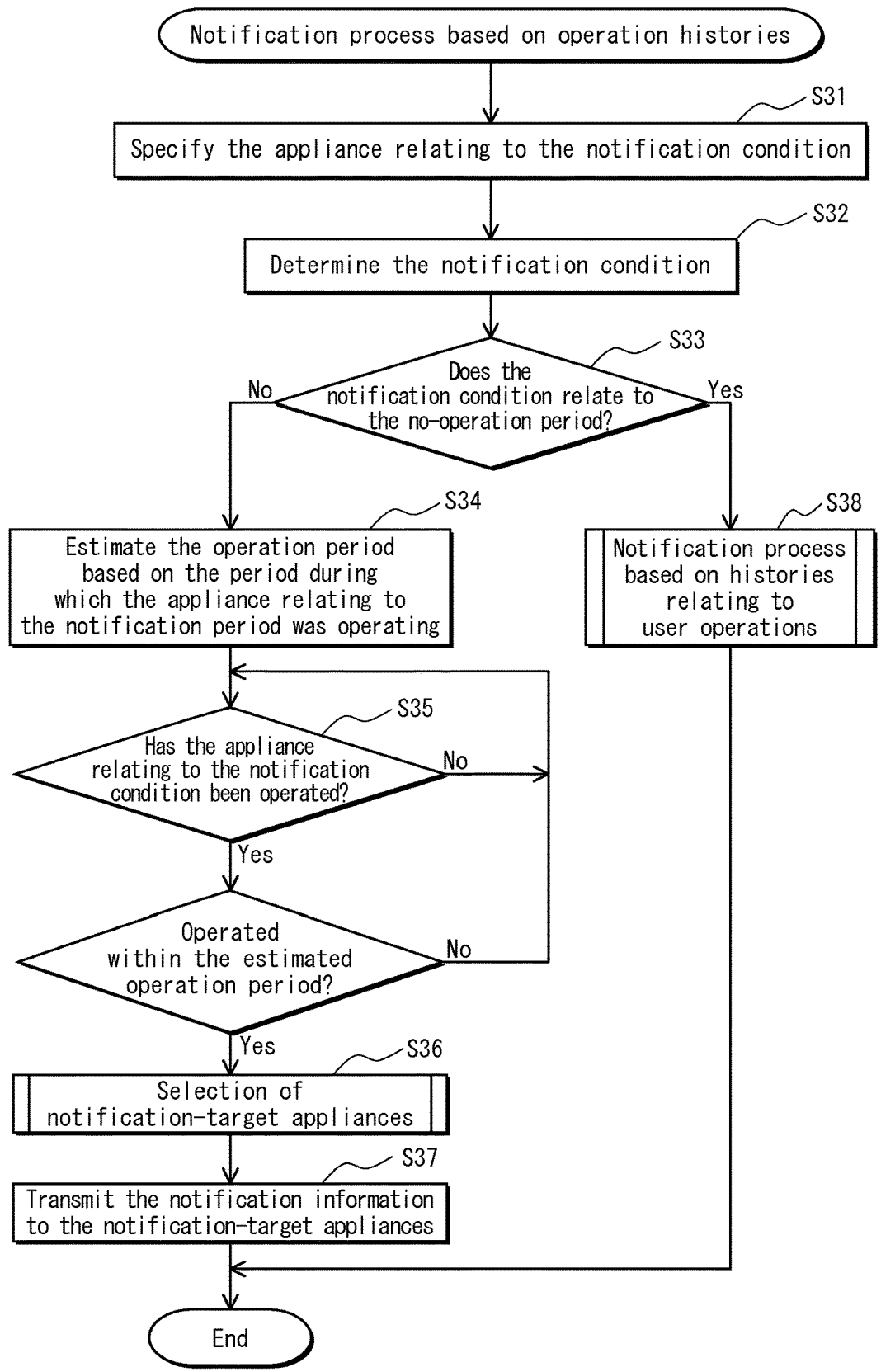
FIG. 15 is a flowchart for a notification process based on operation histories.

FIG. 15 is a flowchart for the notification process based on operation histories.

The determination unit 106 specifies an appliance relating to the notification condition specified in the Notification Condition 1530 of the notification condition information table 1500 (Step S31). Note that the notification conditions targeted at this stage are only those associated with the event type "Operation histories". The determination unit 106 also determines the notification condition according to Notification Condition 1530 (Step S32).

Next, the setting unit 105 retrieves information specified in Notification Condition 1530, and determines the information as the notification condition (Step S32).

The determination unit 106 determines whether the notification condition thus determined relates to a no-operation period (Step S33). Specifically, when the information specified in Notification Condition 1530 contains a character string "No-operation period", the determination unit 106 determines that the notification condition relates to a no-operation period.

In the case of YES in Step S33, a notification process based on histories relating to user operations will be performed (Step S38). The notification process based on histories relating to user operations will be described later.

Meanwhile, in the case of NO in Step S33, the determination unit 106 refers to the operation history information table 1400, specifies a period during which the appliance relating to the notification condition was operating, and predicts the regular operation period of the appliance (Step S34). Specifically, the determination unit 106 specifies a predetermined number of days (e.g. 1 week) from the operation histories of the appliance stored in the operation history information table 1400, and, for each day, specifies periods during which the appliance operated at least a predetermined number of times (e.g. once) per a predetermined time (e.g. 1 hour). The determination unit 106 determines the specified periods as the operation periods of the appliance.

Subsequently, the determination unit 106 monitors the operation information of the appliance acquired by the acquisition unit 103, and every time new information is added to the operation history information table 1400, determines whether the function relating to the notification condition has been executed (Step S35). When the appliance relating to the notification condition has not been operated (Step S35: NO), the determination unit 106 continues the monitoring, and repeats Step S35.

Meanwhile, when the appliance relating to the notification condition has been operated (Step S35: YES), the determination unit 106 determines whether the time at which the appliance was operated is within the predicted operation period of the appliance (Step S36). In the case of NO in Step S36, the steps from Step S35 are performed again.

Meanwhile, in the case of YES in Step S36, the selection unit 107 performs selection of the notification-target appliances (Step S36).

On completion of Step S36, the control unit 101 transmits the notification information specified in Notification contents 1170 to the appliances selected in Step S36 via the communication unit 108 (Step S37). Each appliance having received the notification information from the server device 10 provides the users with the notification information via the notification unit 1014.

(Notification Process Based on Context Search)

Figure 16:
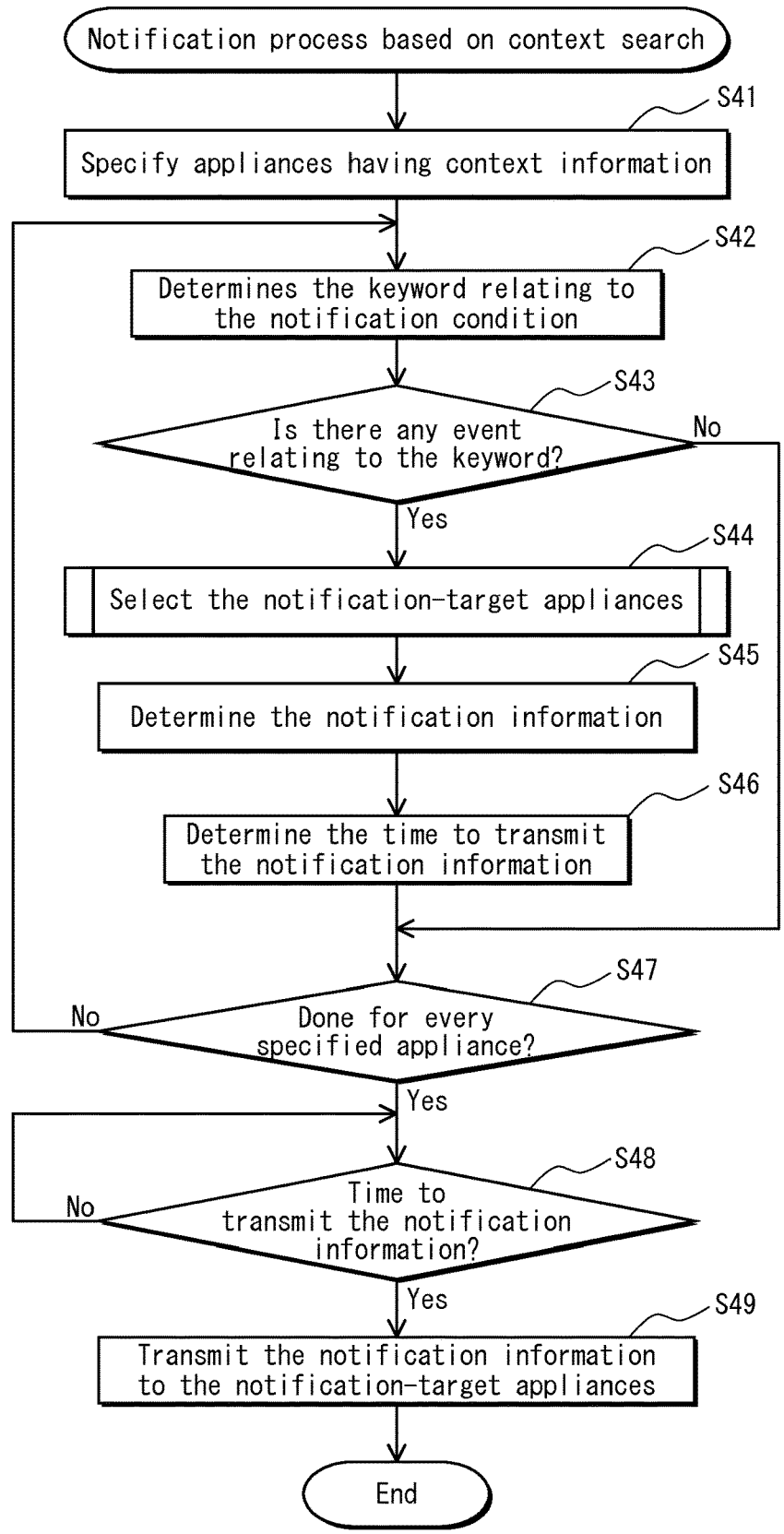
FIG. 16 is a flowchart for a notification process based on a context search.

FIG. 16 is a flowchart for the notification process based on a context search.

The setting unit 105 specifies an appliance having context information (Step S41). Specifically, the setting unit 105 specifies appliances of the user based on Appliance ID 1250 in the user information table 1200. Subsequently, from among the appliances thus specified, the setting unit 105 further specifies an appliance for which "OK" is specified in Context 1350 in the appliance information table 1300, and determines it to be an appliance having context information.

Subsequently, the setting unit 105 retrieves a character string of a keyword from "[Keyword]=(Character string of keyword)" specified in Notification timing 1160 of the notification information table 1100, and determines the character string as the keyword to be searched for (Step S42). In the example shown in FIG. 6, "Poketan" is retrieved from Notification timing corresponding to "AAA cooking class", and determines it as the keyword to be searched for. Note that Poketan is the name of a TV character.

Subsequently, the determination unit 106 refers to the operation history information table 1400, and determines whether the operation histories of the specified appliances contain any operation history relating to the keyword (Step S43). For example, suppose the case where the keyword is "Poketan" and a TV having an appliance identifier "TV0001" has been specified. If this is the case, when the operation histories of the TV contain an operation history showing that the user watched a TV program related to Poketan, the determination unit 106 determines that there is an operation history related to the keyword.

In the case of YES in Step S43, the selection unit 107 performs selection of the notification-target appliances (Step S44).

On completion of Step S44, the control unit 101 refers to the notification information table 1100, retrieves the notification information specified in Notification contents 1170 corresponding to the notification condition, and determines the notification information thus retrieved as the notification information to be transmitted to the specified target appliances (Step S45).

Subsequently, the control unit 101 determines the time to transmit the notification information (Step S46). For example, when the operation history relating to the keyword is viewing of a TV program, the control unit 101 determines the ending time of the TV program as the time to transmit the notification information.

The determination unit 106 determines whether the above-described steps have been performed as to every specified appliance (Step S47). If the above-described steps have not been performed as to every specified appliance (Step S47: NO), the steps from Step S42 are performed again.

Meanwhile, when the above-described steps have been performed as to every specified appliance (Step S48: YES), the control unit 101 determines whether the time to transmit the notification information, the time being set by the determination unit 106, has been reached (Step S48). When determining that the time to transmit the notification information has not been reached (Step S48: NO), the control unit 101 waits until the time. Meanwhile, when determining that the time to transmit has been reached (Step S48: YES), the control unit 101 transmits the notification information specified in Step S45 to the appliances selected in Step S44 via the communication unit 108 (Step S49). Each appliance having received the notification information from the server device 10 provides the users with the notification information via the notification unit 1014.

(Notification Process Based on Specified Timing)

Figure 17:
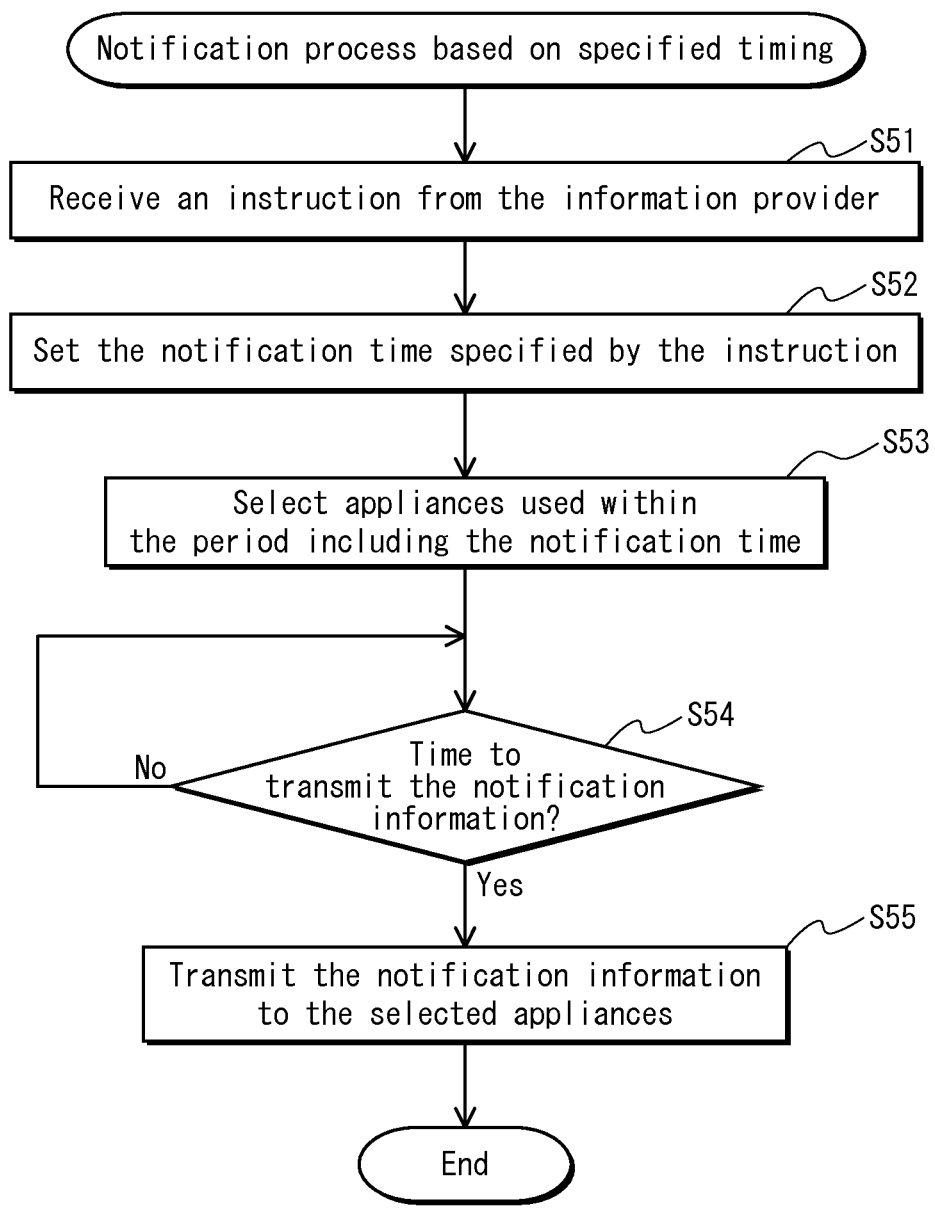
FIG. 17 is a flowchart for a notification process based on specified timing.

FIG. 17 is a flowchart for notification process based on specified timing.

The information provider accesses the server device 10 and specifies the timing of providing information.

The information provider inputs an instruction specifying the timing to the server device 10 by, for example, calling a web application programming interface (WEB API) of the server device 10, which allows for accessing the server device 10 and is displayed by the control unit 101 of the server device 10 executing programs of WEB API stored in the storage unit 102, and inputting the instruction from the WEB API.

The instruction from the information provider includes at least time information indicating the time to provide the notification information.

The control unit 101 receives the instruction that is input according to the above-described manner (Step S51).

The setting unit 105 sets the notification time specified by the instruction received by the control unit 101 (Step S52).

Subsequently, the determination unit 106 refers to the operation history information table 1400 and determines whether any of the appliances were used within a predetermined period in a day including the specified notification time (e.g. from one hour before the notification time to one hour after the notification time), and the selection unit 107 selects the appliances used within the period as determined by the determination unit 106, and determines them as the appliances to which the notification information is to be transmitted (Step S53).

Subsequently, the control unit 101 determines whether the time, determined by the determination unit 106, to transmit the notification information has been reached (Step S54). When determining that the time to transmit the notification information has not been reached (Step S54: NO), the control unit 101 waits until the time. Meanwhile, when determining that the time to transmit has been reached (Step S54: YES), the control unit 101 transmits the notification information to the appliances selected in Step S53 via the communication unit 108 (Step S55). Each appliance having received the notification information from the server device 10 provides the users with the notification information via the notification unit 1014.

(Notification Process Based on User Operation Histories)

This process (Step S38 in FIG. 15) is performed when it is determined in Step S33 in FIG. 15 that the notification condition relates to the no-operation period.

Figure 18:
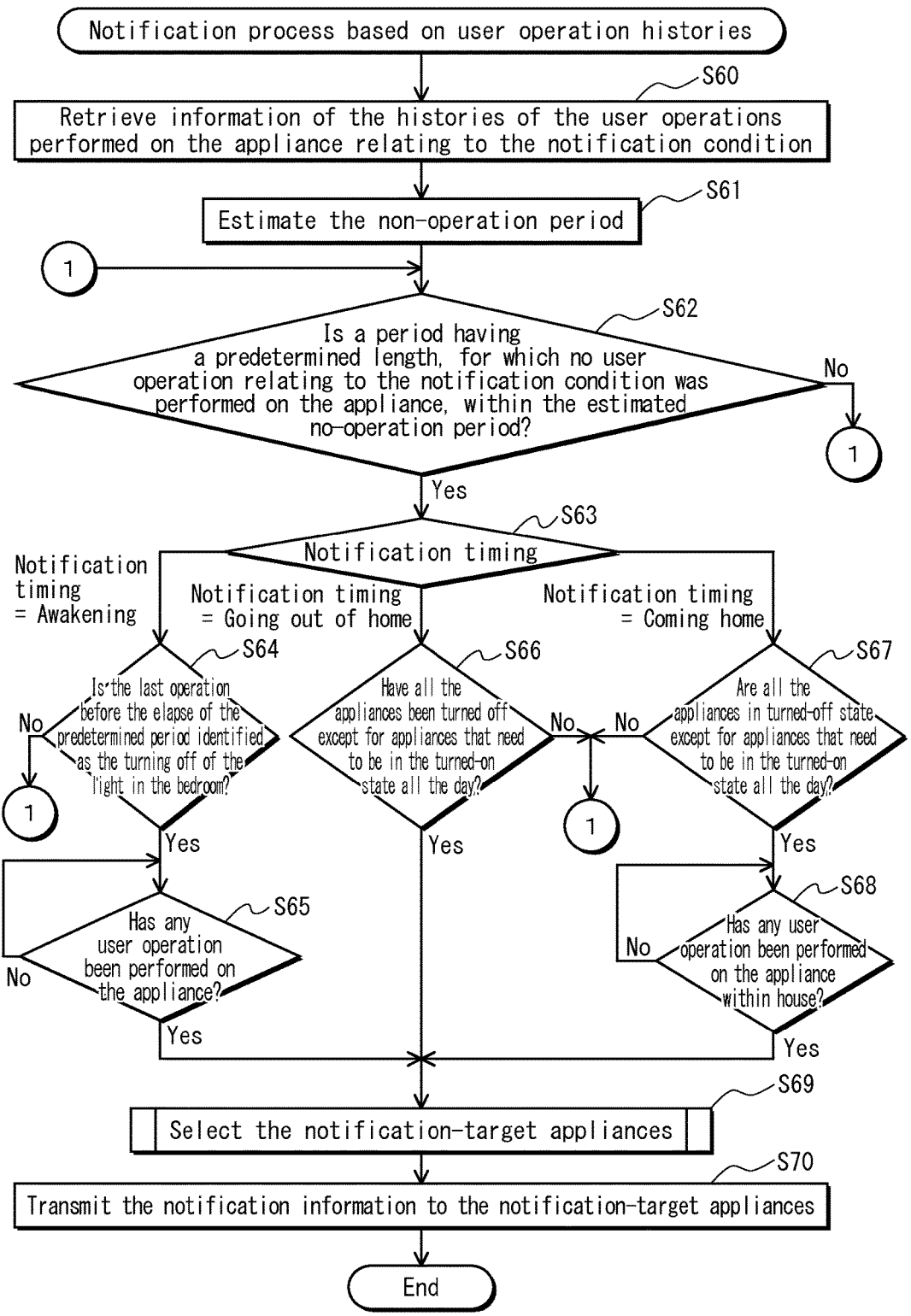
FIG. 18 is a flowchart for a notification process based on user operation histories.

FIG. 18 is a flowchart for notification process based on user operation histories.

The determination unit 106 refers to the operation history information table 1400, and retrieves information of histories of user operations performed on the appliance relating to the notification condition (Step S60). Specifically, the determination unit 106 retrieves operation histories for which "Operation" is specified in Type 1440 in the operation history information table 1400. The determination unit 106 classifies the operation histories according to date, and estimates the non-operation period according to the times at which the appliance was operated (Step S61).

Specifically, the determination unit 106 determines the no-operation period in the following manner, for example.

First, the determination unit 106 classifies the operation histories within a predetermined period (e.g. one week) according to date. Then, the determination unit 106 specifies, for each day, periods during which the appliance relating to the notification conditions was operating and periods during which the appliance was not operating.

Figure 19:
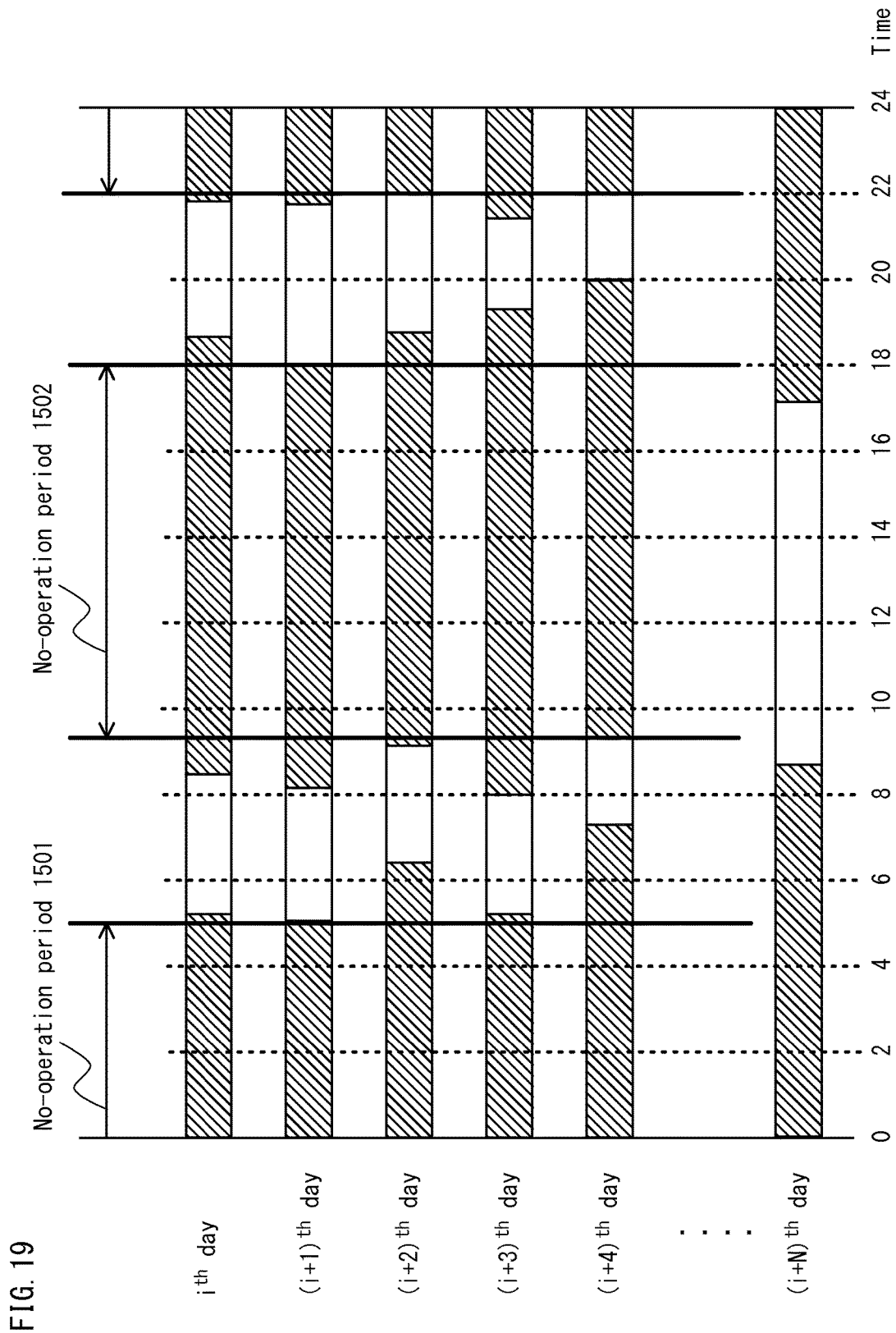
FIG. 19 is a diagram illustrating periods during which an appliance relating to notification conditions was operating and periods during which the appliance was not operating.

FIG. 19 is a diagram illustrating the periods during which the appliance relating to notification conditions was operating and the periods during which the appliance was not operating. The horizontal axis shows time from 0:00 to 24:00 and the vertical axis shows separate days. The shaded portions in the figure represent the periods during which the appliance was not being operated, and the unshaded portions represent the periods during which the appliance was being operated. For example, on the $(i+1)^{th}$ day, the appliance was not being operated from 0:00 to 5:00, 8:10 to 18:00 and 21:50 to 24:00. In this way, the detection unit 106 first specifies the periods during which the appliance was not being operated with respect to each day, and then specifies the common periods during which the appliance was not being operated in any of the days. Since it is expected that the user's action pattern is different between weekdays and holidays, the present embodiment predicts the no-operation periods by using the operation histories on weekdays. Suppose that the $i^{th}$ day is Monday and the $(i+4)^{th}$ day is Friday. In the example shown in FIG. 19, on each of the $i^{th}$ to $(i+4)^{th}$ days, the appliance was commonly not being operated during the period from 22:00 to 5:00 and the period from 9:10 to 18:00.

The determination unit 106 determines that the period from 22:00 to 5:00 as a no-operation period 1501 and the period from 9:10 to 18:00 as a no-operation period 1502.

Subsequently, the determination unit 106 monitors the operation information of the appliance acquired by the acquisition unit 103, and every time new information is added to the operation history information table 1400, determines whether a predetermined period continuing until the current time (e.g. one hour), for which no user operation relating to the notification condition was performed on the appliance, is within the no-operation period (Step S62). In the case of NO in Step S62, the determination unit 106 continues the monitoring, and repeats Step S62.

In the case of YES in Step S62, the determination unit 106 determines which among "Awakening", "Going out of home" and "Coming home" the condition of the notification timing determined by the setting unit 105 is (Step S63).

When the notification timing is "Awakening", the determination unit 106 refers to the operation history information table 1400 and determines whether no user operation has been performed for a predetermined period within the no-operation period, and whether the last operation performed before the predetermined period is turning off the light in the bedroom (Step S64). In the case of NO in Step S64, the steps from Step S62 are performed again.

Meanwhile, in the case of YES in Step S64, the determination unit 106 monitors operation information of the appliance acquired by the acquisition unit 103, and every time new information is added to the operation history information table 1400, determines whether the appliance owned by the user has been operated (Step S65). In the case of NO in Step S65, the determination unit 106 continues the monitoring, and repeats Step S65.

In the case of YES in Step S65, the selection unit 107 performs selection of the notification-target appliances (Step S69).

Subsequently, upon completion of Step S69, the control unit 101 transmits the notification information to the appliances selected in Step S69, via the communication unit 108 (Step S70).

When the notification timing is "Going out of home", the determination unit 106 refers to the operation history information table 1400, and determines whether the last operation before the beginning of the period determined as the no-operation period is an operation of powering off all the appliances except for appliances that need to be in the turned-on state all the day (S66).

In the case of NO in Step S66, Step S62 is performed again. Meanwhile, in the case of YES in Step S66, Step S69 and Step S70 are performed in the same manner as with when the notification timing is "Awakening".

When the notification timing is "Coming home", the determination unit 106 refers to the operation history information table 1400 and determines whether all the appliances except for appliances that need to be in the turned-on state all the day have been in the turned-off state from the beginning of the period determined as the no-operation period until now (Step S67). In the case of NO in Step S67, Step S62 is performed again. Meanwhile, in the case of YES in Step S62, the determination unit 106 monitors operation information of the appliance acquired by the acquisition unit 103, and every time new information is added to the operation history information table 1400, determines whether any appliances within the house have been operated (Step S68). When no appliance have been operated (Step S68: NO), the determination unit 106 continues the monitoring, and repeats Step S68.

Meanwhile, when any appliances within the house have been operated (Step S68: YES), Step S69 and Step S70 are performed in the same manner as with when the notification timing is "Awakening", and "Going out of home".

(Selection of Notification-Target Appliances)

Selection of notification-target appliances is performed in Step S23 in FIG. 14, Step S36 in FIG. 15, Step S44 in FIG. 16 and Step S69 in FIG. 18.

Figure 20:
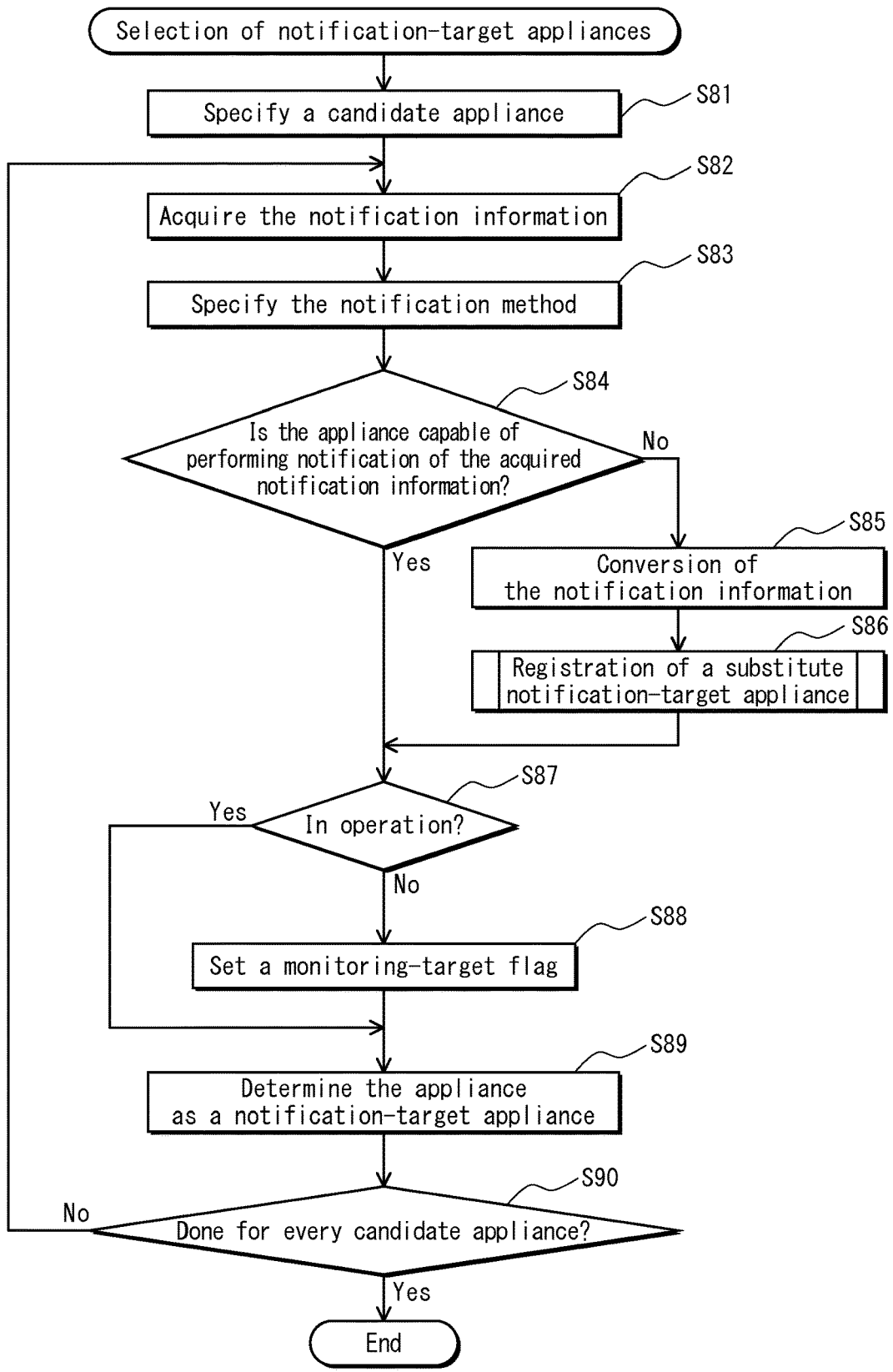
FIG. 20 is a flowchart for selection of notification-target appliances.

FIG. 20 is a flowchart for selection of notification-target appliances.

The selection unit 107 specifies, as a candidate for the destinations of the notification information, an appliance that satisfies the condition specified in Target appliance 1540 of the notification condition information table 1500 from Appliance ID 1250 of the user information table 1200 (Step S81). The selection unit 107 acquires the notification information set by the setting unit 105 (Step S82).

Subsequently, the selection unit 107 refers to Notification method 1340 of the appliance information table 1300, and specifies the notification method to be used for providing the notification information (Step S83). For example, suppose the case where a TV having an appliance identifier "TV0001" has been specified. If this is the case, the selection unit 107 refers to Notification method 1340 of the appliance information table 1300 and specifies the notification method "Browser", "Text", "Light" or "Sound".

Subsequently, the selection unit 107 determines whether the appliance can perform notification of the acquired notification information by using the specified notification method (Step S84). For example, when "http://example.com" is specified in the acquired notification information, the selection unit 107 determines that the appliance can perform the notification if "Browser" is specified as the notification method. When "Light" is specified in the notification information, the selection unit 107 determines that the appliance can perform the notification if "Light" is specified as the notification method.

In the case of NO in Step S84, the selection unit 107 converts the notification information to be in the form that can be provided by the notification method supported by the appliance (Step S85). For example, when "http://example.com" is specified as the notification information and the appliance does not support notification by a browser but supports notification by light, the selection unit 107 converts the notification information to be in the form that can be provided by light. When the appliance supports notification by "Text", the selection unit 107 retrieves notification texts from the contents of "http://example.com", and specifies the texts as the notification information. When the appliance supports notification by "Sound", the selection unit 107 retrieves notification texts from the contents of "http://example.com", and converts the texts into sound, and specifies the sound as the notification information.

Subsequently, the selection unit 107 performs registration of a substitute notification-target appliance that can provide the original notification information in place of the candidate for the destination of the notification information that has been converted (Step S86).
The details of the substitute notification-target appliance will be described later.

In the case of YES in Step S84 or on completion of Step S86, the selection unit 107 refers to the operation history information table 1400 and determines whether the candidate for the destination of the notification information is currently in operation (Step S87). When the candidate appliance for the destination of the notification information is in operation (Step S87: YES), the appliance is determined as the notification-target information (Step S89). When the appliance is not in operation (Step S87: NO), a monitoring-target flag indicating that the appliance is to be monitored with respect to the next operation is set (Step S88), and the appliance is then determined as the notification-target appliance (Step S89).

Subsequently, the selection unit 107 determines whether the above-described steps have been performed as to every appliance specified in Step S81 (Step S90). When Steps S82 through S89 have been performed as to every specified appliance (Step S90: YES), the processing for selection is terminated, and otherwise (Step S90: NO), the steps from Step S82 are performed as to the remaining appliances.

(Registration of Substitute Notification-Target Appliance)
This registration process is performed in case an appliance selected as the notification-target appliance is not provided with a notification method that is appropriate for notifying the user with the original information. In the registration process, an appliance that can perform the notification of the original information is selected from among appliances that are owned by the same user as the notification-target appliances and that have not been specified as the notification-target appliances, and is registered as a substitute notification-target appliance. The original notification information is transmitted to the substitute notification-target appliance. This process is performed in Step S86 in FIG. 20.

Figure 21:
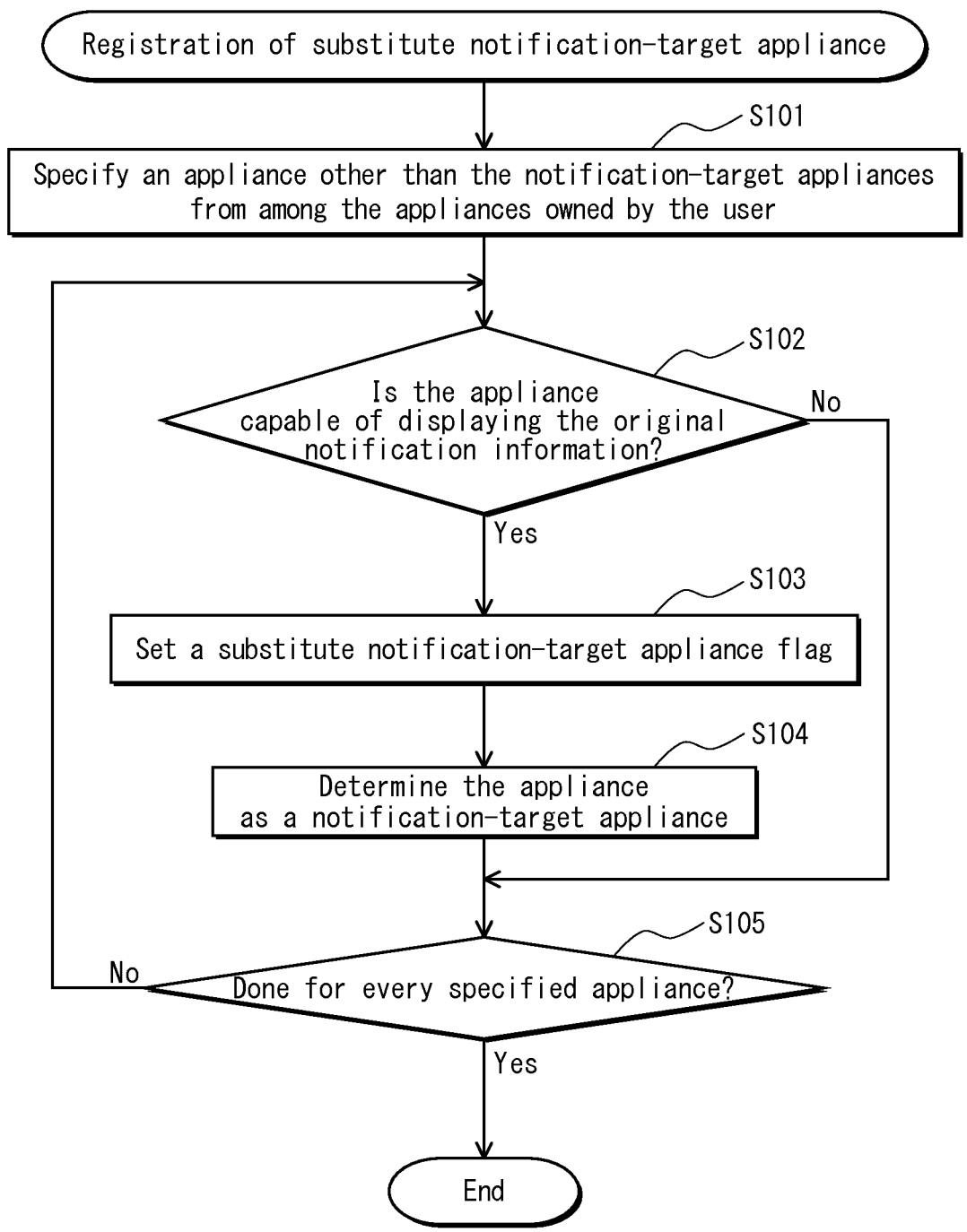
FIG. 21 is a flowchart for registration of a substitute notification-target appliance.

FIG. 21 is a flowchart for registration of a substitute notification-target appliance.

First, the selection unit 107 refers to the user information table 1200, and specifies an appliance that is not a notification-target appliance from among the appliances owned by the user of the notification-target appliances (Step S101).

Subsequently, the selection unit 107 refers to the appliance information table 1300, and determines whether the specified appliance is provided with a notification method suitable for notification of the original notification information (Step S102).

When the specified appliance is provided with a notification method suitable for notification of the original notification information (Step S102: YES), the selection unit 107 sets a substitute notification-target appliance flag to the specified appliance (Step S103) in order to identify the specified appliance as the substitute notification-target appliance, and determines the appliance as the notification-target appliance (Step S104), and proceeds to Step S105.

Meanwhile, when the specified appliance is not provided with a notification method suitable for notification of the original notification information (Step S102: NO), the selection unit 107 skips Steps S103 and S104, and proceeds to Step S105.

The selection unit 107 determines whether the above-described steps have been performed as to every appliance specified in Step S101 (Step S105).

The selection unit 107 determines whether the above-described steps have been performed as to every appliance specified in Step S101 (Step S105). When Steps S102 through S104 have been performed as to every specified appliance (Step S105: YES), the processing for registration is terminated, and otherwise (Step S105: NO) the steps from Step S102 are performed as to the remaining appliances.
(Notification to Appliance with Monitoring-Target Flag)

Subsequently, the following explains a notification process by which the notification information is transmitted to the appliance to which the monitoring-target flag has been set in Step S88 in FIG. 20.

The appliance with the monitoring-target flag is an appliance to which the server device 10 could not transmit the notification information because it was not in operation when the server device 10 made an attempt to transmit the notification information.

This process is performed for transmitting the notification information to such an appliance at an appropriate timing.

Figure 22:
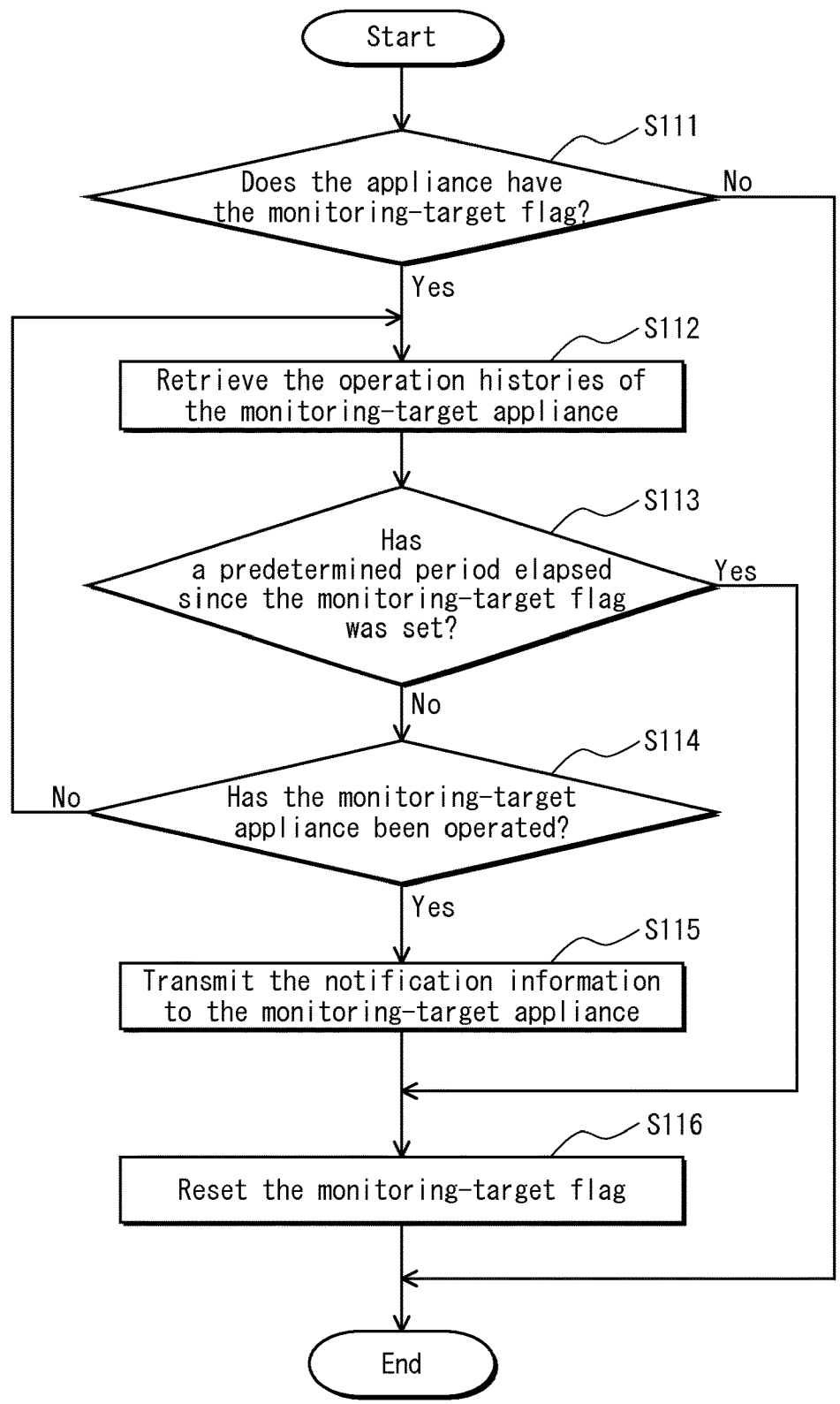
FIG. 22 is a flowchart for providing notification information to a monitoring-target appliance.

FIG. 22 is a flowchart for providing notification information to a monitoring-target appliance.

The determination unit 106 determines whether the appliance selected as a notification-target appliance by the selection unit 107 is an appliance with the monitoring-target flag (Step S111). When the appliance is not with the monitoring-target flag (Step S111: NO), this process is terminated.

Meanwhile, when the appliance is with the monitoring-target flag (Step S111: YES), the determination unit 106 refers to the operation history information table 1400, and retrieves operation histories of the appliance with the monitoring-target flag (Step S112).

Subsequently, the determination unit 106 determines whether a predetermined period has elapsed since the monitoring-target flag was set to the appliance (Step S113). When the predetermined period has elapsed (Step S113: YES), the control unit 101 resets the monitoring-target flag, and excludes this appliance from the monitoring target appliances (Step S116). This is because the notification information might lose its value after elapse of time. For example, suppose the case of an advertisement of special offers available for a limited time. Such information does not need to be provided to the user after the elapse of a predetermined period. Considering this, the predetermined period is set to the period until the notification information loses its value.

Meanwhile, when the predetermined period has not elapsed (Step S113: NO), the determination unit 106 monitors the operation information of the appliance acquired by the acquisition unit 103, and every time new information is added to the operation history information, determines whether the appliance with the monitoring-target flag has been operated (Step S114).

When the appliance with the monitoring-target flag has not been operated (Step S114: NO), the steps from Step S112 are performed again. Meanwhile, when the appliance with the monitoring-target flag has been operated (Step S115: YES), the control unit 101 transmits the notification information to the appliance with the monitoring-target flag via the communication unit 108 (Step S115). Each appliance having received the notification information from the server device 10 provides the users with the notification information via the notification unit 1014.

Upon completion of the transmission of the notification information, the control unit 101 resets the monitoring-target flag of this appliance, and excludes the appliance from the monitoring target appliances (Step S116).

<1.4 Summary>

As explained above, the information notification system 1 pertaining to the present embodiment is capable of providing users with notification information at an appropriate timing for each user considering each user's action pattern. The information provider can increase the opportunity for each user to see the notification information, without setting the timing of transmitting the notification information to each user.

2. Embodiment 2

<2.1 Overview>

An information notification system pertaining to the present embodiment is the same as the information notification system 1 pertaining to Embodiment 1 in basic configuration. However, an appliance 1003 pertaining to the present embodiment has the function of receiving feedback information from the user and transmitting the information to the server device 11, in addition to the functions of the appliance 1002 pertaining to Embodiment 1. Furthermore, the server device 11 has the function of receiving the feedback information transmitted by the appliance 1003, in addition to the functions of the server device 10. Based on the feedback information, the server device 11 timely transmits notification information relating to the notification information transmitted in the past.

For example, when the notification information is information about special offers from the BBB supermarket available for a limited time, and the user that has received this notification information submits a feedback showing that the user is interested in this information, the information notification system pertaining to the present embodiment is capable of transmitting the notification information about the special offers from the BBB supermarket again when the user comes close to the BBB supermarket.

In the following, the same components as in the information notification system 1 pertaining to Embodiment 1 are labeled using the same reference signs for simplification of explanation. Note that explanation of the same components as in Embodiment 1 is omitted, and differences are mainly explained below.

<2.2 Configuration>

(Appliance 1003)

Figure 23:
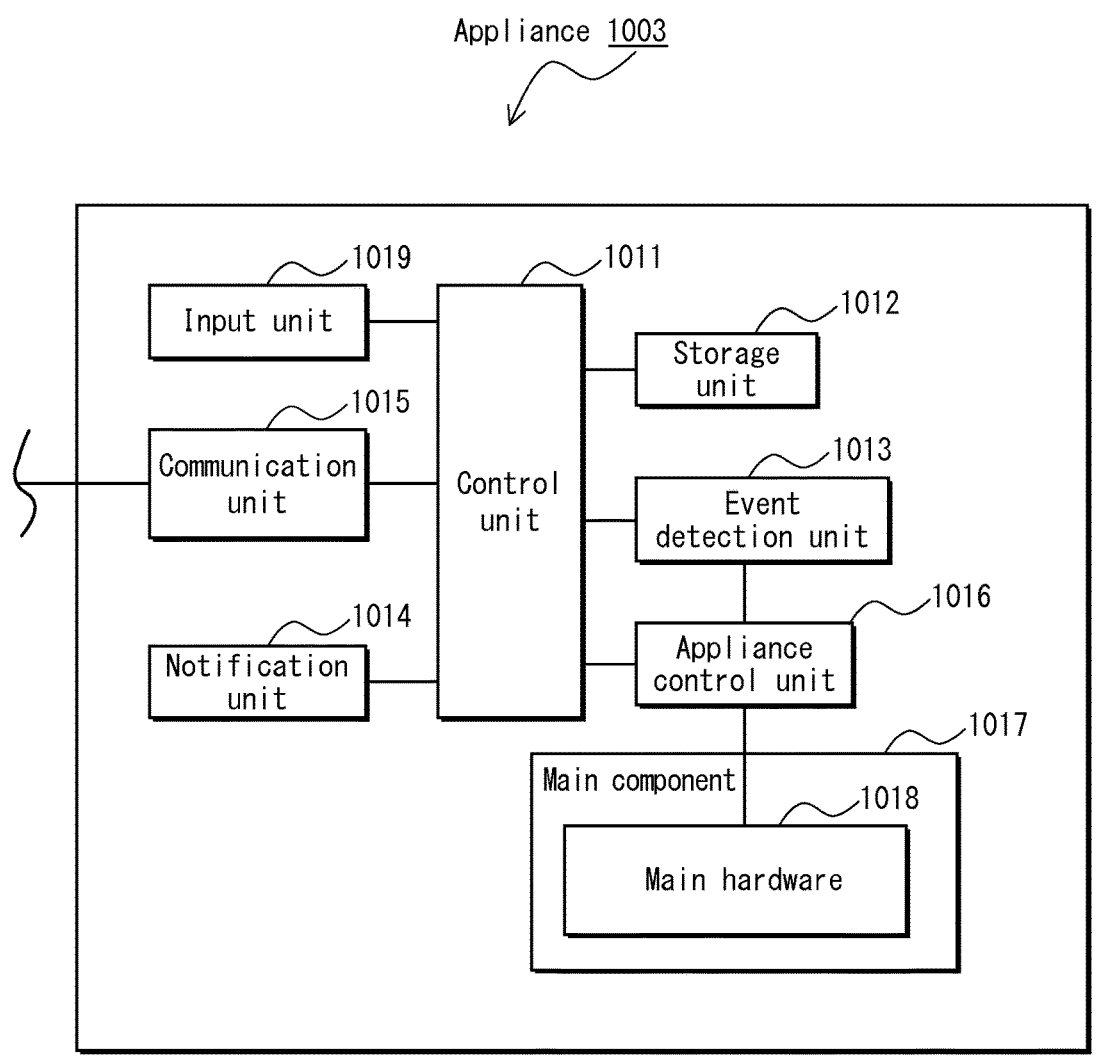
FIG. 23 is a functional block diagram illustrating primary components of an appliance 1003.

FIG. 23 is a functional block diagram illustrating primary components of the appliance 1003.

The appliance 1003 has an input unit 1019 in addition to the components of the appliance 1002.

The appliance 1003 is, for example, a portable terminal device. The portable terminal device has a receiver for a satellite positioning system (e.g. global positioning system (GPS)), and has the function of transmitting the information containing its position, which serves as the operation histories, to the server device 11 at intervals.

Figure 24:
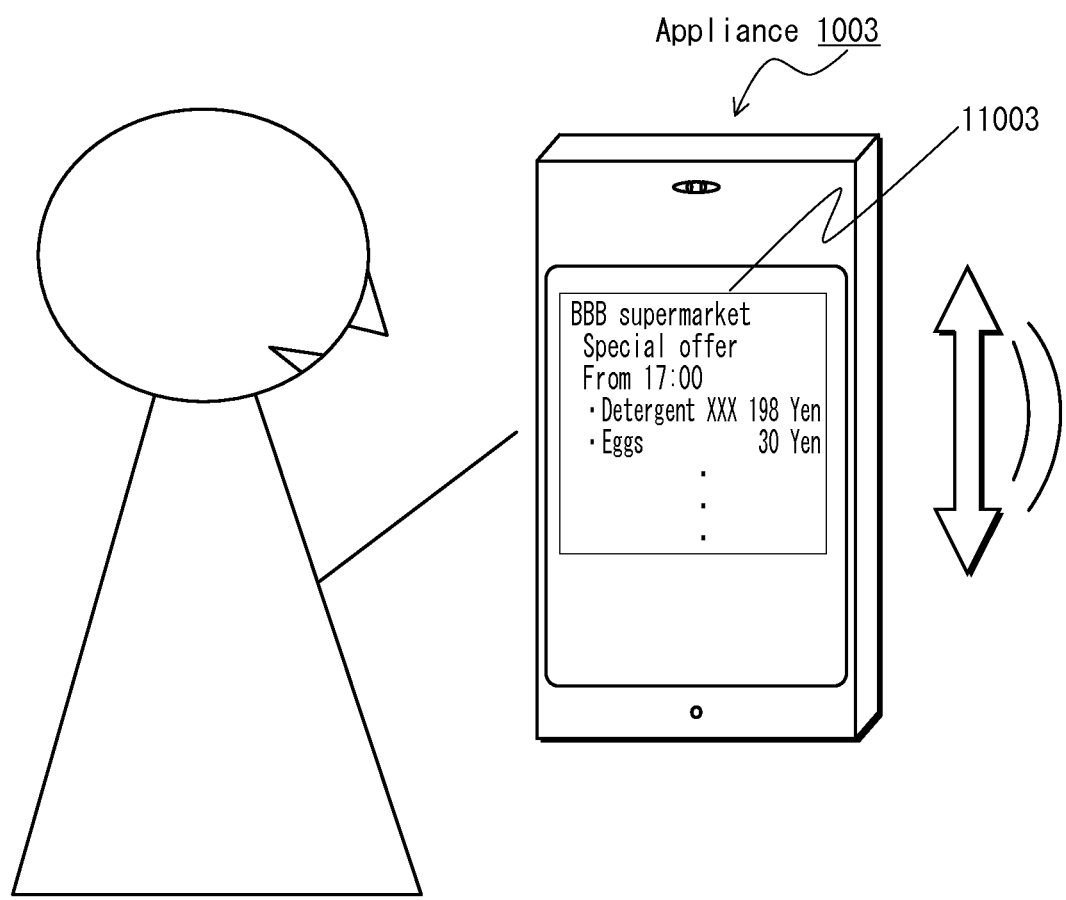
FIG. 24 is an example of a feedback from a user.

The input unit 1019 includes, for example, an acceleration sensor, and has the function of receiving the feedback information by determining, based on an output from the acceleration sensor, whether the user has moved the appliance 1003 in a predetermined manner when the user is notified with information by the notification unit 1014 of the appliance 1003. The movement in the predetermined manner is, for example, shaking the appliance 1003 up and down as shown in FIG. 24 a predetermined number of times (e.g. three times). The functions of the input unit 1019 are realized by the CPU of the appliance 1003 executing the programs stored in the storage unit 1012.

The communication unit 1015 also has the function of notifying the server device 11 when the input unit 1019 receives the feedback information from the user.

(Server Device 11)

Figure 25:
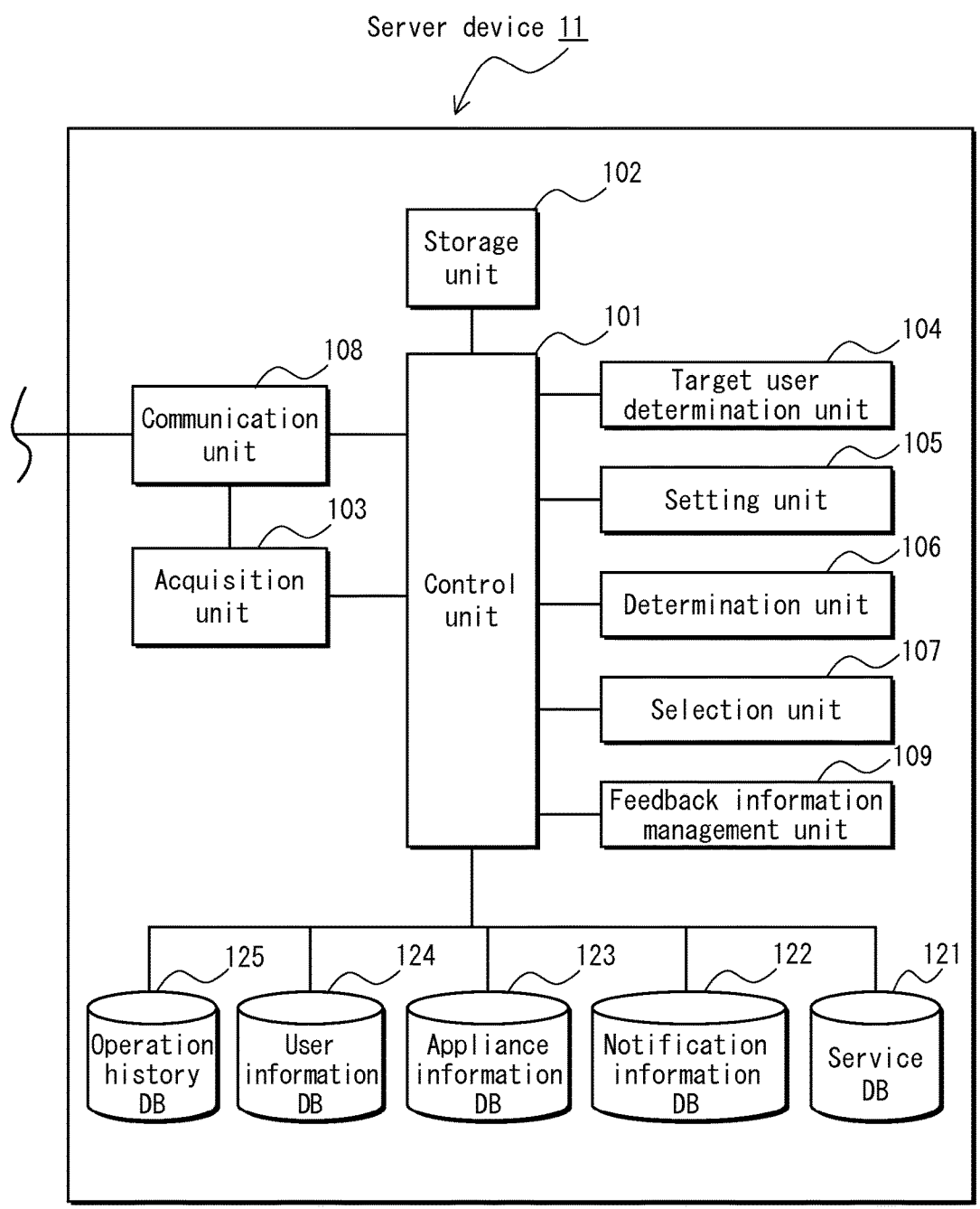
FIG. 25 is a functional block diagram illustrating primary components of a server device 11.

FIG. 25 is a functional block diagram illustrating primary components of the server device 11.

The server device 11 includes a feedback information management unit 109 in addition to the components of the server device 10.

The acquisition unit 103 additionally has the function of receiving the feedback information from the appliance 1003 via the communication unit 108 and outputting the information to the control unit 101.

The feedback information management unit 109 receives, from the control unit 101, the feedback information acquired by the acquisition unit 103, and stores the feedback information in association with the transmitted notification information, together with the reception time of the feedback information. Note that the notification information associated with the feedback information is hereinafter referred to as "notification information specified as favorite information".

The determination unit 106 additionally has the function of performing a reminding process based on a notification information table 1101 when there is notification information specified as favorite information. The notification information table 1101 will be described later. The details of the reminding process will be described later.

The functions of the feedback information management unit 109 and the functions of the determination unit 106 are realized by the CPU of the server device 11 executing programs stored in the storage unit 102.

<2.3 Data Structure>

(Notification Information Table 1101)

FIG. 26 illustrates a data structure and example contents of the notification information table 1101.

The notification information table 1101 contains items of Effective date 1180 and Effective period 1185 in addition to the items of notification information table 1100.

Effective date 1180 is an item specifying a condition relating to the date of transmitting the notification information to the appliances. For example, "Monday to Friday" specified in the figure shows that the notification information is transmitted on Monday to Friday but is not transmitted on Saturday or Sunday. "$25^{th}$ day of each month" shows that the notification information is transmitted on the $25^{th}$ day of each month but is not transmitted on the other days.

Effective period 1185 is an item specifying the condition of the time period within a day during which the notification information is to be transmitted. For example, "10:00-19:00" specified in the figure shows that the notification information can be transmitted within the period of 10:00 to 19:00, but cannot be transmitted in other periods.

<2.4 Operations>

The server device 11 performs the same notification process as the server device 10 pertaining to Embodiment 1. In addition, the server device 11 performs the reminding process when receiving a feedback from the user in response to the transmitted notification information. The reminding process can be a reminding process A or a reminding process B. The reminding process A is performed when the condition about the notification area is specified in Area 1120 of the notification information table 1101, and the reminding process B is performed when no condition about the notification area is specified.

The following explains the operations for the reminding process performed by the server device 11.

Figure 27:
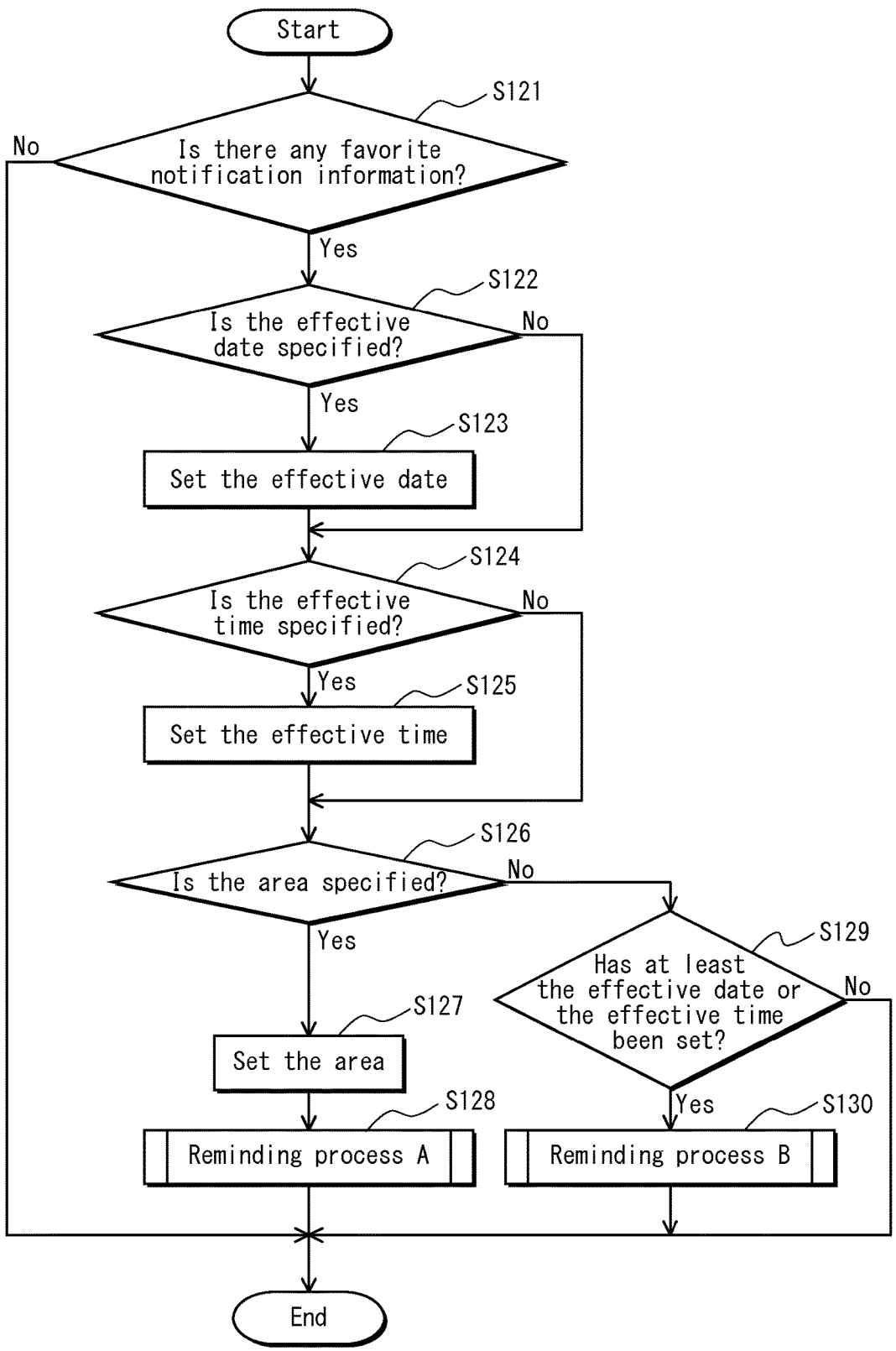
FIG. 27 is a flowchart for a notification process based on favorites setting.

FIG. 27 is a flowchart for the reminding process performed by the server device 11.

First, the determination unit 106 determines whether any notification information is specified as favorite information (Step S121). Specifically, the determination unit 106 determines whether any notification information specified as favorite information is stored in the feedback information management unit 109. If such information is stored in the feedback information management unit 109, the determination unit 106 determines that there is notification information specified as favorite information. When no notification information specified as favorite information is stored in the feedback information management unit 109 (Step S121: NO), the reminding process is terminated.

Meanwhile, when there is notification information specified as favorite information (Step S121: YES), the setting unit 105 refers to the notification information table 1101 and specifies the corresponding notification information. Next, the setting unit 105 determines whether any condition about the effective date is specified in Effective date 1180 of the specified notification information (Step S122). When any effective date is specified (Step S122: YES), the setting unit 105 determines the specified effective date as the condition for the transmission of the notification information (Step S123). Otherwise (Step S122: NO), the setting unit 105 does not set any condition about the effective date.

Subsequently, the setting unit 105 determines whether any condition about the effective period is specified in Effective period 1185 (Step S124). When any effective period is specified (Step S124: YES), the setting unit 105 determines the specified effective period as the condition for the transmission of the notification information (Step S125). Otherwise (Step S124: NO), the setting unit 105 does not set any condition about the effective period.

Furthermore, the setting unit 105 determines whether any condition about the area is specified in Area 1120 (Step S126).

When any area is specified (Step S126: YES), the setting unit 105 determines the specified area as the condition for the transmission of the notification information (Step S127).

The determination unit 106 performs the reminding process A according to the condition set by the setting unit 105 (Step S128).

Meanwhile, when no area is specified (Step S126: NO), the determination unit 106 determines whether at least one of the condition about the effective date and the condition about the effective period has been set by the setting unit 105 (Step S129). When neither the condition about the effective date nor the condition about the effective period has been set (S129: NO), the process is terminated.

Meanwhile, when at least one of the condition about the effective date and the condition about the effective period has been set (Step S129: YES), the determination unit 106 performs the reminding process B.

(Reminding Process A)

The reminding process A is performed in Step S128 in FIG. 27.

Figure 28:
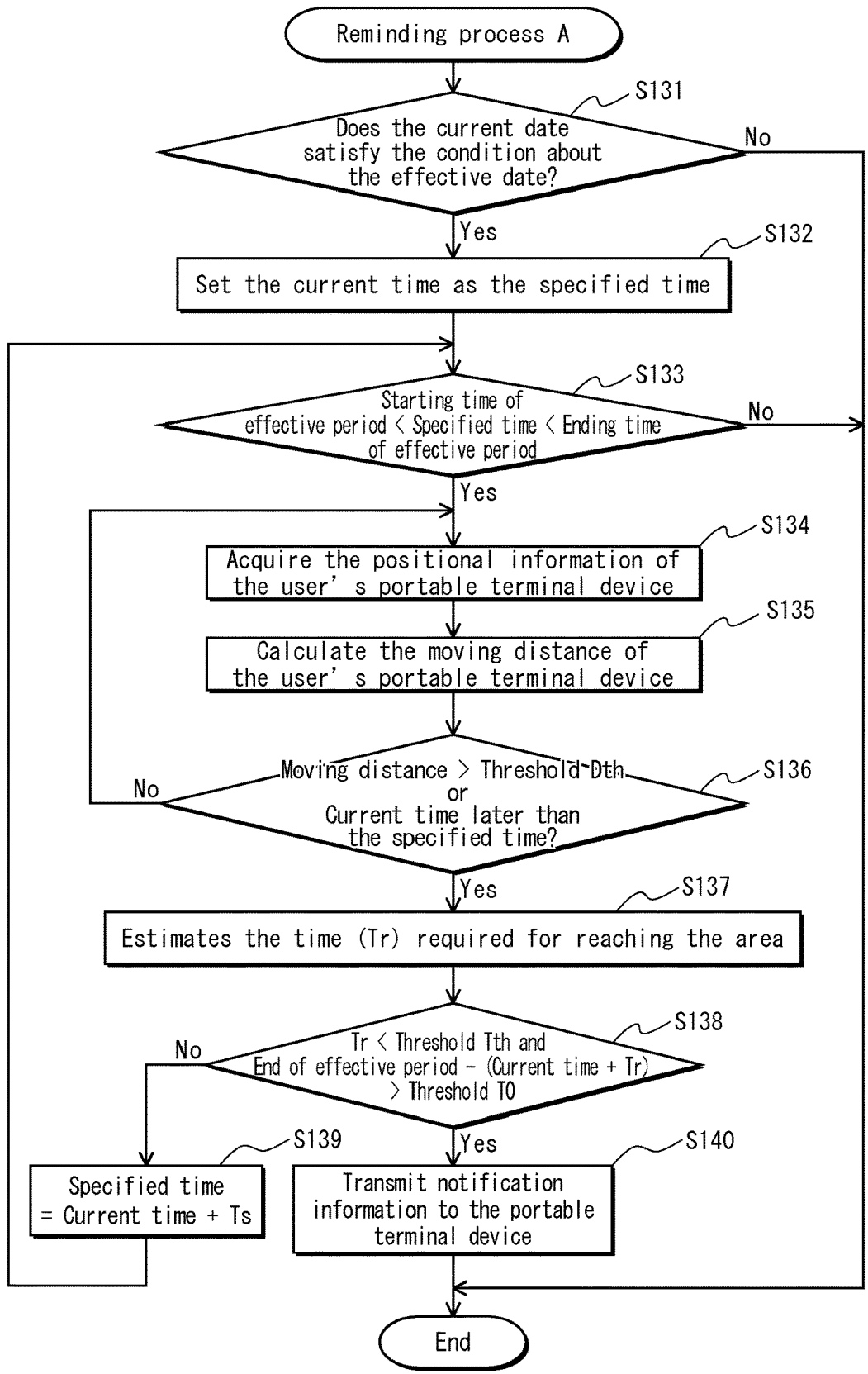
FIG. 28 is a flowchart for a reminding process A.

FIG. 28 is a flowchart for the reminding process A.

First, the determination unit 106 determines whether the current date satisfies the condition about the effective date set by the setting unit 105 (Step S131). Specifically, when the condition about the effective date is "Monday to Friday" and the current date is Tuesday, the determination unit 106 determines that the current date satisfies the condition about the effective date, and when the current date is Saturday or Sunday, the determination unit 106 determines that the current date does not satisfy the condition about the effective date. Note that when no condition is specified about the effective date, the determination unit 106 determines that the condition is satisfied.

In the case of NO in Step S131, the reminding process A is terminated. Meanwhile, in the case of YES in Step S131, the determination unit 106 sets the current time as the specified time (Step S132).

Subsequently, the determination unit 106 determines whether the specified time is within the period specified by the condition about the effective period (Step S133). Specifically, the determination unit 106 determines that the specified time is within the effective period when the specified time is later the starting time of the effective period and earlier than the ending time of the effective period. In the case of NO in Step S133, the reminding process A is terminated.

In the case of YES in Step S133, the determination unit 106 refers to the user information table 1200, and specifies the portable terminal device owned by the user who has submitted the feedback information. The determination unit 106 acquires the positional information of the specified portable terminal device (Step S134). Specifically, the determination unit 106 refers to the operation history information table 1400, and acquires the position recorded as operation histories of the portable terminal device. Then, the determination unit 106 calculates the moving distance of the portable terminal device based on the latest position and the previous position of the portable terminal device (Step S135).

The determination unit 106 determines whether the moving distance calculated in Step S135 is no less than a predetermined threshold value Dth (e.g. 100 m) and determines whether the current time is later than the specified time. When the moving distance is less than the threshold value Dth and when the current time is no later than the specified time (Step S136: NO), the steps from Step S134 are performed again.

In the case of YES in Step S136, the determination unit 106 estimates the time Tr required for reaching the area set by the setting unit 105 (Step S137). Specifically, the determination unit 106 calculates the minimum distance from the current position to the area, for example. Furthermore, the determination unit 106 calculates the moving speed of the portable terminal device from the current position to the area along the shortest path, based on the moving distance calculated in Step S135 and the time required for moving the distance. The required time Tr is obtained by dividing the minimum distance by the moving speed.

Subsequently, the determination unit 106 determines whether the required time Tr is shorter than a threshold value Tth (e.g. 20 minutes), and an estimated time to arrive at the area obtained by adding the required time Tr to the current time is earlier than the time obtained by subtracting a threshold TO (e.g. 30 minutes) from the ending time of the effective period (Step S138).

When determining that the required time Tr is not shorter than the threshold value Tth, or when the estimated time to arrive at the area is not earlier than the time obtained by subtracting the threshold TO from the ending time of the effective period (Step S138: NO), the determination unit adds a predetermined time Ts (e.g. 1 hour) to the current time and sets the time thus obtained to the specified time (Step S139). Then, the steps from Step S133 are performed again.

Meanwhile, in the case of YES in Step S138, the control unit 101 transmits the notification information to the portable terminal device via the communication unit 108 (Step S140). Upon receiving the notification information from the server device 10, the portable terminal device notifies the user of the notification information by using the notification unit 1014.

The above-described steps allow the sever device 10 to transmit the notification information specified as favorite information again to the user when the user comes to a certain distance to the area.

(Reminding Process B)

The reminding process B is performed in Step S130 in FIG. 27.

Figure 29:
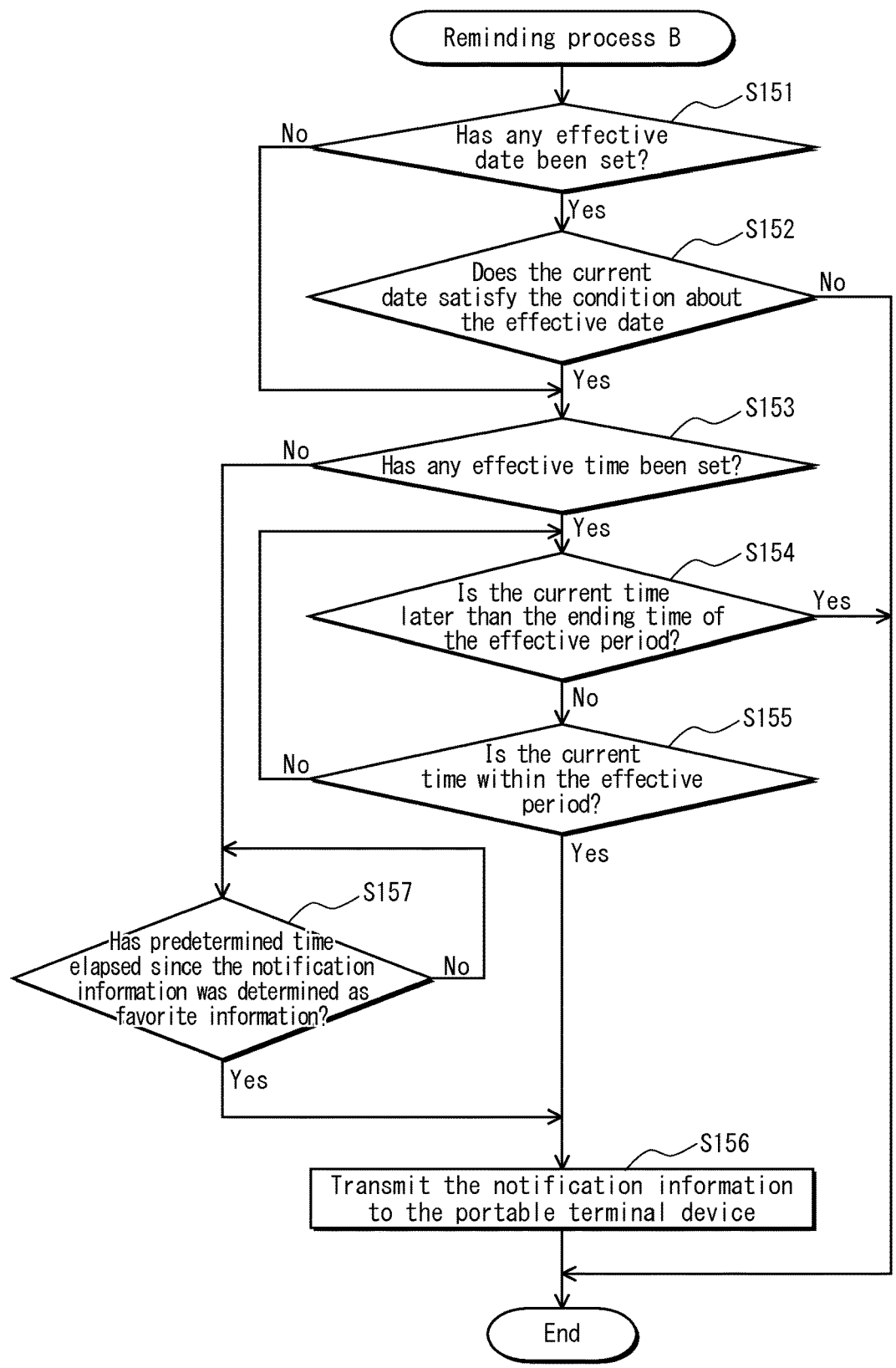
FIG. 29 is a flowchart for a reminding process B.

FIG. 29 is a flowchart for the reminding process B.

First, the determination unit 106 determines whether any condition about the effective date has been set by the setting unit 105 (Step S151). When any condition about the effective date has been set (Step S151: YES), the determination unit 106 determines whether the current date satisfies the condition about the effective date (Step S152). If the current date does not satisfy the condition about the effective date (Step S152: NO), the reminding process B is terminated.

When no condition has been set about the effective date (Step S151: NO) and when the current date satisfies the condition about the effective date (Step S152: YES), the determination unit 106 determines whether any condition about the effective period has been set by the setting unit 105 (Step S153).

When no condition about the effective period has been set (Step S153: NO), the determination unit 106 determines whether a predetermined time (e.g. 1 hour) has elapsed since the notification information was stored in the feedback information management unit 109 in association with the feedback information (Step S157). Specifically, the determination unit 106 calculates the elapsed time by comparing the recorded time with the current time. When the predetermined time has not elapsed (Step S157: NO), the control unit 101 waits until the predetermined time has elapsed. When the predetermined time has elapsed (Step S157: YES), the control unit 101 transmits the notification information to the portable terminal device via the communication unit 108 (Step S156).

Meanwhile, when any condition about the effective period has been set (Step S153: YES), the determination unit 106 determines whether the current time is later than the ending time of the effective period (Step S154). When the current time is later than the ending time of the effective period (Step S154: YES), the reminding process B is terminated. When the current time is not later than the ending time of the effective period (Step S154: NO), the determination unit 106 determines whether the current time is within the effective period. That is, the determination unit 106 determines whether the current time is not earlier than the starting time of the effective period (Step S155). When the current time is not within the effective period (Step S155: NO), the steps from Step S154 are performed again. Meanwhile, when the current time is within the effective period (Step S155: YES), the control unit 101 transmits the notification information to the portable terminal device via the communication unit 108 (Step S156).

<2.5 Summary>

As explained above, the information notification system pertaining to the present embodiment allows the user who has received the notification information from the server device 11 to transmit the feedback information to the server device 11 in response to the received notification information, and accordingly the server device 11 can timely transmit the notification information to the user again based on the feedback information.

<2.6 Modifications>

(1) In the embodiment above, the appliance that notifies the user of the notification information and the appliance from which the user inputs the feedback information in response to the notification information are the same. However, the appliance that notifies the user of the notification information and the appliance from which the user inputs the feedback information in response to the notification information are not necessarily the same. The appliance from which the user inputs the feedback information may be different from the appliance that notifies the user of the notification information insofar as the appliance can transmit the feedback information in response to the notification information transmitted by the server device 11.

Figure 30:
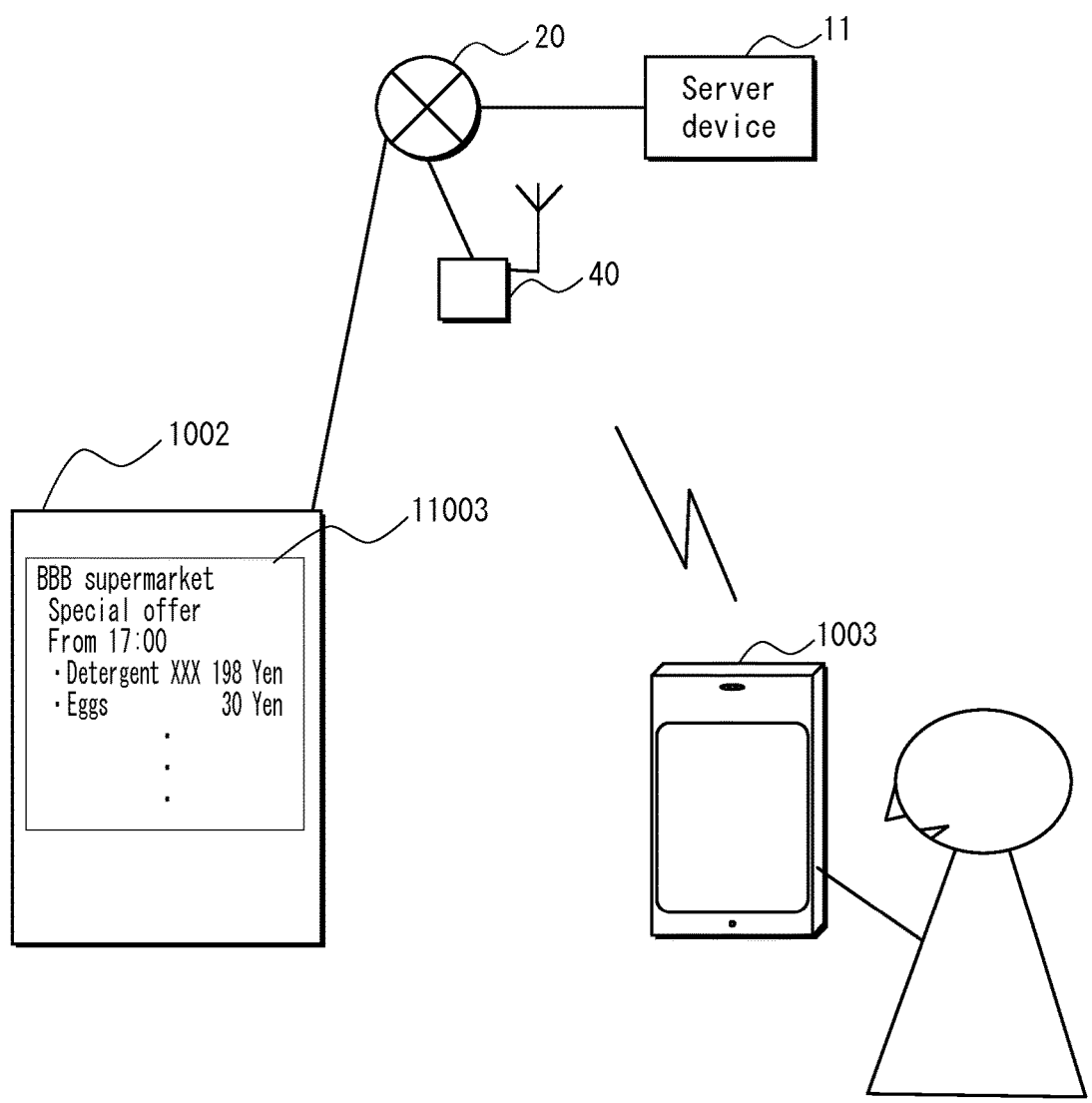
FIG. 30 is a modified example of a feedback from a user.

FIG. 30 is a conceptual diagram showing a modified case where the appliance that notifies the user of the notification information and the appliance from which the user inputs the feedback information in response to the notification information are different.

The notification information from the server device 11 is displayed as notification information 11003 on the appliance 1002. Information showing that the notification information 11003 has been displayed on the appliance 1002 is displayed on the appliance 1003 (e.g. a portable terminal device) owned by the user. The user transmits feedback information from the appliance 1003 in order to indicate whether to register the notification as favorite information. The feedback information from the portable terminal device is transmitted to the server device 11 via a base station 40.

The appliance 1002 may be provided with a button for registering the notification information as favorite information, and the user may press the button when the notification information is provided to the appliance 1002 and thereby submit the feedback information to the server device 11.

(2) In embodiments above, a portable terminal device is explained as an example of the appliance of the user from which the user submits the feedback information. However, the appliance used for submitting the feedback information is not necessarily a portable terminal device. Any device may be used insofar as the device can submit the feedback information to the server device 11 when receiving the notification information from the server device 11. For example, as shown in FIG. 31, the appliance may have the function of transmitting information input by the user.

Figure 31:
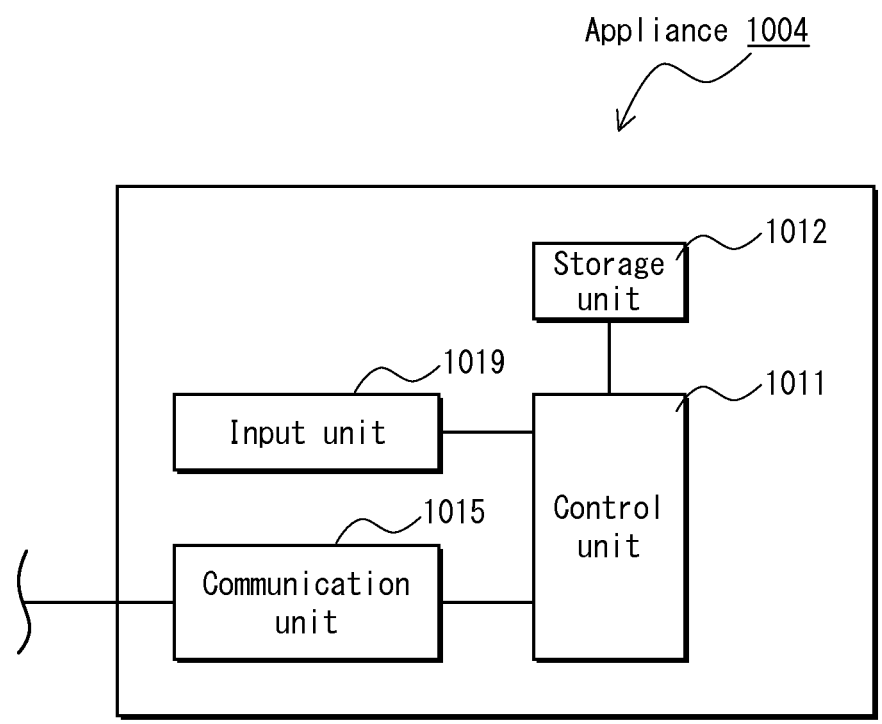
FIG. 31 is a functional block diagram illustrating primary components of an appliance 1004.

FIG. 31 is a functional block diagram illustrating primary components of an appliance 1004 which is a modified example of an appliance used for submitting the feedback information.

The appliance 1004 shown in FIG. 31 includes a control unit 1011, a storage unit 1012, a communication unit 1015 and an input unit 1019.

The control unit 1011 is, for example, a CPU, and has the function of receiving information input by the user from the input unit 1019 and controlling the communication unit 1015 to transmit the information to the server device 11.

The storage unit 1012 is, for example, a memory, and has the function of storing programs for enabling the functions of the control unit 1011. The functions of the control unit 1011 are realized by the CPU executing the programs stored in the storage unit 1012.

The input unit 109 has the function of receiving the feedback information input by the user, and outputting the feedback information to the control unit 1011. The input unit 1019 is, for example, a button for registering the notification information as favorite information, and outputs information indicating that the button has been pressed by the user, to the control unit 1011. Upon receiving information indicating that the user has pressed the button, the control unit 1011 controls the communication unit 1015 to transmit, as the feedback information, information indicating an instruction to register the notification information as the favorite information, to the server device 11.

The communication unit 1015 is, for example, an LSI for communications, and has the function of transmitting the feedback information under the control of the control unit 1011.

Note that the appliance for transmitting the feedback information does not necessarily transmit the feedback information to the server device 11 every time the user inputs the feedback information. For example, the appliance may accumulate the feedback information, and transmit the accumulated feedback information at once.

Figure 32:
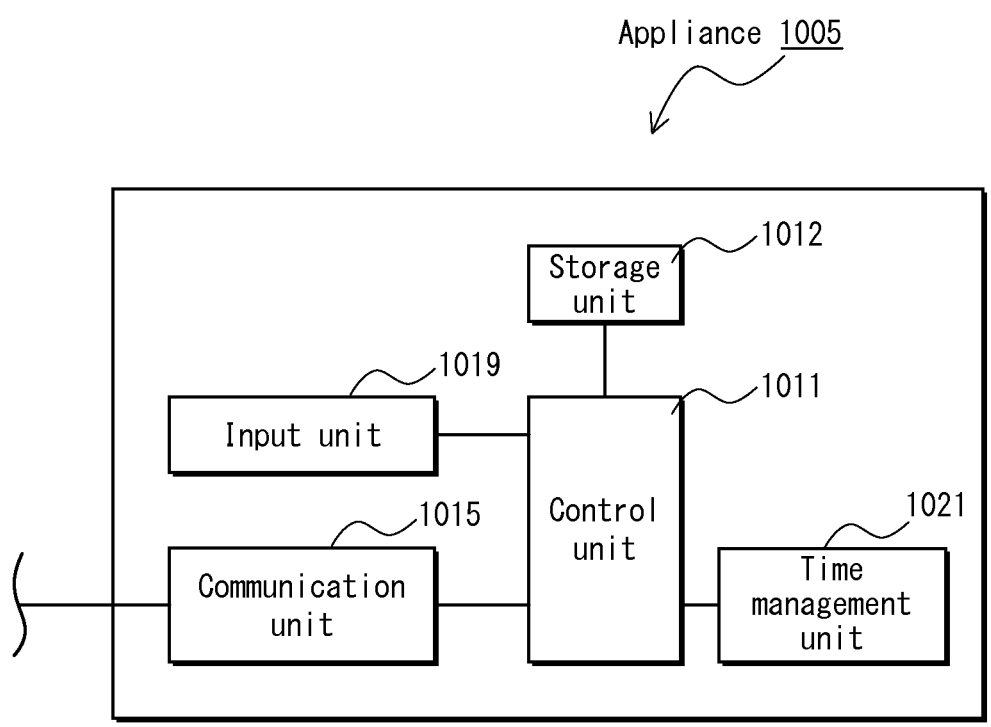
FIG. 32 is a functional block diagram illustrating primary components of an appliance 1005.

FIG. 32 is a functional block diagram illustrating primary components of the appliance 1005 that is an example of an appliance for transmitting the feedback information and is modified to realize the above-described function.

The appliance 1005 has a time management unit 1021 in addition to the components of the appliance 1004.

The time management unit 1021 has the function of storing the feedback information received from the user via the input unit 1019 and the time at which the feedback information is received in association with each other.

When detecting that it is possible to communicate with the server device 11, the control unit 1011 controls the communication unit 1015 to transmit, to the server device 11, the feedback information stored in the time management unit 1021 and information about the receiving time of the feedback information.

With this configuration, even when the feedback information is received under the condition where it is impossible to communicate with the server device 11, the appliance 1005 can transmit the feedback information to the server device 11 when it becomes possible to communicate with the server device 11.

3. Embodiment 3

<3.1 Overview>

An information notification system pertaining to the present embodiment is the same as the information notification system 2 pertaining to Embodiment 2 in basic configuration. However, a server device 12 pertaining to the present embodiment is different from the information notification system 2 in that the server device 12 has the function of receiving the feedback information transmitted by the appliance 1003 and placing an order according to the feedback information, in addition to the functions of the server device 11.

<3.2 Configuration>

Figure 33:
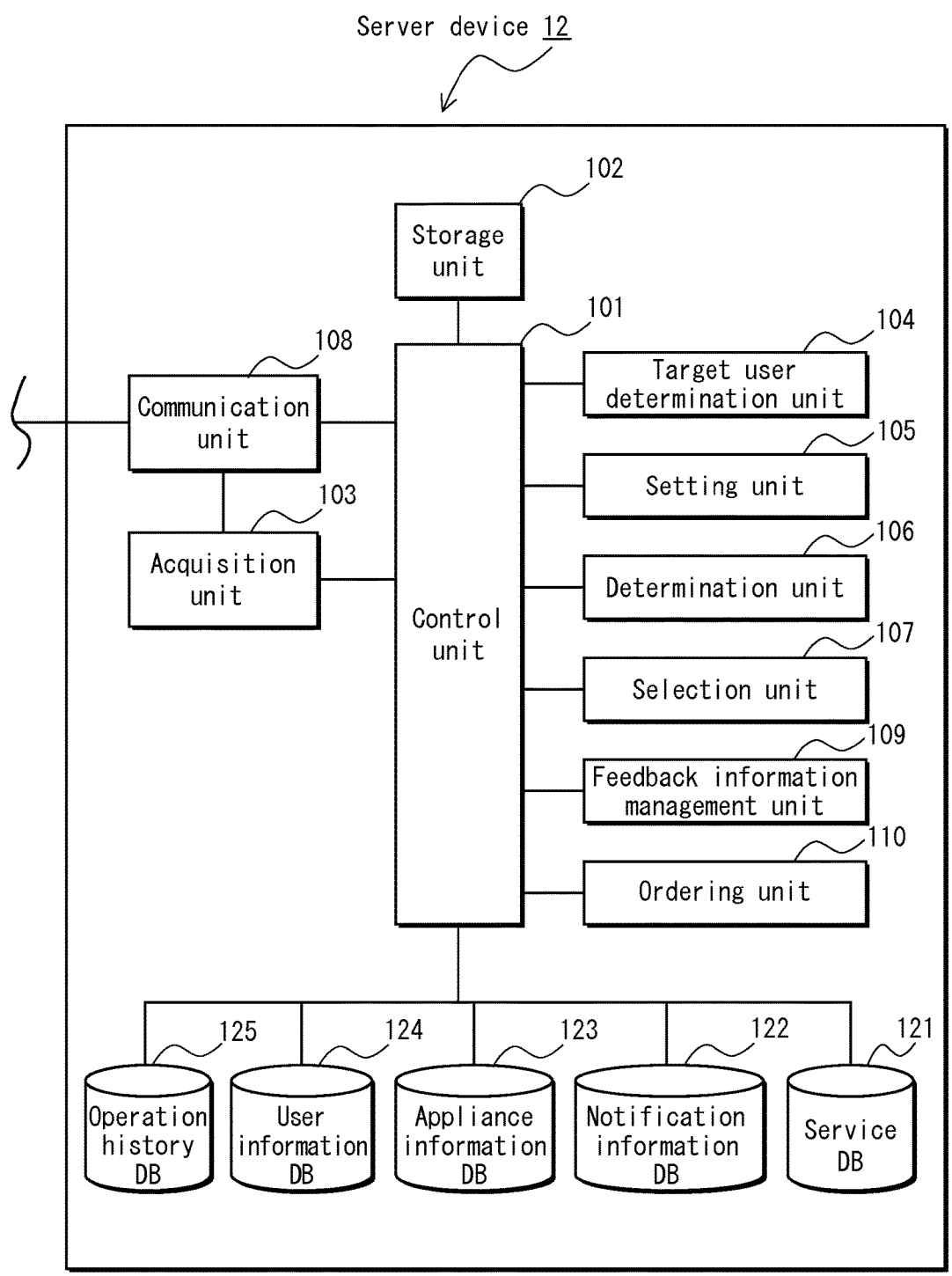
FIG. 33 is a functional block diagram illustrating primary components of a server device 12.

FIG. 33 is a functional block diagram illustrating primary components of the server device 12.

The server device 12 has basically the same configuration as the server device 11.

The difference is that the server device 12 additionally includes an ordering unit 110.

The ordering unit 110 has the function of placing an order when information relating to the order is contained in the feedback information. The functions of the ordering unit 110 are realized by the CPU executing the programs stored in the storage unit 102.

<3.3 Data Structure>

FIG. 34 illustrates a data structure and example contents of the notification information table 1102.

The notification information table 1102 contains an item Consumable goods 1190 in addition to the items of notification information table 1100.

Consumable goods 1190 is an item specifying the goods that is to be the subject of the determination on whether the goods are in short supply when "at short supply of consumable goods" is specified in Notification timing 1160.

In the example shown in FIG. 34, the notification information specified in Notification contents 1170 is transmitted when the amount of detergent for the laundry machine specified in Appliance type 1130 is no greater than a predetermined amount.

<3.4 Operations>

The following explains operations of the server device 12 in an example case where the conditions shown in the notification information table 1100 in FIG. 34 are specified.

Figure 35:
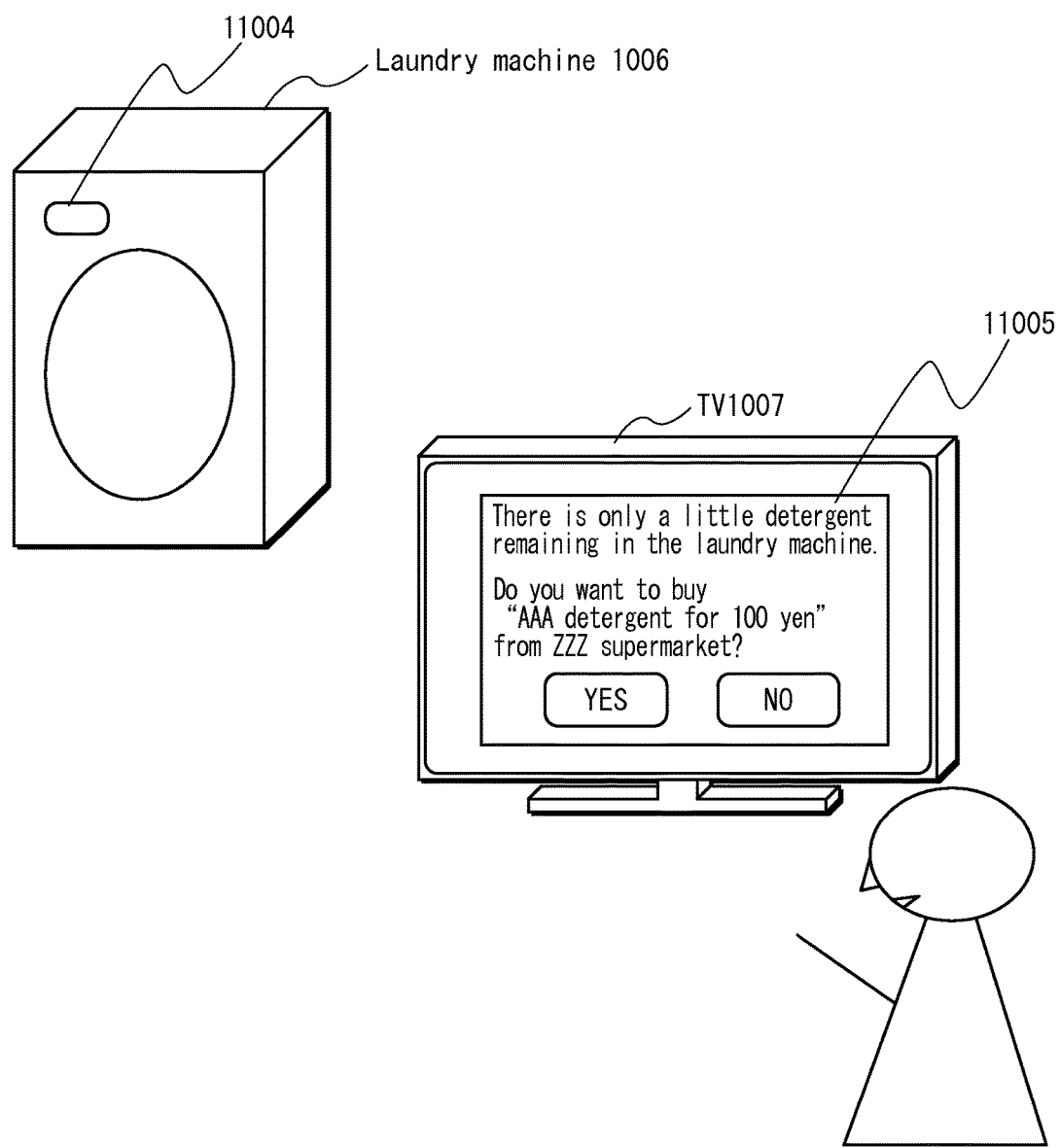
FIG. 35 is a conceptual diagram illustrating a service allowing for purchase of consumable goods.

FIG. 35 is a conceptual diagram showing a notification process performed when the consumable goods are in short supply.

Suppose the case where a laundry machine 1006 can store a certain amount of detergent that is sufficient for doing laundry several times, and has the function of transmitting, as the operation history information, information indicating the remaining amount of detergent to the server device 12. The laundry machine 1006 has an indicator 11004 including a LED for supporting the notification by light. When the goods are in short supply, the indicator 11004 of the laundry machine 1006 is caused to blink, and notification information 11005 is displayed on a TV 1007 owned by the same user. The notification information 11005 shows information encouraging the user to purchase AAA detergent from ZZZ supermarket. When the user wishes to purchase the AAA detergent for 100 Yen, the user selects "YES" and, and otherwise selects "NO". When the user selects "YES", the TV 1007 transmits, as the feedback information, information indicating purchase of the AAA detergent for 100 Yen, to the server device 12. The server device 12 places the order for the detergent with ZZZ supermarket according to the feedback information.

Figure 36:
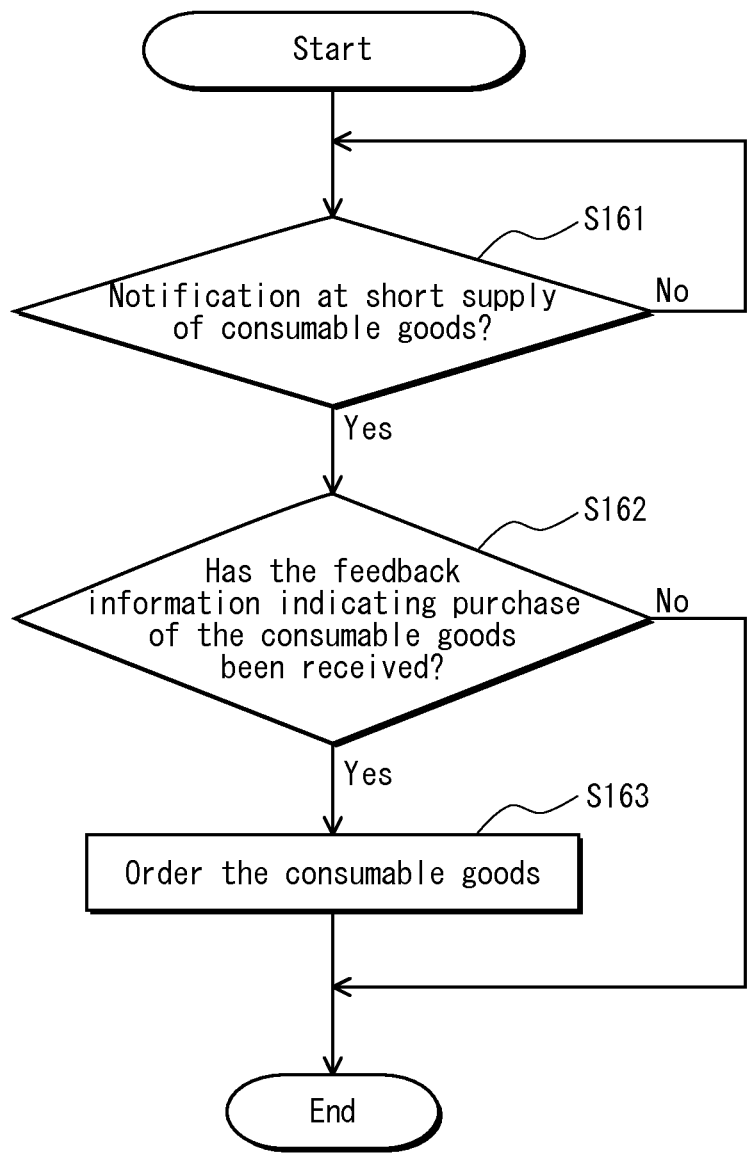
FIG. 36 is flowchart for operations performed by the server device 12 at shortage of consumable goods.

FIG. 36 is a flowchart for operations performed by the server device 12 when consumable goods are in short supply.

The determination unit 106 of the server device 12 determines whether the condition for when the consumable goods are in short supply, which is specified in Notification timing, is satisfied or not (Step S161). Specifically, the determination unit 106 refers to the operation history information table 1400, and determines whether the amount of remaining detergent specified in Consumable goods 1190 is no greater than a predetermined amount (e.g. the amount for doing laundry three times).

In the case of NO in Step S161, the determination unit 106 monitors the operation histories of the laundry machine 1006, and repeats Step S161 until the remaining amount is no greater than the predetermined amount.

In the case of YES in Step S161, the determination unit 106 determines whether the feedback information indicating purchase of the consumable goods has been received from the user by the acquisition unit 103 via the communication unit 108 (Step S162). When the feedback information indicating purchase of the consumable goods has been received (Step S162: YES), the ordering unit 110 transmits information indicating an order of the consumable goods to the information provider server 30 owned by the information provider specified in Name 1110 (Step S163). Note that the method for placing orders may be the same as conventional methods adopted for internet shopping.

<3.4 Summary>

The information notification system pertaining to the present embodiment allows for timely transmission of notification information encouraging purchase of consumable goods in short supply, and therefore the user can instruct the server device 12 to place an order for the consumable goods by a simple operation.

4. Modifications

An information notification system using information notification method pertaining to the present invention has been described above based on embodiments. However, as a matter of course, the system may be modified in the following manner, and the present invention is not limited to the information notification method shown in embodiments above.

(1) In above-described embodiments, the server device determines the timing of transmitting the notification information and selects the notification-target appliances. However, this is merely an example, and the determination as to the timing of transmitting the notification information and the selection of the notification-target appliances are not necessarily performed by the server device. It is not necessarily the server device that performs the determination as to the timing of transmitting the notification information and the selection of the notification-target appliances. For example, the GW inside the house, which is connected to the appliance owned by the user, may perform the determination and the selection. If this is the case, each GW includes components that are equivalent to the determination unit, the selection unit and the acquisition unit of the server device, and the server device transmits the notification condition information 1500 used for the determination on the transmission of the notification information to the GW owned by the target user. The GW determines the timing of transmitting the notification information and selects the notification-target appliances according to the notification condition information. Alternatively, these processes may be performed by separate devices. For example, the determination as to the timing of transmitting the notification information may be performed by the server device, and the selection of the notification-target appliances may be performed by each GW.

(2) In the above-described embodiments, the selection unit 107 selects, as the notification notification-target appliances, all the appliances satisfying the conditions specified in Target appliance 1540 of the appliance notification condition information table 1500. However, this is not essential. It suffices if the notification information is efficiently and effectively provided to the users. For example, from among the appliances satisfying the conditions specified in Target appliance 1540, appliances that are frequently used by the user within a predetermined range of the time to transmit the notification information (e.g. from one hour before the time to one hour after the time) may be determined with reference to the history information, and the notification information may be transmitted to the appliances in the order of the frequency of use. Alternatively, the notification information may be transmitted to appliances that are used more frequently than a predetermined threshold (e.g. three times a week or more).

Alternatively, the notification information may be transmitted to preferentially appliances that are capable of providing the notification information without converting it.

(3) In Embodiment 1, the context search is related to an action of watching a TV program and the determination is performed on whether the search keyword is related to the program. However, this is merely an example, and the context search is not limited to this example. The context search may be adapted to operations of any devices, insofar as the context search allows for the detection of the user's operation related to the keyword. For example, the determination on whether the keyword for the search performed on a browser or the like matches the search keyword determined by the information provider may be performed based on the operation histories of the device having the browser function.

(4) In the above-described embodiments, an advertisement distribution service is explained as an example of the service of providing information. However, the notification information to be provided is not limited to advertisements. Any information that the information providers wish to provide may be specified as the notification information. For example, the information providers may provide weather forecast information, traffic information and so on as the notification information. Alternatively, the broadcast schedule of TV programs may be specified as the notification information.

(5) In the above-described embodiments, the notification information is written in HTML. However, this is merely an example, and it is not essential that the notification information is written in HTML. Any format and any type of files may be used insofar as the notification information can be specified. For example, the notification information may be represented by text data, image data or audio data. Alternatively, any combinations of the above may be adopted.

(6) In Embodiment 2, the input unit has the function of detecting that the user inputs the feedback information by shaking the portable terminal device up and down. However, this is merely an example, and the input unit does not necessarily have such a function. It suffices if the input unit has the function of enabling the user to input the feedback information. For example, the input unit may be a mechanical button. If this is the case, the user presses the button to show the intention of registering the notification information as the favorite information, and the feedback information indicating the intention is transmitted to the server device. Alternatively, a similar button may be displayed on a touch panel, and the same function may be realized by detecting a touch on the button.

Figure 37:
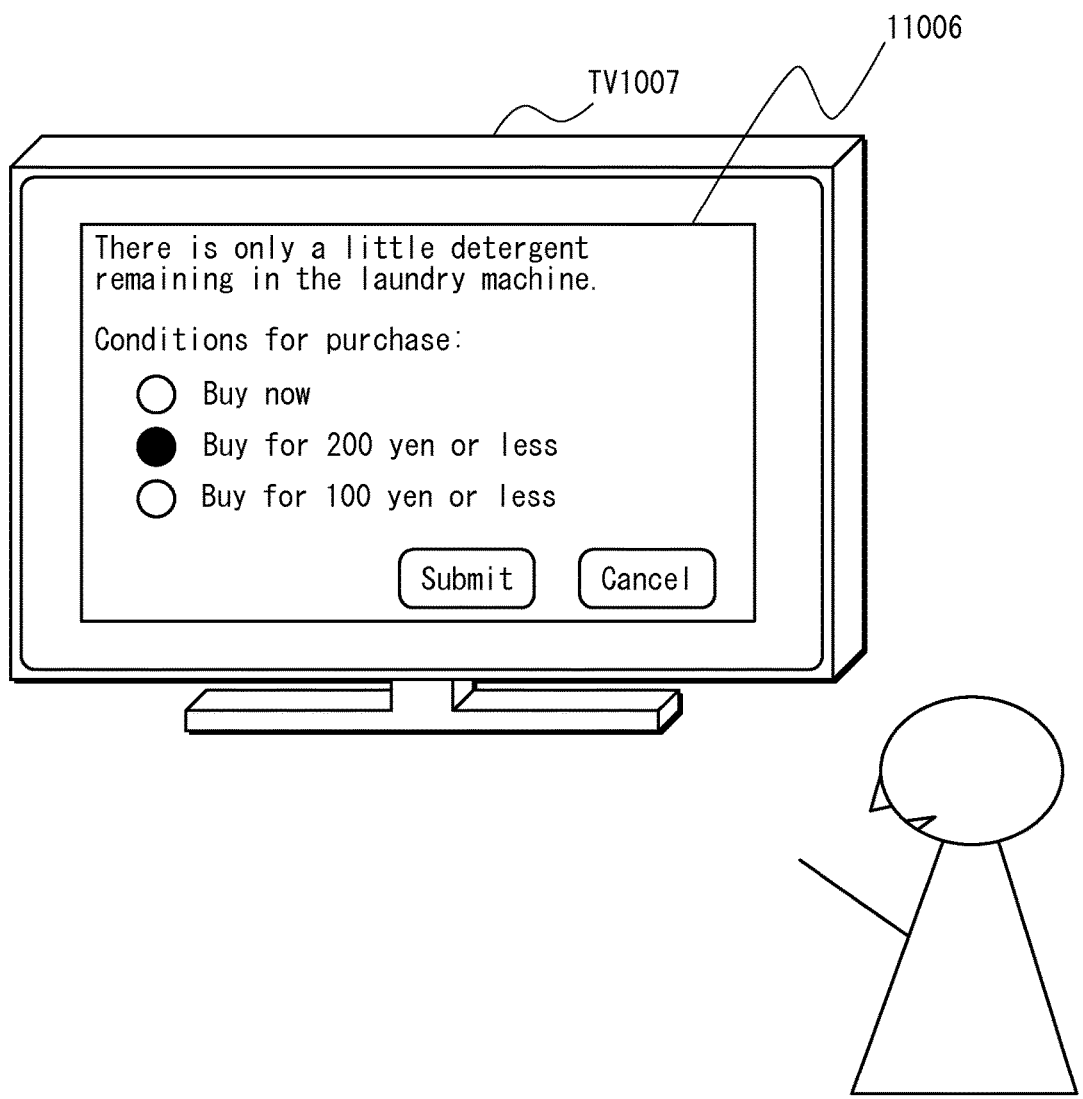
FIG. 37 is a conceptual diagram illustrating a modified example of a service allowing for purchase of consumable goods.

(7) In Embodiment 3, the notification information allowing the user to determine whether to purchase consumable goods is displayed, and the user inputs the feedback information in response to the notification information. However, this is merely an example, and it is not essential that the notification information allows the user to only determine whether to purchase consumable goods. For example, the notification information may provide conditions for purchasing the goods, as shown in FIG. 37. When such a configuration is adopted, the server device transmits the feedback information to the information provider and allows the information provider to know the trend of the price at which the user would like to buy the goods.

Alternatively, notification information providing a coupon relating to the consumable goods may be displayed instead of the notification information encoring the purchase.

(8) The various notification processes, the process of selecting the appliances, the process of registering the substitute notification-target appliances, the process performed when consumable goods are in short supply, and so on described in the embodiments above (FIGS. 13 through 18, 20 through 22, 27 through 29 and 36) may be realized by using control programs that are composed of program codes written in machine language or high-level language and that cause the processor of the server device and various circuits connected to the processor to perform the processes above. The control programs may be stored on a recording medium, or distributed via various communication channels. Examples of such a recording medium includes an IC card, a hard disk, an optical disc, a flexible disk, ROM, a flash memory, and so on. The distributed control programs are stored in a memory or the like that is readable by a processor, and the functions described in embodiments above are realized by the processor executing the control programs. Instead of executing the control programs per se, the processor may execute compiled programs or use an interpreter.

(9) The information notification method pertaining to the present invention may be realized by a computer using computer programs. Computer programs may be transmitted as digital signals.

The prevent invention may be realized as the computer programs or the digital signals recorded on a computer-readable recording medium such as a flexible disk, a hard disk, a CD-ROM, a MO, a DVD, a DVD-ROM, a DVD-RAM, a BD (Blu-ray Disc™), or a semiconductor memory. The present invention may be the computer programs or the digital signals recorded on such a recording medium.

The computer programs or the digital signals pertaining to the present invention may be transmitted via networks, of which telecommunications networks, wire/wireless communications networks, and the Internet are representative, or via data broadcasting.

(10) The above-described Embodiments and Modifications may be combined with one another.

4. Supplemental Descriptions

The following further explains the structure of the information notification method pertaining to one aspect of the present invention, modifications applicable to the method, and advantageous effects of the method.

(1) One aspect of the present invention provides an information notification method for providing information from a server device to a plurality of devices connected to a network, comprising: a reading step of reading notification information that is stored in association with information indicating a particular action of a user; an acquiring step of acquiring operation histories of the plurality of devices; an estimating step of estimating, based on operation histories of one or more devices owned by the user among the plurality of devices, a no-operation period during which the user is unlikely to operate the one or more devices; a determining step of determining, based on current operation state of the one or more devices, whether the particular action has been performed outside the no-operation period; and a transmitting step of, when outcome of the determining step is affirmative, transmitting the notification information associated with the particular action to a destination device among the one or more devices owned by the user, wherein the destination device, receiving the notification information, provides the user with the notification information.

According to the stated information notification method, a period during which the user is unlikely to operate the appliances is estimated based on the operation histories of the appliances, and whether the appliances have been operated outside the estimated period is determined. Therefore, the stated method allows for timely transmission of the notification information to each user, without being provided by the information provider with detailed settings for each user with respect to conditions for notification.

(2) The information notification may further comprise: a selecting step of selecting, based on current operation state of the one or more devices owned by the user, at least one device as the destination device of the notification information from among the one or more devices owned by the user. The operation histories of the one or more devices owned by the user may contain information indicating a power-on period of each of the one or more devices owned by the user, the power-on period of a device being a period during which the device was in power-on state in each day. The particular action may be use of at least one particular device from among the one or more devices owned by the user. In the estimating step, an action period may be estimated based on the information indicating the power-on period, the action period being a period during which the user is likely to perform the particular action. In the determining step, the particular action may be determined to have been performed within the action period when power status of the at least one particular device is determined to have been changed within the action period. In the transmitting step, the notification information may be transmitted to the at least one device selected as the destination device in the selecting step when the particular action is determined to have been performed within the action period.

According to the stated method, a period during which the user is likely to perform the particular action each day is estimated based on whether the at least one device relating to the user's particular action has been powered on or not. Therefore, the stated method allows for determination on whether the particular device has been operated in the period during which the user is likely to perform the particular action.

(3) In the determining step, the particular action may be determined to have been performed within the action period when the at least one particular device has been switched from power-off state to powered-on state within the action period, and in the selecting step, the at least one device switched to power-on state may be selected as the destination of the notification information.

The stated method allows for transmission of the notification information to particular devices that have been powered on within the estimated period during which the user is likely to perform the particular action.

(4) In the determining step, the particular action may be determined to have been performed within the action period when a device among the at least one particular device is switched from power-on state to power-off state at any point within the action period and all of the at least one particular device has been switched to power-off state at the point. In the selecting step, the at least one device switched to power-off state may be selected as the destination device of the notification information. In the transmitting step, the notification information may be transmitted to the at least one device selected as the destination device in the selecting step when the at least one device selected as the destination device is switched to power-on state.

The stated method allows for determination as to whether all the particular devices are in the power-off state within the period during which the user is likely to operate the devices, and allows for transmission of the notification information when a device among the devices that have been in the power-off state is switched to power-on state. Therefore, the notification information is transmitted to the device when, for example, the user returns home.

(5) The one or more devices owned by the user may include a portable information terminal device that is not the at least one particular device. In the determining step, the particular action may be determined to have been performed within the action period when a device among the at least one particular device is switched from power-on state to power-off state at any point within the action period and all of the at least one particular device has been switched to power-off state at the point. In the selecting step, the portable information terminal device may be selected as the destination device of the notification information. In the transmitting step, the notification information may be transmitted to the portable information terminal device.

The stated method detects that all the particular devices have been switched to power-off state, and upon detection, transmits the notification information to the portable terminal device belonging to the user of the particular devices. Therefore, the notification information is transmitted to the portable terminal device of the user when, for example, the user goes out of home.

(6) The portable information terminal device may include a positioning unit using a satellite positioning system. The information notification method may further comprise a position acquiring step of sequentially acquiring positional information of the portable information terminal device from the positioning unit. In the transmitting step, the notification information may be transmitted to the portable information terminal device when the portable information terminal device enters a predetermined area from outside thereof.

With the stated method, the notification information is transmitted to the portable terminal device owned by the user when the user, while being out of home for example, approaches to a specified area.

(7) In the selecting step, one or more devices other than the at least one particular device may be selected from among the one or more devices owned by the user, and in the transmitting step, the notification information may be transmitted to, among the one or more devices selected in the selecting step, a device that is in power-on state.

With the stated method, the notification information is transmitted to a device in power-on state, other than the particular devices owned by the user.

(8) The information notification method may further comprise a notification device information reading step of reading notification device information stored in association with the particular action, the notification device information specifying one or more devices as candidates for the destination device of the notification information. In the selecting step, a device that is in power-on state may be selected as the destination device of the notification information from among the one or more devices specified by the notification device information.

With the stated method, the notification information is transmitted to a device that is in power-on state at the time of transmission of the notification information, from among the predetermined candidates for the destination device.

(9) The information notification method may further comprise a destination device information reading step of reading destination device information stored in association with the notification information, the destination device information specifying a condition for type of the destination device and a condition for a range relating to the destination device. In the selecting step, the destination device may be selected based on the destination device information.

With the stated method, the notification information is transmitted to the device satisfying the conditions specified in advance by the information provider.

(10) The range relating to the destination device may be a time range specifying a usage period for which the device has been used. In the selecting step, the usage period of each of the one or more devices owned by the user may be specified based on the operation histories, and a device that satisfies the condition for the range may be selected as the destination device.

With the stated method, the notification information is transmitted to the device satisfying the conditions relating to the usage period of the device, specified in advance by the information provider.

(11) The information notification method may further comprise a positional information reading step of reading positional information of each of the plurality of devices. The range relating to the destination device may be a positional range of the destination device. In the selecting step, a device that satisfies the condition for the range may be selected as the destination device from among the one or more devices owned by the user.

With the stated method, the notification information is transmitted to the device satisfying the conditions relating to the location of the device, specified in advance by the information provider.

(12) At least one of the one or more devices owned by the user may be an information search terminal device. The information search terminal device may include a keyword input unit receiving a keyword input by the user. The operation histories of the plurality of devices may contain the keyword. The particular action of the user may be to input an instruction relating to the keyword into the at least one of the one or more devices owned by the user. In the determining step, the particular action may be determined to have been performed when the information search terminal device is determined to have operated according to the instruction relating to the keyword. In the selecting step, the information search terminal device may be selected as the destination device of the notification information.

With the stated structure, notification information relating to the keyword is transmitted when the user performs a search relating to a particular keyword.

(13) The one or more devices owned by the user may include a device including a feedback information input unit receiving feedback information from the user. The information notification method may further comprise: a feedback information acquiring step of acquiring the feedback information from the device including the feedback information input unit; a function information reading step of reading function information used for enabling one of the one or more devices owned by the user to perform a particular function based on the feedback information; and an instructing step of issuing an instruction to enable the one of the one or more devices owned by the user to perform the particular function when the feedback information satisfies a predetermined condition.

The stated method enables the server device to receive the feedback information from the user that has received the notification information, and to timely transmit additional information relating to the notification information to the user according to the feedback information.

(14) Another aspect of the present invention provides an information notification system for providing information from a server device to a plurality of devices connected to a network, the server device comprising: a storage unit storing notification information in association with information indicating a particular action of a user; a reading unit reading the notification information stored in association with the information indicating the particular action of the user; an acquisition unit acquiring operation histories of the plurality of devices; an estimation unit estimating, based on operation histories of one or more devices owned by the user among the plurality of devices, a no-operation period during which the user is unlikely to operate the one or more devices; a determination unit determining, based on current operation state of the one or more devices, whether the particular action has been performed outside the no-operation period; and a transmission unit, when outcome of the determining step is affirmative, transmitting notification information associated with the particular action to a destination device among the one or more devices owned by the user, and each of the plurality of devices comprising: a history information transmission unit transmitting operation histories of the device to the server device; a receiving unit receiving the notification information from the server device; and a notification unit providing the user with the notification information.

The stated information notification system estimates a period during which the user is unlikely to operate the appliances, based on the operation histories of the appliances, and determines whether the appliances have been operated outside the estimated period. Therefore, the server device can timely transmit the notification information to each user, without detailed settings specified by the information provider for each user with respect to conditions for notification, and the devices that have received the notification information can provide the user with the notification information.

(15) Another aspect of the present invention provides a server device for providing information to a plurality of devices connected to a network, comprising: a storage unit storing notification information in association with information indicating a particular action of a user; a reading unit reading the notification information stored in association with the information indicating the particular action of the user; an acquisition unit acquiring operation histories of the plurality of devices; an estimation unit estimating, based on operation histories of one or more devices owned by the user among the plurality of devices, a no-operation period during which the user is unlikely to operate the one or more devices; a determination unit determining, based on current operation state of the one or more devices, whether the particular action has been performed outside the no-operation period; and a transmission unit, when outcome of the determining step is affirmative, transmitting the notification information associated with the particular action to a destination device among the one or more devices owned by the user.

The stated server device estimates a period during which the user is unlikely to operate the appliances, based on the operation histories of the appliances, and determines whether the appliances have been operated outside the estimated period. Therefore, the server device can timely transmit the notification information to the devices owned by each user, without being provided by the information provider with detailed settings for each user with respect to conditions for notification.

INDUSTRIAL APPLICABILITY

An information notification method pertaining to the present invention is applicable to a server device that determines the timing of providing the user with information, or devices to which the information is to be provided.

REFERENCE SIGNS LIST 10, 11, 12: Server device
20: Network
30: Information provider server
101, 1011: Control unit
102, 1012: Storage unit
103: Acquisition unit
104: Target user determination unit
105: Setting unit
106: Determination unit
107: Selection unit
108, 1015: Communication unit
109: Feedback information management unit
110: Ordering unit
900: Setting information
1002, 1003, 1004, 1005: Appliance
1100: Notification information table
1101: Notification information table
1102: Notification information table
1013: Event detection unit
1014: Notification unit
1016: Appliance control unit
1017: Main component
1018: Main hardware
1019: Input unit 1200: User information table
1300: Appliance information table
1400: Operation history information table
1500: Notification condition information table
2000: Event condition information table

The invention claimed is:

1. An information notification method by which a server device notifies a user of a notification content provided by an information provider via a device among a plurality of user-registered devices, used in a system that collects history information of the plurality of user-registered devices, the server device including:
a control unit; and
a database storage storing:
a history information table in which operation histories of the plurality of user-registered devices are stored;
an information provider table in which setting information is registered, the setting information including at least one notification content that the information provider provides and at least one notification condition that corresponds one-to-one with the notification content, the notification condition specifying, by using a geographical area, a device usage period, and a device usage rate, a condition for a target user to whom the notification content is provided, the notification content including a notification content transmitted at a timing at which the target user awakes, a notification content transmitted at a timing at which the target user goes out of home, and a notification content transmitted at a timing at which the target user comes home; and
a notification timing information table including a plurality of items each indicating a type of a notification timing in correspondence with an event specifying arrival of a notification timing, an event type, and a target device, the events each specifying arrival of a notification timing including an event specifying arrival of the timing at which the target user awakes, an event specifying arrival of the timing at which the target user goes out of home, and an event specifying arrival of the timing at which the target user comes home, each of the notification contents created by the information provider with use of the notification timing, the event type, and the target device, the information notification method performed by the server device comprising:
an acquiring step of acquiring operation histories from the user-registered devices and updating the history information table each day through adding the acquired operation histories to the history information table;
a reading step of reading the setting information from the information provider table;
a user specifying step of specifying at least one target user from among a plurality of registered users whose user information meets the geographical area, the device usage period, and the device usage rate included in the read setting information;
an estimating step of collecting operation histories of devices, among the user-registered devices, that are owned by the target user within a classification period of N days from an ith day to an (i+N)th day according to date, specifying, for each day, periods during which the devices owned by the target user are operating and not operating, and extracting a no-operation period which is a period between 0:00 and 24:00 in which none of the devices owned by the target user is operated on any of N days from the ith day to the (i+N)th day; and a transmitting step of, when a new operation history is added to the history information table and the devices owned by the target user are not operated within a period continuing until the current time, corresponding to the no-operation period, transmitting the notification content indicated by the read setting information to one of the devices owned by the target user upon occurrence of the event specifying arrival of the timing at which the target user awakes, the event specifying arrival of the timing at which the target user goes out of home, or the event specifying arrival of the timing at which the target user comes home as indicated in the notification timing information table, wherein
(i) the event specifying arrival of the timing at which the target user awakes is a timing after an elapse of the no-operation period since a user operation of turning off a light in a bedroom before the elapse of the no-operation period,
(ii) the event specifying arrival of the timing at which the target user goes out of home is a timing of a user operation of turning off all the devices except for the devices that are turned on all day, and
(iii) the event specifying arrival of the timing at which the target user comes home is a timing of a user operation of any device within the home after all the devices except for the devices that are turned on all day are turned off.

2. The information notification method of claim 1 further comprising:
a selecting step of selecting, based on a current operation state of the one or more devices owned by the target user, at least one device as a destination device of the notification content from among the one or more devices owned by the target user, wherein
in the transmitting step, the notification content is transmitted to the at least one device selected as the destination device in the selecting step.

3. The information notification method of claim 2, wherein
in the selecting step, the at least one device switched from a power-off state to a power-on state is selected as the destination device of the notification content.

4. The information notification method of claim 2, wherein
in the selecting step, the at least one device switched from a power off state to a power-off state is selected as the destination device of the notification content, and
in the transmitting step, the notification content is transmitted to the at least one device selected as the destination device in the selecting step when the at least one device selected as the destination device is switched to the power-on state.

5. The information notification method of claim 2, wherein
the one or more devices owned by the target user include a portable information terminal device, in the selecting step, the portable information terminal device is selected as the destination device of the notification content, and
in the transmitting step, the notification content is transmitted to the portable information terminal device.

6. The information notification method of claim 5, wherein
the portable information terminal device includes a positioning unit using a satellite positioning system, the information notification method further comprises:
a position acquiring step of sequentially acquiring positional information of the portable information terminal device from the positioning unit; and
in the transmitting step, the notification content is transmitted to the portable information terminal device when the portable information terminal device enters a predetermined area from outside thereof.

7. The information notification method of claim 2, wherein
in the transmitting step, the notification content is transmitted to a device that is in a power-on state.

8. The information notification method of claim 2, wherein
the setting information includes notification device information specifying one or more devices as candidates for the destination device of the notification content, and
in the selecting step, a device that is in a power-on state is selected as the destination device of the notification content from among the one or more devices specified by the notification device information.

9. The information notification method of claim 8 further comprising:
a destination device information reading step of reading destination device information stored in association with the notification content, the destination device information specifying a condition for a type of the destination device and a condition for a range relating to the destination device, wherein
in the selecting step, the destination device is selected based on the destination device information.

10. The information notification method of claim 9, wherein
the range relating to the destination device is a time range specifying the device usage period for which the device has been used in the notification condition, and
in the selecting step, the device usage period of each of the one or more devices owned by the target user is specified based on the operation histories, and a device that satisfies the condition for the range is selected as the destination device.

11. The information notification method of claim 9 further comprising:
a positional information reading step of reading positional information of each of the plurality of user-registered devices, wherein
the range relating to the destination device is a positional range of the destination device, and
in the selecting step, a device that satisfies the condition for the range is selected as the destination device from among the one or more devices owned by the target user.

12. The information notification method of claim 2, wherein
at least one of the one or more devices owned by the target user is an information search terminal device,
the information search terminal device includes a keyword input unit receiving a keyword input by the target user, and
in the selecting step, the information search terminal device into which an instruction relating to the keyword is input is selected as the destination device of the notification content.

13. The information notification method of claim 1, wherein
the one or more devices owned by the target user include a device including a feedback information input unit receiving feedback information from the target user,
the information notification method further comprises:
a feedback information acquiring step of acquiring the feedback information from the device including the feedback information input unit;
a function information reading step of reading function information used for enabling one of the one or more devices owned by the target user to perform a particular function based on the feedback information; and
an instructing step of issuing an instruction to enable the one of the one or more devices owned by the target user to perform the particular function when the feedback information satisfies a predetermined condition.

14. The information notification method of claim 1 further comprising:
an event processing executing step of specifying the event type corresponding to the notification condition in the read setting information and executing event processing based on the corresponding event type, wherein
the event type includes execution of function, history information, context search, and specified timing, and
the estimating step is performed event processing executed when the event type is history information.

15. The information notification method of claim 1, wherein
the server device further includes a device information table including identification information indicating, for each of the devices, one or more notification methods supported by the device,
the information notification method further comprises a target device selecting step of executing a first determination and a second determination to select one from the devices owned by the target user as a target device when both a result of the first determination and a result of the second determination are affirmative,
the first determination determines, through referring to the device information table, whether each of the devices owned by the target user supports a notification method for provision of the notification content indicated by the read setting information, and
the second determination determines whether each of the devices owned by the target user is operating.

16. The information notification method of claim 15, wherein
the notification method includes notification through a browser, notification through a text, notification through light, and notification through a sound,
the information notification method further comprises:
a method converting step of converting the notification content indicated by the read setting information when the result of the first determination is negative, conversion executed by the method converting step includes conversion of the notification content into a text and conversion of the notification content into a sound; and
a substitute notification device determining step of extracting devices other than the target device from among the devices owned by the target user and determining whether each of the extracted devices supports the notification method of the read setting information before conversion; and
a substitute notification device setting step of setting, when one of the extracted devices supports the notification method of the read setting information before conversion, the one of the extracted devices as a substitute notification device.

17. The information notification method of claim 16, further comprising:
a monitoring target determining step of, when the result of the second determination is negative, determining the target device as a monitoring target device which, upon detecting user operation of the monitoring target device, is caused to notify the target user of the notification content indicated by the read setting information.

18. The information notification method of claim 17, further comprising:
a feedback evaluating step of determining, when one of the devices owned by the target user is a portable terminal device, whether any of the notification contents is specified as a favorite notification content by the target user based on a feedback from the portable terminal device; and
a reminding step of executing reminding processing when one of the notification contents is specified as a favorite notification content, wherein
the reminding processing includes:
(1) determining whether an effective period and an effective geographical area are specified to the favorite notification content as the notification condition;
(2) when the effective period and the effective geographical area are specified, calculating, based on a current position and a moving distance of the portable terminal device, a required time required for the portable terminal device to reach the effective geographical area; and
(3) when a time obtained by adding the required time to the current time is earlier than a time at which the effective period ends, causing the portable terminal device to notify the target user of the favorite notification content.

19. An information notification system for providing information from a server device to a plurality of user-registered devices connected to a network,
the server device comprising:
a first processor; and
a first non-transitory computer-readable recording medium storing:
first executable instructions;
a history information table in which operation histories of the plurality of user-registered devices are stored;
an information provider table in which setting information is registered, the setting information including at least one notification content that the information provider provides and at least one notification condition that corresponds one-to-one with the notification content, the notification condition specifying, by using a geographical area, a device usage period, and a device usage rate, a condition for a target user to whom the notification content is provided, the notification content including a notification content transmitted at a timing at which the target user awakes, a notification content transmitted at a timing at which the target user goes out of home, and a notification content transmitted at a timing at which the target user comes home; and
a notification timing information table including a plurality of items each indicating a type of a notification timing in correspondence with an event specifying arrival of a notification timing, an event type, and a target device, the events each specifying arrival of a notification timing including an event specifying arrival of the timing at which the target user awakes, an event specifying arrival of the timing at which the target user goes out of home, and an event specifying arrival of the timing at which the target user comes home, each of the notification contents created by the information provider with use of the notification timing, the event type, and the target device, wherein
the first executable instructions, when executed by the first processor, cause the server device to:
acquire operation histories from the user-registered devices and update the history information table each day through adding the acquired operation histories to the history information table;
read the setting information from the information provider table;
specify at least one target user from among a plurality of registered users whose user information meets the geographical area, the device usage period, and the device usage rate included in the read setting information; collect operation histories of devices, among the user-registered devices, that are owned by the target user within a classification period of N days from an ith day to an (i+N)th day according to date, specify, for each day, periods during which the devices owned by the target user are operating and not operating, and extract a no-operation period which is a period between 0:00 and 24:00 in which none of the devices owned by the target user is operated on any of N days from the ith day to the (i+N)th day; and
transmit, when a new operation history is added to the history information table and the devices owned by the target user are not operated within a period continuing until the current time, corresponding to the no-operation period, the notification content indicated by the read setting information to one of the devices owned by the target user upon occurrence of the event specifying arrival of the timing at which the target user awakes, the event specifying arrival of the timing at which the target user goes out of home, or the event specifying arrival of the timing at which the target user comes home as indicated in the notification timing information table, wherein
(i) the event specifying arrival of the timing at which the target user awakes is a timing after an elapse of the no-operation period since a user operation of turning off a light in a bedroom before the elapse of the no-operation period,
(ii) the event specifying arrival of the timing at which the target user goes out of home is a timing of a user operation of turning off all the devices except for the devices that are turned on all day, and
(iii) the event specifying arrival of the timing at which the target user comes home is a timing of a user operation of any device within the home after all the devices except for the devices that are turned on all day are turned off.

20. A server device for providing information to a plurality of user-registered devices connected to a network, comprising:
a processor; and
a non-transitory computer-readable recording medium storing:
executable instructions;
a history information table in which operation histories of the plurality of user-registered devices are stored;
an information provider table in which setting information is registered, the setting information including at least one notification content that the information provider provides and at least one notification condition that corresponds one-to-one with the notification content, the notification condition specifying, by using a geographical area, a device usage period, and a device usage rate, a condition for a target user to whom the notification content is provided, the notification content including a notification content transmitted at a timing at which the target user awakes, a notification content transmitted at a timing at which the target user goes out of home, and a notification content transmitted at a timing at which the target user comes home; and a notification timing information table including a plurality of items each indicating a type of a notification timing in correspondence with an event specifying arrival of a notification timing, an event type, and a target device, the events each specifying arrival of a notification timing including an event specifying arrival of the timing at which the target user awakes, an event specifying arrival of the timing at which the target user goes out of home, and an event specifying arrival of the timing at which the target user comes home, each of the notification contents created by the information provider with use of the notification timing, the event type, and the target device, wherein when executed by the processor, cause the server device to:

acquire operation histories from the user-registered devices and update the history information table each day through adding the acquired operation histories to the history information table;

read the setting information from the information provider table;

specify at least one target user from among a plurality of registered users whose user information meets the geographical area, the device usage period, and the device usage rate included in the read setting information;

collect operation histories of devices, among the user-registered devices, that are owned by the target user within a classification period of N days from an ith day to an (i+N)th day according to date, specify, for each day, periods during which the devices owned by the target user are operating and not operating, and extract a no-operation period which is a period between 0:00 and 24:00 in which none of the devices owned by the target user is operated on any of N days from the ith day to the (i+N)th day; and transmit, when a new operation history is added to the history information table and the devices owned by the target user are not operated within a period continuing until the current time, corresponding to the no-operation period, the notification content indicated by the read setting information to one of the devices owned by the target user upon occurrence of the event specifying arrival of the timing at which the target user awakes, the event specifying arrival of the timing at which the target user goes out of home, or the event specifying arrival of the timing at which the target user comes home as indicated in the notification timing information table, wherein (i) the event specifying arrival of the timing at which the target user awakes is a timing after an elapse of the no-operation period since a user operation of turning off a light in a bedroom before the elapse of the no-operation period, (ii) the event specifying arrival of the timing at which the target user goes out of home is a timing of a user operation of turning off all the devices except for the devices that are turned on all day, and (iii) the event specifying arrival of the timing at which the target user comes home is a timing of a user operation of any device within the home after all the devices except for the devices that are turned on all day are turned off.

* * * * *